United States Patent
Dong et al.

(10) Patent No.: US 6,424,948 B1
(45) Date of Patent: Jul. 23, 2002

(54) DECLARATIVE WORKFLOW SYSTEM SUPPORTING SIDE-EFFECTS

(76) Inventors: Guozhu Dong, 2436 Heather Glen Ct., Apt. 5, Beavercreek, OH (US) 45431; Richard Baxter Hull, 12 Oliver St., Chatham, NJ (US) 07928; Bharat Kumar, 317 Valleyscent Ave., #C, Scotch Plains, NJ (US) 07076; Jianwen Su, 6228 Parkhurst Dr., Goleta, CA (US) 93117; Gang Zhou, 14 Honeyman Rd., Basking Ridge, NJ (US) 07920

( * ) Notice: Subject to any disclaimer, the term of this patent is extended or adjusted under 35 U.S.C. 154(b) by 0 days.

(21) Appl. No.: 09/253,190

(22) Filed: Feb. 19, 1999

(51) Int. Cl.$^7$ ................................................ G06F 17/60

(52) U.S. Cl. .............................................. 705/9; 705/8

(58) Field of Search ................... 705/8, 9, 10; 707/10

(56) References Cited

U.S. PATENT DOCUMENTS

| | | | | |
|---|---|---|---|---|
| 5,524,241 A | * | 6/1996 | Ghoneimy et al. | 707/10 |
| 5,581,691 A | * | 12/1996 | Hsu et al. | 714/15 |
| 5,809,212 A | | 9/1998 | Shasha | 395/10 |
| 5,826,239 A | * | 10/1998 | Du et al. | 705/8 |
| 5,832,455 A | * | 11/1998 | Hayashi et al. | 705/7 |
| 5,870,545 A | * | 2/1999 | Davis et al. | 709/201 |
| 5,893,083 A | * | 4/1999 | Eshghi et al. | 706/45 |
| 6,065,009 A | * | 5/2000 | Leymann et al. | 707/10 |
| 6,115,693 A | * | 9/2000 | McDonough et al. | 705/10 |
| 6,173,446 B1 | * | 1/2001 | Khan et al. | 717/11 |

OTHER PUBLICATIONS

Krishnakumar, Narayanan et al. Managing Heterogeneous Multi–system Tasks to Support Enterprise–wide Operations. Distributed and Parallel Databases, 3, 1–33, 1995.*

Georgakopoulos, Diimitrios et al. An Overview of Workflow Management: From Process Modeling to Workflow Automation Infrastructure. Distributed and Parallel Databases, 3, 119–153, 1995.*

Hull, Richard et al. Declarative Workflows the Support Easy Modification and Dynamic Browsing. Proc. Int'l Conference on Work Activities Coordination and Collaboration, Feb. 22–25, 1999.*

(List continued on next page.)

*Primary Examiner*—Kyle J. Choi
*Assistant Examiner*—D Robertson

(57) ABSTRACT

An object-focused workflow system for processing a received object in accordance with a declarative workflow specification. The specification includes modules and attributes, where module execution results in the evaluation of attributes, and may include the initiation of a side-effect action performed by an external component. Whether modules are to be executed for a particular received object is determined by associated enabling conditions. Attributes may be evaluated in accordance with computation rules and a combining policy, where the computation rules specify how values are to be contributed to an attribute, and the combining policy indicates how those contributed values are combined in order to assign a value to the attribute. Tasks in the workflow system may be executed eagerly in order to improve the performance of the workflow system. The eager evaluation of tasks includes the determination of whether such tasks are eligible for eager evaluation, and whether the tasks are unneeded or necessary for the processing of the received event. Workflows which satisfy described design properties allow for improved algorithms for the determination of the whether tasks are eligible, eager, and/or necessary. A graphical user interface is provided for displaying a representation of the evaluation status of the modules and attributes during workflow execution.

28 Claims, 56 Drawing Sheets

OTHER PUBLICATIONS

"Thinksheet: A Tool for Information Navigation", Peter Piatko, a dissertaion submitted in partial fulfillment of the requirements for the degree of Doctor of Philosophy, Department of Computer Science, New York University, May, 1998.

"Comprehension Syntax", P. Buneman, L. Libkin, D. Suciu, V. Tannen, and Limsoon Wong, SIGMOD Record 23 (1994), pp. 87–96.

"Naturally Embedded Query Languages", P. Buneman, S. Naqvi, V. Tannen, L. Wong, Proc. of Intl Conf. on Database Theory, 1992, pp. 140–154, published by Springer–Verlag as Lecture Notes in *Computer Science* vol. 646.

"Managing Heterogeneous Multi–system Tasks to Support Enterprise–wide Operations", N. Krishnakumar and A. Sheth, *Distributed and Parallel Databases*, 3, 1–33 (1995).

"SVP—a Model Capturing Sets, Streams and Parallelism", D. Stott Parker, E. Simon and P. Valduriez, Proceedings of the 18th VLDB Conference, Vancouver, British Columbia, Canada, pp. 115–126, 1992.

"WebWork: METEOR$_2$'s Web–Based Workflow Management System", J. A. Miller, D. Palaniswami, A. P. Sheth, K. J. Kochut and H. Singh, *Journal of Intelligent Information Systems*, pp. 1–30 (1997).

"Amalgamating Knowledge Bases", V. S. Subrahmanian, *ACM Transactions On Database Systems*, (TODS) 19(2): pp. 291–331 (1994).

\* cited by examiner

FIG. 4

```
1   Module:    identify_caller
2       Submodule of:    routing_to_skill
3       Input attributes:    ANI : 9digits
4       Output attributes:   home_phone : 9digits
5                            account_number : 15digits
6                            cust_rec : tuple (name: string,
7                                              address: string,
8                                              card_color: ("platinum",
9                                              "gold", "green"),
10                                             hates_promos? : boolean,
11                                             estimated_income_bracket :
12                                             ("0-10K", ">10K-20K",...,
13                                             ">100K-150K", ">150"),
14                                             last_sent_bonus_check:date)
15      Enabling condition:    true
16      Type:                  flowchart
17      Computation:    See Fig. 3
18      Side-effect:           yes
19      Side Effect function:   (IVR Dip)
```

FIG. 6

```
1  Module:     info_about_customer
2     Submodule of:   routing_to_skill
3     Input attributes:   account_number
4                         cust_rec 5     Output attributes:  cust_value : [1..10]
6                         frustration_score : [1..10]
7                         late_payments_score : [1..10]
8                         recent_purchases :list(tuple( date : date,
9                                                       item : 20digit,
10                                                      qty : int,
11                                                      amount: $value ))
12                        marketing_vs_collections : {"market",
13                        "collect"}
14
15    Enabling condition:   VAL(account_number)
16    Type:                 declarative
17    Side-effect:          no
```

FIG. 7

```
1  Module:    info_from_web
2     Submodule of:   routing_to_skill
3     Input attributes:   ANI
4                         home_phone
5                         account_number 6     Output attributes:  web_destinations : list(tuple(regions: set of
7                                                 {"Australia","Asia",...
8                                                 "NAmerica-US", "US"},
9                                                 itinerary:web_form_content,
10                                                date_last_modified : date ))

11    Enabling condition:   web_db_load < 95% or not VAL(account_number)

12    Type:                 foreign

13    Computation:          get_web_data(ANI, home_phone, account_number)

14    Side-effect:          no
```

FIG. 8

```
1  Module:    promo_selection
2     Submodule of:   routing_to_skill
3     Input attributes:   ANI
4                         DNIS
5                         account_number
6                         cust_rec
7                         cust_value
8                         recent_purchases
9                         frustration_score
10                        late_payments_score
11                        web_destinations
12    Output attributes:  promo_hit_list : list ( promo_message )
13    Enabling condition: cust_rec.hates_promos? = false
14    Type:               foreign
15    Computation:        get_promo_hit_list(ANI, DNIS, account_number,
16                        cust_rec, cust_value, recent_purchases,
17                        account_status, frustration_score,
18                        late_payments_score, web_destinations)
19    Side-effect:        no
```

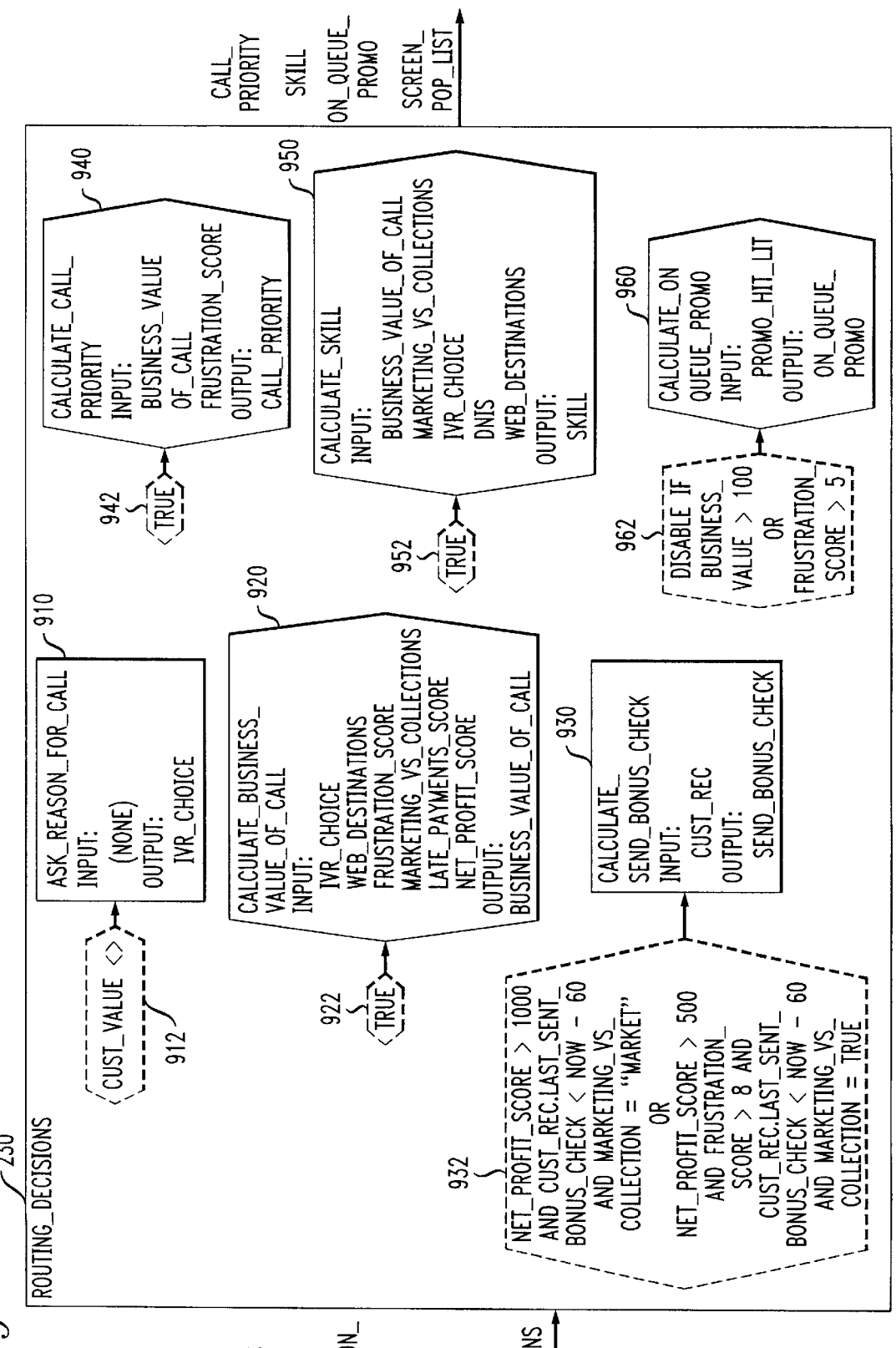

FIG. 10

```
1   Module:     routing_decisions
2      Submodule of:   routing_to_skill
3      Input attributes:    ANI
4                           DNIS
5                           account_number
6                           cust_rec
7                           cust_value
8                           recent_purchases
9                           frustration_score
10                          late_payments_score
11                          web_destinations
12     Output attributes:   call_priority : [1..4] \\corresponds to "low",
13                                  "med", "high", "top"
14                          skill : {"norm_tier_dom", "norm_tier_intl",
15                                  "australia_promo", "high_tier",
16                                      collections"}
17                          on_queue_promo : message_identifier
18                          screen_pop_list : list ( screen_entry )
19     Enabling condition:  true
20     Type:                declarative
21     Side-effect:         yes
```

FIG. 11

```
1   Module:   calculate_wrap_up
2       Submodule of:    routing_to_skill
3       Input attributes:    Ani
4                            dnis
5                            Web_DB_Load
6                            Promos_Of_The_Day
7                            Cust_Rec
8                            Home_Phone
9                            Account_Number
10                           Cust_Value
11                           Frustration_Score
12                           Late_Payments_Score
13                           Recent_Purchases
14                           Marketing_VS_Collections
15                           Web_Destinations
16                           Call_Priority
17                           Skill
18                           On_Queue_Promo
19                           Screen_Pop_List
20                           Promo_Hit_List
21      Output attributes:   wrap_up : set ( tuple ( att_name: string,
22                                                   value: string ))
23      Enabling condition:  true
24      Type:                decision
25      Computation:
26          Rules:           if true then wrap_up <- (att_name: "DNIS",
27                                           value : convert-to-string (DNIS))
28                           if true then wrap_up <- (att_name: "ANI",
29                                           value: convert-to-string (ANI))
30                           if true then wrap_up <- (att_name: "skill",
31                                           value: skill)
32                           if web_destinations not empty then wrap_up <-
33                                           (att_name: \"web_destinations",
34                                           value: (convert-to-string
35                                                   (web_destinations))
36                           if cust_rec.card_color = "gold" <-
37                                           (att_name:"frustration_score",
38                                           value: convert-to-string
39                                           (frustration_score))
40      Combining policy:    wrap-up-cp //use contributions of all
41                                           rules with true condition
42      Side-effect:         yes
43      Side-effect function:    write_into_archive ( wrap_up )
```

FIG. 12

```
1    Module:    get_recent_contacts_for_this_customer

2      Submodule of:    info_about_customer

3      Input attributes:    account_number

4      Output attributes:   recent_contacts : list ( tuple ( date: date,
5                                                  event: event_type,
6                                                  delay_during_contact: int,
7                                                   \\ minutes
8                                                  delay_before_shipment: int
9                                                   \\ days
10                                                 amount: $value ) )
11     Enabling condition:  true 12     Type:                foreign 13     Computation:         using recent_contacts_db
14                          select date,event,amount
15                          from contact_db
16                          where acct_num = account_number 17     Side-effect:         no
```

FIG. 13

```
1    Module:    get_recent_purchases_for_this_customer

2      Submodule of:   info_about_customer

3      Input attributes:   account_number

4      Output attributes:  recent_purchases : list ( tuple ( date: date,
5                                                            item : 20digit,
6                                                            qty : int,
7                                                            amount : $value ) )
8      Enabling condition:  true 9      Type:             foreign 10     Computation:      using purchase_db
11                       select date,item,qty,amount
12                       from purchases
13                       where acct_num = account_number 14     Side-effect:      no
```

FIG. 14

```
1    Module:    get_account_history_for_this_customer

2      Submodule of:    info_about_customer

3      Input attributes:    account_number

4      Output attributes:    account_history : tuple ( overdue amount:
5                                                      $value,
6                                                      number_days_overdue:
7                                                        int,
8                                                      history: list ( tuple (
9                                                        date: date,
10                                                       item : 20digit,
11                                                       amount : $value ) ) )

12     Enabling condition:    true

13     Type:    foreign

14     Computation:    using account_history_db
15                     select over_amt, num_days,history
16                     from account_history
17                     where acct_num = account_number 18     Side-effect:    no
```

FIG. 15

```
1   Module:   calculate_frustration_score

2      Submodule of:   info_about_customer

3      Input attributes:   recent_contacts

4      Output attributes:  frustration_score : [1..10]

5      Enabling condition:  VAL(recent_contacts)

6      Type:               decision

7      Computation:
8         Rules:           if recent_contacts#1 defined then
9                          frustration_score <-
10                                  (value/50) *
11                                  [(delay_during_contact/2) +
12                                  max(0,delay_before_shipment -
13                                  10)/3]

14                         if recent_contacts#2 defined then
15                         frustration_score <-
16                                  (value/100) *
17                                  [(delay_during_contact/2) +
18                                  max (0,delay_before_shipment -
19                                  10)/3]
20

21            Combining policy: frustration-score-cp  //add contributions
22                                                       of true rules and
23                                                       round up, to max
24                                                       of 10
25
26         Side-effect:    no
```

*FIG. 16*

```
1  Module:             calculate_net_profit_score
2    Submodule of:     info_about_customer
3    Input attributes: recent_contacts,
4                      recent_purchases,
5                      account_history,
6                      cust_rec
7    Output attributes: net_profit_score
8    Enabling condition: recent_purchases#1.date<=now-60
9    Type:             decision
10   Computation:
11     Rules:          if recent_purchases not empty then
12                     net_profit_score <-
13                     10% * sum (recent_purchases#i.amount
14                     where recent_purchases#i.date > now -
15                     60)

16                     if recent_contacts not empty then
17                     net_profit_score <-
18                     -( 5 * count ( recent_contacts#i
19                     where recent_contacts#i.type =
20                     "complaint"))

21                     if account_history.overdue_amount > 0
22                     then net_profit_score <-
23                     - account_history.overdue_amount *
24                     account_history.number_days_overdue / 30

25                     if cust_rec.card_color = "platinum" then
26                     net_profit_score <- 100

27                     if cust_rec.card_color = "gold" then
28                     net_profit_score <- 50

29                     if cust_rec.card_color = "green" then
30                     net_profit_score <- 10

31                     if DISABLED(cust_rec) then
32                     net_profit_score <- 20

33     Combining policy: net-profit-score-cp //add contributions
34                                            of rules with true
35                                            conditions
36
37   Side-effect:      no
```

FIG. 17

```
1   Module:            calculate_late_payment_score
2     Submodule of:    info_about_customer
3     Input attributes:   account_history
4     Output attributes:  late_payment_score
5     Enabling condition: VAL(account_history)
6     Type:               decision
7     Computation:
8       Rules:              if cust_rec.card_color = "platinum" then
9                               late_payments_score <-
10                              (account_history.overdue_amount
11                              number_of_days_overdue)/100

12                          if cust_rec.card_color = "gold" then
13                              late_payments_score <-
14                              (account_history.overdue_amount *
15                              number_of days_overdue)/50

16                          if cust_rec.card_color = "green" then
17                              late_payments_score <-
18                              (account_history.overdue_amount *
19                              number_of days_overdue)/10

20      Combining policy:   late-payment-score-cp  //rule with true
21                                                 condition wins;
22                                                 default is 0
23
24    Side-effect:        no
```

FIG. 18

```
1  Module:    calculate_cust_value
2    Submodule of:    info_about_customer
3    Input attributes:    net_profit_score,
4                        late_payments_score,
5                        cust_rec 6    Output attributes:   cust_value 7    Enabling condition:  true 8    Type:                decision 9    Computation:
10      Rules:            if VAL(net_profit_score) then cust_value <-
11                            (1 - 1/net_profit_score) * 75

12                        if cust_rec.card_color = "platinum" then
13                        cust_value <- 20

14                        if cust_rec.card_color = "gold" then cust_value
15                        <- 10

16                        if cust_rec.card_color = "green" then
17                        cust_value <- 5

18                        if VAL (frustration_score) then cust_value <-
19                        5*frustration_score 20      Combining policy: calculate-cust-val-cp  //Add values of true
21                                                 rules and round up, to
22                                                 max of 100, default is
23                                                 0
24
25   Side-effect:         no
```

FIG. 19

```
1   Module:          calculate_marketing_vs_collections
2     Submodule of:  info_about_customer
3     Input attributes:   cust_value,
4                         late_payments_score
5     Output attributes:  marketing_vs_collections
6     Enabling condition: late_payments_score > 0
7     Type:            decision
8     Computation:
9       Rules:         if late_payments_score > f(cust_value) then
10                        marketing_vs_collections <- "collect"
11                     // f is function from [1..100] into [1..10],
12                     // it could be linear, i.e., f(cust_value) =
13                     //   cust_value/10
14                     // or it could be shallower in beginning and
15                     //     steeper
16                     // towards end
17
18
19      Combining policy: marketing-vs-collection-cp //default is
20                                                   "marketing",
21                                                   any rule
22                                                   with true
23                                                   condition
24                                                   wins
25
26    Side-effect:     no
```

FIG. 20

```
1   Module: Ask_Reason_For_Call
2     Submodule of:   routing_decisions
3     Input attributes:    < none >
4     Output attributes:   IVR_choice
5     Enabling condition:  cust_value < 7 and DNIS not =
6                          "Australia_promotion"
7     Type:                foreign
8     Computation:         x := IVR_dip( question(2) ) ;
9                          if x = 1 then IVR_choice := "dom";
10                         else if x = 2 the IVR_choice := "intl";
11                         else IVR_choice[state] = EXC and
12                         IVR_choice[EXC]=1
13
14    Side-effect:         yes
15    Side-effect-function: IVR_dip( question (2) )
```

FIG. 21

```
1    Module:  calculate_business_value_of_call
2       Submodule of:   routing_decisions
3       Input attributes:    IVR_choice,
4                            web_destinations,
5                            frustration_score,
6                            marketing_vs_collections,
7                            late_payments_score,
8                            net_profit_score
9       Output attributes:   business_value_of_call : int
10      Enabling condition:  true
11      Type:                decision
12      Computation:
13         Rules:
14              if true then business_value_of_call <-
15                  (cust_value/50 * net_profit_score)

16              if true then business_value_of_call <-
17                  10*frustration_score 18              if DNIS = "Australia_promtion" then
19                  business_value_of_call <- 100

20              if "Australia" in web_destinations[i].regions for
21                  some i where
22                  web_destinations[i].date_last_modified > now -
23                  30
24                  then business_value_of_call <- 100

25              if IVR_choice = "intl" then business_value_of_call <-
26                  50

27              if marketing_vs_collections = "collect" then
28                  business_value_of_call <-
29                  (late_payments_score *
30                  account_history.overdue_amount)/5

31      Combining policy:    business-value-of-call-cp // Add contributions of
32                                                        rules with true
33                                                        conditions and round up,
34                                                        default is 0
35
36      Side-effect:         no
```

FIG. 22

```
1    Module:   Calculate_send_bonus_check

2      Submodule of:    routing_decisions

3      Input attributes:      cust_rec

4      Output attributes:     send_bonus_check?

5      Enabling condition:    if net_profit_score > 1000
6                               and cust_rec.last_sent_bonus_check < now - 60
7                               and marketing_vs_collections = "market"
8                             OR
9                             if net_profit_score > 500
10                              and frustration_score > 8
11                              and cust_rec.last_sent_bonus_check < now - 60
12                              and marketing_vs_collections = "market"
13

14     Type:             foreign

15     Side-effect:          yes 16         side-effect-function:

17              issue_and_send_check($50,cust_rec.name,cust_rec.address)
```

FIG. 23

```
1   Module: call_priority

2     Submodule of:    routing_decisions

3     Input attributes:   business_value_of_call
4                         frustration_score 5     Output attributes:  call_priority 6     Enabling condition: true 7     Type:               decision 8     Computation:
9       Rules:            if business_value_of_call < 25 then
10                             call_priority <- 1

11                        if 25 =< business_value_of_call < 100 then
12                             call_priority <- 2

13                        if 100 =< business_value_of_call < 500 then
14                             call_priority <- 3

15                        if 500 =< business_value_of_call then
16                             call_priority <- 4

17                        if frustration_score > 8 then
18                             call_priority <- 4

19                        if 6 =< frustration_score <= 8 then
20                             call_priority <- 3

21          Combining policy: call-priority-cp // high value wins with
22                                              default result 2
23
24    Side-effect:        no
```

FIG. 24

```
1  Module:  calculate_skill
2    Submodule of:    routing_decisions
3    Input attributes:        business_value_of_call
4                             marketing_vs_collections
5                             IVR_choice
6                             DNIS
7                             web_destinations
8    Output attributes:       skill
9    Enabling condition:      true
10   Type:          decision
11   Computation:
12       Rules:      if marketing_vs_collections = "collections"
13                      then skill <- ["collections", infinity]
14
                      if business_value_of_call > 100
15                      then skill <- ["high_tier", 40]

16                    if DNIS = "australia_promotion" then
17                       skill <- ["australia_promo", infinity]

18                    if "Australia" in web_destinations[i].regions
19                       for some i where web_destinations[i].date_last_modified >
20                       now - 30 then
21                       skill <- ["australia_promo", 20]

22                    if cust_rec.estimated_income_bracket = ">100K-150K" then
23                       skill <- ["australia_promo", 25]
24
25                    if cust_rec.estimated_income_bracket = ">150K" then
26                       skill <- ["australia_promo", 35]
27
28                    if IVR_choice = "dom" then skill <- ["norm_tier_dom",30]
29
30                    if IVR_choice = "intl" then skill <- ["norm_tier_intl",30]
31
32                    if "US" in web_destinations[i].regions for some
33                       i where web_destinations[i].date_last_modified >
34                       now - 30 then
35                       skill <- ["norm_tier_dom", 20]
36
37                    if "US" not in web_destinations[i].regions for
38                       some i where web_destinations[i].date_last_modified > now -
39                       30 then
40                       skill <- ["norm_tier_intl", 20]

41       Combining policy: skill-cp //weighted sum policy, and ties are
42                         broken by ordering "collections",
43                         "australia_promo", "high_tier",
44                         "low_tier_intl", "low_tier_dom",
45                         default is ⊥
46
47   Side-effect:   no
```

FIG. 25

```
1  Module:  calculate_on_queue_promo

2      Submodule of:   routing_decisions

3      Input attributes:      promo_hit_list

4      Output attributes:     on_queue_promo

5      Enabling condition:    DISABLE if business_value > 100 or 6  frustration_score > 5

7      Type:            decision

8      Computation:
9          Rules:             if 60 < ACD.expected_wait_time(skill)
10                                then on_queue_promo <-
11                                promo_hit_list[#1]

12                             if business_value_of_call < 30
13                                then on_queue_promo <- promo_hit_list[#1]

14         Combining policy:  on-queue-promo-cp // first true wins, default
15                                               is 0
16
17     Side-effect:           no
```

FIG. 27

| Rule | Name |
|---|---|
| $\dfrac{\sigma \vdash e : t}{\sigma \vdash \text{value}(e) : \text{bool}}$ | VALUE |
| $\dfrac{\sigma \vdash f : AM : t_1 \times \ldots \times t_n \to t,\ \sigma \vdash e_1 : t_1,\ \ldots\ \sigma \vdash e_n : t_n}{\sigma \vdash \text{Apply}(\langle f, e_1, \ldots, e_n \rangle) : t}$ | APPLY |
| $\dfrac{\sigma \vdash e_1 : t_1,\ \ldots\ \sigma \vdash e_n : t_n}{\sigma \vdash \langle e_1, \ldots, e_n \rangle : \langle a_1 : t_1, \ldots, a_n : t_n \rangle}$ | TUPLING |
| $\dfrac{\sigma \vdash e_1 : t,\ \ldots,\ \sigma \vdash e_n : t}{\sigma \vdash \{e_1, \ldots, e_n\} : \{t\}}$ | BAGGING |
| $\dfrac{\sigma \vdash e_1 : t,\ \ldots,\ \sigma \vdash e_n : t}{\sigma \vdash [e_1, \ldots, e_n] : [t]}$ | LISTING |
| $\dfrac{\sigma \vdash e : \{t\}}{\sigma \vdash \text{unitval}(e) : t}$ | UNITVAL |
| $\dfrac{\sigma \vdash \langle a_1 : t_1, \ldots, a_n : t_n \rangle}{\sigma \vdash e.a_i : t_i}$ | PROJECTION ON TUPLES |
| $\dfrac{\sigma \vdash e : [t]}{\sigma \vdash e\#i : t}$ | PROJECTION ON LISTS |
| $\dfrac{\sigma \vdash e_1 : [t_1],\ \sigma \vdash e_2 : t_2}{\sigma \vdash \text{factor}(e_1, e_2) : [\langle f\_a : t_1, s\_a : t_2 \rangle]}$ | FACTOR (ON LISTS) |
| $\dfrac{\sigma \vdash e_1 : \{t_1\},\ \sigma \vdash e_2 : t_2}{\sigma \vdash \text{factor}(e_1, e_2) : \{\langle f\_a : t_1, s\_a : t_2 \rangle\}}$ | FACTOR (ON BAGS) |
| $\dfrac{\sigma \vdash f : t_1 \to t,\ \sigma \vdash S : [t_1]}{\sigma \vdash \text{map}(f)(S) : [t]}$ | MAP (ON LISTS) |
| $\dfrac{\sigma \vdash f : t_1 \to t,\ \sigma \vdash S : \{t_1\}}{\sigma \vdash \text{map}(f)(S) : \{t\}}$ | MAP (ON BAGS) |
| $\dfrac{\sigma \vdash id_\theta : t,\ \sigma \vdash \theta : t \times t \to t,\ \sigma \vdash S : \{t\}}{\sigma \vdash \text{collect}(id_\theta, \theta)(S) : t}$ | COLLECT (ON BAGS) |
| $\dfrac{\sigma \vdash id_\theta : t,\ \sigma \vdash \theta : t \times t \to t,\ \sigma \vdash S : [t]}{\sigma \vdash \text{collect}(id_\theta, \theta)(S) : t}$ | COLLECT (ON LISTS) |

FIG. 34A

*Global variables:*

*These variables are global to the whole execution of workflow instance* — 3402

- $G$: a dependency graph
- $S$: set of source attribute nodes of $G$
- $T$: set of target attribute nodes of $G$
- $\sigma[\,]$: array of attribute states
- $\mu[\,]$: array of attribute values
- $\alpha[\,]$: array of three valued logic values (*true, false unknown*)
- *HIDDEN_EDGE*: set of hidden edges of $G$.
- *HIDDEN_ATT*: set of hidden attribute nodes of $G$.

*Notations:*

- $\sigma[A]$: element of array $\sigma[\,]$ that corresponds to the attribute node $A$ in $G$
- $\mu[A]$: element of array $\mu[\,]$ that corresponds to the attribute node $A$ in $G$
- $\alpha[p]$: element of array $\alpha[\,]$ that corresponds to the condition node $p$ in $G$

Initialization phase:
procedure Init:
  *Input:*
    g: a dependency graph:
    So: source nodes in g
    Te: terminal nodes in g
  *body:*
  BEGIN init
    G:=g ; S: = So; T: = Te;    ⎫
    /*Initialization of the states and values of attributes nodes */
    FOR all the attribute nodes A in G DO
      IF A ∈ S  /* A is a source node */
        THEN σ [A] := READY + ENABLED
        ELSE σ [A] := UNITIALIZED;
      μ [A] :=NULL;               ⎬ 3406
    END FOR                       
    /* Initialization of α-values of condition nodes */
    FOR all the condition nodes p in G DO
      α[A] := *unknown*;           ⎬ 3408
    END FOR                        
    /* Initialization of the set of hidden edges and hidden nodes */
    HIDDEN_EDGE:=∅; HIDDEN_ATT:=∅  ⎬ 3410
  END init                         ⎭ 3412

FIG. 34B

Increment
*Input:*
  A : an attribute in G.
  v : a value for A.
*body:*
  BEGIN increment
    μ [A] := v;
    IF σ [A] = READY
      THEN propagate_att_change(A, COMPUTED)
    IF σ [A] = READY+ENABLED
      THEN propagate_att_change(A, VALUE)
  END Increment propagate_att_change
*Input:*
  B : an attribute in G.
  σ : a state for B
*body:*
/* Set state for B*/
IF (((σ[B] = ENABLED) AND (σ = READY)) OR ((σ[B] = READY) AND (σ =ENABLED)))
  THEN σ [B] := READY+ENABLED
  ELSE σ [B] := σ;

FIG. 34B (cont)

```
                                                                    ~3422
                                                                    ~3428
/* push relevant information to the affected successor nodes */
CASE : σ [B] ∈ {VALUE, COMPUTED}  /* The value of B is computed */      ~3430
    /* try to evaluate predicate nodes that are using the value of B */
    FOR each condition node p of the form pred(t₁,...,tₙ) such that (B,p) ∈ G DO   ~3432
        IF (B,p) ∉ HIDDEN_EDGE   ~3434
        THEN
            Hide_edge((B,p));   ~3436
            IF Eval(p) ≠ unknown THEN α [p] :=Eval(p); propagate_cond_change(p);   ~3438
    END FOR
    /* check if the attributes nodes that have B as input parameters are READY */
    IF σ [B] =VALUE THEN
        FOR each attribute node C such that (B, C) ∈ G DO
            IF (B, C) ∉ HIDDEN_EDGE
            THEN
                Hide_edge((B,C));
                IF there exists no attribute node D such that (D, C) ∉ HIDDEN_EDGE
                THEN propagate_att_change (C READY);
    END FOR
CASE : σ [B] = ENABLED                                                  ~3440
    /* evaluates condition nodes of the form VALUE (B) and DISABLED (B) */
    FOR each condition node p of the form VALUE (B) or DISABLED (B) such that (B,p) ∈ G DO   ~3442
        IF (B,p) ∈ HIDDEN_EDGE
        THEN
            Hide_edge((B,p));
            IF p is of the form VALUE (A) THEN α [p] := true ELSE α [p]: = false;
            propagate_cond_change(p);
```

FIG. 34C

```
        END FOR
      CASE: σ [B] = DISABLED
        /* evaluate condition nodes of the form VALUE (B) and DISABLED (B) */
        FOR each condition node p of the form VALUE (B) or DISABLED (B) such that (B,p) ∈ G DO    ⎱ 3444
          IF (B,p) ∉ HIDDEN_EDGE
            THEN
              Hide_edge ((B,p));
          IF p is of the form VALUE (A) THEN α[p] := false ELSE α[p] := true;
          propagate_cond_change(p);
        END FOR
        /* check if the attribute nodes that have B as input parameters are READY */
        FOR each attribute node C such that (B,C) ∈ G DO    ⎱ 3446
          IF (B,C) ∉ HIDDEN_EDGE
            THEN
              Hide_edge((B,C));
          IF there are no more attribute nodes D such that (D,C) ∉ HIDDEN_EDGE
            THEN propagate_att_change (C,READY);
        END FOR
        /* If the attribute is stable then hide the attribute */
        IF (σ[B] ∈ {DISABLED, VALUE}) THEN Hide_node(B);    ⎿ 3448
      END propagate_att_change
```

FIG. 34C propagate_cond_change
Input:
    p: a condition node in G.
body:
BEGIN propagate_cond_change — 3452
let n be the successor of p in G
IF (p,n) ∉ HIDDEN_EDGE
THEN
    Hide_edge ((p,n)); — 3456
    CASE: n is OR condition node
        IF (α[p] = true) THEN α[n] := true; propagate_cond_change(n); END IF; — 3460
        IF α[p] = false AND for each condition node p' where (p',n) ∈ G, (p',n) ∈ — 3462
HIDDEN_EDGE
            THEN α[n] := false; propagate_cond_change(n);END IF;
    CASE: n is a AND node
        IF (α[p] = false) THEN α[n] := false; propagate_cond_change(n); END IF; — 3466
        IF α[p] = TRUE AND for each condition node p' where (p',n) ∈ G, (p',n) ∈ — 3468
HIDDEN_EDGE
            THEN α[n] := TRUE; propagate_cond_change(n);END IF;
    CASE: n is NOT node
        α[n]: = ¬(α[p]) ; propagate_cond_change(n); — 3470
    CASE: n is an attribute node
        IF (α[p] = true)
            THEN propagate_att_change(n,ENABLED) — 3472
            ELSE propagate_att_change(n,DISABLED);
END propagate_cond_change

FIG. 34D

Hide_edge
*Input*
  $(n,n')$ : an edge in $G$.
*body*
BEGIN Hide_edge
  $HIDDEN\_EDGE := HIDDEN\_EDGE \cup \{(n,n')\}$;
  IF (there are no more edges $(n,n'') \in G$ such that $(n,n'') \notin HIDDEN\_EDGE$
    THEN Hide_node(n)
END Hide_edge — 3474

Hide_node
*Input*
  $n$ : a node in $g$.
*body*
BEGIN Hide_node
  $HIDDEN\_ATT := HIDDEN\_ATT \cup \{n\}$
  FOR each edge $(n',n) \in g$ such that $(n',n) \notin HIDDEN\_EDGE$) DO
    Hide_edge $(n',n)$
  END FOR
END Hide_node — 3476

Global variables:

These variables are global to the whole execution of workflow instance

G : a dependency graph
S : set of attribute nodes of G /* this set contains the source nodes */
T : set of attribute nodes of G /* this set contains target nodes */     ─ 3504
σ [] : array of attribute states
α [] : array of three valued logic values (true, false unknown)
HIDDEN_EDGE : set of edges of G.
HIDDEN_ATT : set of attribute nodes of G.

T_N[][] : Matrix of integers that associates an integer value to each pair (p,A) where p is a condition node and A is an attribute node in G
/* T_N[p][A] = 0 means that the attribute A is True_necessary for the condition node p */

F_N[][] : Matrix of integers that associates an integer value to each pair (p,A) where p is a condition node and A is an attribute node in G
/* F_N[p][A] = 0 means that the attribute A is False_necessary for the condition node p */

V_N[][] : Matrix of integers associates an integer value to each pair (B,A) where B and A are attribute nodes in G
/* V_N[B][A] = 0 means that the attribute A is Value_necessary for the attribute note B */

FIG. 35A
(cont.)

$S\_N$ [][] : Matrix of integers associates an integer value to each pair $(B,A)$ where
$B$ and $A$ are attribute nodes in $G$
/*$S\_N[B][A]$ = 0 means that the attribute $A$ is Stable_necessary for the attribute node $B$ */ ⎯⎯ 3502

$N[]$ : Array of boolean
$N[A]$ = *true* means that the attribute $A$ is computed as necessary/*
$N[A]$ = *false* means that the attribute $A$ is not computed as necessary*/

Notations:

$nb\_pred(p)$ : number of predecessors of $p$ in $G$

Initialization phase:
procedure Init :
Input:
  $g$ : a dependency graph:
  $So$ : source nodes in $g$
  $Te$ : terminal nodes in $g$
body:
BEGIN N_init ⎯⎯ 3506

```
Init()  ~3508

/* Initialization of T_N,F_N,S_N,V_N */
FOR all the condition nodes p in G DO
  FOR all the attribute nodes A in G DO CASE : p is an OR node:
      T_N[p][A] := nb_pred(p);        /* rule 1 */    ~3511
      F_N[p][A] := 1;                  /* rule 2 */

CASE : p is an AND node:
      T_N[p][A] := 1;                  /* rule 3 */
      F_N[p][A] := nb_pred(p);        /* rule 4 */

CASE : p is a NOT node:
      T_N[p][A] := 1;                  /* rule 5 */
      F_N[p][A] := 1;                  /* rule 6 */

CASE : p is a node of the form VAL(B) or DIS(B):
      T_N[p][A] := 1;                  /* rules 7 and 9 */
      F_N[p][A] := 1;                  /* rules 8 and 10 */

CASE: p is a node of the form pred(t_1,...t_n):
      T_N[p][A] := 1;                  /* rule 11 */
      F_N[p][A] := 1;                  /* rule 12 */

END FOR
END FOR
```
~3510

*FIG. 35B*
*(cont.)*

```
    FOR all the attributes nodes A in G DO
      FOR all the attribute nodes B in G DO          ⎫
        S_N[A][B] := 1; V_N[A][B] := 1                ⎬ ~3512
      END FOR                                         ⎭
    END FOR FOR all the attributes nodes A in G DO    ⎫
      N[A] := false                            ⎬ ~3513
    END FOR                                    ⎭

END N_init
```
                                                                    ~3506

N-Increment
*Input:*
  A : an attribute in G.
  v : a value for A.
*Variables:* /* Global to one execution of the increment phase (for one execution step) */ prev_E: set of attribute nodes
          /* used to store the nodes that were READY+ENABLED or ENABLED (in a   ⎫
             previous execution of N-increment) */                              ⎬ ~3518 prev_HIDDEN_EDGE: /* set of edges*/
                   used to store the edges that were previously hidden (in the previous steps) */

~3526

FIG. 35C prev_T_N: set of pairs (p,A) where p is a condition node and A is an attribute node
/* used to denote the elements of $T\_N[p][A]$ that were set to 0 in a previous execution of N-increment*/  ~3518 prev_F_N: set of pairs (p,A) where p is a condition node and A is an attribute node
/* used to denote the elements of $F\_N[p][A]$ that were set to 0 in a previous execution of N-increment*/

Δ_E: set of attribute nodes
/* used to store the new ENABLED or READY+ENABLED attribute nodes that were neither ENABLED nor READY+ENABLED in the previous steps. */  ~3520

Δ_HIDDEN_EDGE: set of edges
/* used to store the new hidden edges */ new_V_N : set of pair (A,A) where A is an attribute node
/* used to store the positions of elements of $V\_N[][]$ whose new value is zero due to case 1 */ new_S_N : set of pair (B,A) where B and A are attribute nodes
/* used to store the positions of elements of $S\_N[][]$ whose new value is zero due to case 2 */ new_T_N : set of pair (p,A) where p is a predicate node and A is an attribute node
/* used to store the positions of elements of $T\_N[][]$ whose new value is zero due to some new hidden edges (case 3) */ new_F_N : set of pair (p,A) where p is a predicate node and A is an attribute node
/* used to store the positions of elements of $F\_N[][]$ whose new value is zero due to some new hidden edges (case 4) */  ~3522

```
body:
BEGIN N_increment

/* preparation step: */
prev_HIDDEN_EDGE := HIDDEN_EDGE;
prev_E := {A|A is an attribute node in G and σ [A] ∈ {READY+ENABLED, ENABLED}}           ⎫
                                                                                         ⎬ 3524
Increment(A,v)  ⎯ 3526                                                                   ⎭

/* Instigation step : Compute new necessary properties according to the instigation
cases*/

Case 1:                                                                                  ⎫
Δ_E := {A|A is an attribute node in G and σ [A] ∈ {READY+ENABLED, ENABLED}               ⎪
       and A ∉ prev_E}                                                                   ⎪
new_V_N := ∅;                                                                            ⎬ 3528
FOR each attribute node A in Δ_E DO                                                      ⎪  ⎫
   V_N[A][A] := 0; new_V_N := new_V_N ∪ {(A,A)}/* a node is value_necessary for          ⎪  ⎬ 3530
   itself*/                                                                              ⎪  ⎭
END FOR                                                                                  ⎭
```

Case 2:
$new\_S\_N := \emptyset$;
FOR each attribute node $B$ in $\Delta\_E$ DO
  FOR each attribute node in $A$ in $G$ such that $\sigma[A] \in \{READY+ENABLED,$
  ENABLED$\}$ DO
    IF $V\_N[B][A] = 0$ and $S\_N[B][A] = 1$
    THEN $S\_N[B][A] = 0$; $new\_S\_N := new\_S\_N \cup \{(B,A)\}$ /* rule (13)\*/
    END FOR
  END FOR

—3534

$\Delta\_HIDDEN\_EDGE := HIDDEN\_EDGE - prev\_HIDDEN\_EDGE$
$prev\_T\_N := \{(p,A) \mid T\_N[p][A] = 0 \}$
$prev\_F\_N := \{(p,A) \mid F\_N[p][A] = 0 \}$
$new\_T\_N := \emptyset$;
$new\_F\_N := \emptyset$;

FOR all edges $(n,p) \in \Delta\_HIDDEN\_EDGE$ such that $p \notin HIDDEN\_ATT$ and $p$ is a
condition node DO
  FOR all attribute nodes $A$ such that $\sigma(A) \notin \{COMPUTED, VALUE, DISABLED\}$
  DO

—3536

CASE: 3
CASE : $p$ is an OR node:
IF $(n,A) \notin prev\_T\_N$
THEN
  $T\_N[p][A] := T\_N[p][A] - 1$;  /\* rule (1)\*/
  IF $T\_N[p][A] = 0$ THEN $new\_T\_N := new\_T\_N \cup \{(p,A)\}$

FIG. 35E

CASE: 4
CASE : p is an AND node :
IF (n,A) ∉ prev_F_N /* same reasoning as for OR nodes but with rule 4*/
THEN
    $F\_N[p][A] := F\_N[p][A] -1$;   /*rule(4)*/
    IF $F\_N[p][A] = 0$ THEN $new\_F\_N := new\_F\_N \cup \{(p,A)\}$
END FOR
END FOR

FIG. 35E (cont.)

```
/* Propagation step */
New_propagate(new_V_N, new_S_N, new_T_N, new_F_N)          ~3540
END N_Increment New_propagate
Input:
  new_V_N : set of pairs (A,A) where A is an attribute node
  new_S_N : set of pairs (B,A) where B and A are attribute nodes
  new_T_N : set of pairs (p,A) where p is a condition node in G and A is an attribute
           node
  new_F_N : set of pairs (p,A) where p is a condition node in G and A is an attribute
           node
body:
FOR each pair (A,A) in new_V_N DO                                    ~3542
    propagate_V_N(A,A)
    FOR each attribute node B such that (A,B) ∈ G and (A,B) ∉ HIDDEN_EDGE  ~3544
        V_N[B][A] := 0; propagate_V_N(B,A)/* rule (16) */            ~3546
    END FOR
END FOR
FOR each pair (B,A) in new_S_N DO
    propagate_S_N(B,A)
END FOR
FOR each pair (p,A) in new_T_N DO
    propagate_T_N(p,A)
END FOR
FOR each pair (p,A) in new_F_N DO
    Propagate_F_N(p,A)
END FOR
END N-propagate
```

FIG. 35F

```
propagate_V_N
Input:
    B : an attribute node in G.
    A : an attribute node in G./* A in newly Value_necessary for B */
body:
    IF σ[B] = ENABLED and S_N[B][A] = 1                          /*rule (13)*/
        THEN S_N[B][A] = 0; propagate_S_N(B,A)
    ELSE let p be the condition node such that (p,B) ∈ G.        /*rule (14)*/
        IF F_N[p][A]=0 and S_N[B][A] = 1
            THEN S_N[B][A] = 0; propagate_S_N(B,A)
    END IF
    FOR each condition node p of the form pred(t_1,...,t_n)
        such that (B,p) ∈ g and (B,p) ∉ HIDDEN_EDGE DO
        IF T_N[p][A] = 1                                         /*rule (11)*/
            THEN T_N[p][A] := 0;propagate_T_N(p,A)
        IF F_N[p][A] = 1                                         /*rule (12)*/
            THEN F_N[p][A] :=0;propagate_F_N(p,A)
    END FOR
END propagate_V_N propagate_S_N
Input:
    B : an attribute node in G.
    A : an attribute node in G./* A is newly Stable_necessary for B */
body:
    FOR each attribute node C such that (B,C) ∈ g and (B,C) ∉ HIDDEN_EDGE DO
        IF V_N[C][A] = 1 THEN V_N[C][A] := 0;propagate_V_N(C,A) /* Rule 17 */
    END FOR
    IF B ∈ T THEN N[A] := =true
END propagate_S_N
```

FIG. 35F (cont.)

```
propagate_F_N
Input:
    p : a condition node in G.
    A : an attribute node in G./* A is newly False_necessary for p */
body:
    let n be the successor of p in G
    IF (p,n) ∉ HIDDEN_EDGE
    THEN
        CASE : n is an OR or AND node
            IF F_N[n][A] > 0
            THEN
                F_N[n][A] := F_N[n][A] - 1;              /*rules (2) and (4)*/
                IF F_N[n][A] = 0 THEN propagate F_N (n,A)
        CASE : n is a NOT node
            IF T_N[n][A] = 1 THEN T_N[n][A] :=0;propagate_T_N(n,A) /*rule (6)*/
        CASE : n is an attribute node
            IF (T_N[p][A] = 0 or V_N[n][A] = 0 and S_N(n,A) = 1
            THEN S_N[n][A] = 0;propagate_S_N(n,A)        /*rules (14) and (15)*/
            FOR each condition node p' of the form VALUE (n)
                such that (n,p') ∈ g and (n,p') ∉ HIDDEN_EDGE DO
                    IF F_N[p'][A] = 1 THEN F_N[p'][A] :=0;propagate_F_N(p',A) /*rule (8)*/
            END FOR
            FOR each condition node p' of the form DISABLED (n)
                such that (n,p') ∈ G AND (n,p') ∉ HIDDEN_EDGE DO
                    IF T_N[p'][A] = 1 THEN (T_N[p'][A] :=0;propagate_T_N(p',A) /*rule (10)*/
            END FOR
END propagate_F_N
```

FIG. 35G

```
propagate_T_N
Input:
  p : a condition node in G.
  A : an attribute node in G/* A is newly True_necessary for p */
body:
  let n be the successor of p in G
  IF (p,n) ∉ HIDDEN_EDGE
  THEN
    CASE : n is an OR or AND node
      IF T_N[n][A]>0
      THEN
        T_N[n][A] := T_N[n][A] - 1;   /*rules (1) and (3)*/
        IF T_N[n][A] = 0 THEN propagate_T_N(n,A)
    CASE : n is a NOT node
      IF F_N[n][A] = 1 THEN F_N[n][A] := 0; propagate_F_N(n,A)   /*rule (5)*/
    CASE : n is an attribute node
      IF F_N[p][A] = 0 and S_N[n][A] = 1
      THEN S_N[n][A] :=0;propagate_S_N(n,A)   /*rule (15)*/
      FOR each condition node p' of the form VALUE(n)
        such that (n,p') ∈ G and (n,p') ∉ HIDDEN_EDGE DO
        IF T_N[p'][A] = 1 THEN
          T_N[p'][A] := 0;propagate_T_N(p',A)   /*rule (8)*/
      END FOR
      FOR each condition node p' of the for DISABLED (n)
        Such that (n,p') ∈ G and (n,p') ∉ HIDDEN_EDGE DO
        IF F_N[p'][A] = 1 THEN
          F_N[p'][A] :=0;propagate_F_N(p',A)   /*rule (9)*/
      END FOR
END propagate_T_N
```

FIG. 38

|   | A | B | C | D | E |
|---|---|---|---|---|---|
| 1 | source | | get_recent_contacts_... (node 504) | get_recent_purchases_... (node 508) | get_account_history_... (node 512) |
| 2 | | | foreign module | foreign module | foreign module |
| 3 | cust_rec | account_number | recent_contacts | recent_purchases | account_history |
| 4 | <"John Doe", "101 Ash, LA", "gold", FALSE, SV ...> | 421135 SV | NS | NS | NS |
| 5 | | | ENABLED + READY | ENABLED + READY | ENABLED + READY |
| 6 | | | | | |
| 7 | | | | | |
| 8 | | | | | |
| 9 | | | | | |
| 10 | | | | | |

FIG. 38 (cont)

| F | G | H | I | J |
|---|---|---|---|---|
| calculate_ frustration_ score (node 516) | calculate_ net_profit_ score (node 520) | calculate_ late_payments_ score (node 524) | calculate cust_value (node 528) | calculate_ marketing_vs_ collections (node 532) |
| "add contribs. of true rules and round up, to max of 10" | "add contribs. of true rules" | "true rule wins; default is 0" | "add contribs. of true rules and round up, to max of 100" | "any true rule gives collect; default is marketing" |
| frustration_ score | net_profit_ score | late_ payment_ score | cust_ value | marketing_ vs_ collections |
| NS | NS | NS | NS | NS |
| READY | READY | READY | ENABLED + READY | READY |
| READY | READY | ⊥ | READY | "collect" C-C |
| READY | READY | condition true | ⊥ | |
| | READY | ⊥ | 10 C-V | |
| | ⊥ | | ⊥ | |
| | 50 C-V | | READY | |

FIG. 39 (cont)

| F | G | H | I | J |
|---|---|---|---|---|
| calculate_ frustration_ score (node 516) | calculate_ net_profit_ score (node 520) | calculate_ late_payments_ score (node 524) | calculate cust_value (node 528) | calculate_ marketing_vs_ collections (node 532) |
| "add contribs. of true rules and round up, to max of 10" | "add contribs. of true rules" | "true rule wins; default is 0" | "add contribs. of true rules and round up, to max of 100" | "any true rule gives collect; default is marketing" |
| frustration_ score | net_profit_ score | late_ payment_ score | cust_ value | marketing_ vs_ collections |
| NS | ⊥ SV | 9 SV | NS | NS |
| READY | DISABLED | VALUE | ENABLED + READY | ENABLED + READY |
| READY | ⊥ | ⊥ | ⊥ | "collect" C-C |
| READY | READY | 9 C-V | ⊥ | |
| | -9 C-V | ⊥ | 10 C-V | |
| | ⊥ | | ⊥ | |
| | 50 C-V | | READY | |

FIG. 40A

<u>Initialization</u>
   Based on the DL specification, compute rows 1, 2, and 3 of the display; — 4002
   For source attribute cells or row 4 do:
      For each source attribute with value, insert value and apply
"attribute_value_indication";    — 4004
      For each source attribute that is disabled, apply
"attribute_disabled_indication";
   For each non-decision module
      In row 5, apply "module_uninitialized_indication";
      In row 4, apply "attribute_uninitialized_indication";    — 4006
   For each decision module
      In row 5, apply "module_ready_indication";
      In row 4, apply "attribute_uninitialized_indication";    — 4008
   For each cell in rows 6,7,8,..,apply "rule_ready_indication" — 4010

<u>Iteration</u>
   For each event of execution engine do
   Case on event_type
      non_dec_module_enabled:
         in row 5, apply "module_enabled_indication"; — 4012 non_dec_module_ready:
         in row 5, apply "module_ready_indication"; — 4014 non_dec_module_ready+enabled:
         in row 5, apply "module_ready+enabled_indication"; — 4016 non_dec_module_computed:
         in row 5, apply "module_computed_indication";
         in row 4, label corresponding attribute cell with the value computed — 4018
and apply
            "attribute_computed_indication";

non_dec_module_value:
         in row 5, label cell for this module as "value" and apply
"module_value_indication";
         in row 4, label corresponding attribute cell with value assigned and — 4020
apply
            "attribute_value_indication"

FIG. 40B non_dec_module_disabled:
    in row 5, label cell for this module as "disabled" and apply
        "module_disabled_indication";
    in row 4, label corresponding attribute cell with "⊥" and apply
        "attribute_disabled_indication"
    — 4022 dec_module_enabled+ready:
    in row 5, label cell with "enabled+ready" and apply
        "module_enabled+ready_indication";
    — 4024 dec_module_computed:
    in row 5, label cell with "computed" and apply
    "module_computed_indication";
    in row 4, label cell with the computed value and apply
        "attribute_computed_indication";
    — 4026 dec_module_value:
    in row 5, label cell with "value" and apply
    "module_value_indication";
    in row 4, label cell with the computed value and apply
"attribute_value_indication";
    — 4028 dec_module_disabled:
    in row 5, label cell with "disabled" and apply
        "module_disabled_indication";
    in row 4, label cell with "⊥" and apply
"attribute_disabled_indication";
    — 4030 comp_rule_condition_true:
    to corresponding cell, apply "rule_cond_true_indication";
    — 4032 comp_rule_contribution_computed:
    to corresponding cell, label with computed value and apply
        "rule_contribution_computed_indication";
    — 4034 comp_rule_contributed_value:
    to corresponding cell, label with computed value and apply
        "rule_contributed_value_indication";
    — 4036 comp_rule_condition_false:
    to corresponding cell, label with "⊥" and apply
"rule_condition_false_indication";
    — 4038

EndCase

DECLARATIVE WORKFLOW SYSTEM SUPPORTING SIDE-EFFECTS

CROSS REFERENCE TO RELATED APPLICATIONS

This application is related to U.S. patent application Ser. No. 09/251,998, entitled Eager Evaluation of Tasks in a Workflow System; U.S. patent application Ser. No. 09/253,190, entitled Data Item Evaluation Based on the Combination of Multiple Factors; and U.S. patent application Ser. No. 09/253,674, entitled Dynamic Display of Data Item Evaluation; all of which were filed on Feb. 19, 1999.

FIELD OF THE INVENTION

The present invention relates to computer implemented workflow systems.

BACKGROUND OF THE INVENTION

A workflow specification is a description of how a class of objects should be handled. Such objects may be, for example, an incoming call to a call center, insurance claims arriving at a claim center, requests for information from an Internet web site, etc. The workflow specification describes how agents (humans) and/or components (software and hardware) interact to accomplish specific goals. Such components generally include components which are external to the workflow system. The present invention is concerned with workflow specifications executing on computer systems in order to implement workflow systems.

There is an increasing need to customize workflow systems based on a combination of information about the object being processed and the current operational status of the system. Such customization is complex as it often depends on various parameters. For example, in a workflow system implementing a call center which requires a customer credit check, there may be several types of credit checks, ranging from simple to complex, which could be selected for a particular customer. The specific type of credit check chosen could depend on a number of parameters, such as past experience with the particular customer, the amount of credit requested, etc.

Most current workflow systems are based on procedural specifications. In a procedural specification, the specification explicitly states the steps to be taken during workflow execution and the sequence of those steps. Such procedural workflow specifications may be represented using flowcharts, text based descriptions, or a combination of text and flowcharts. A procedural workflow may be specified using well known computer programming languages, such as C++.

One problem with the procedural specification of workflow systems is that modifications to the workflow specification may be difficult. As a result of the nature of procedural specifications, a modification to change one aspect of how an object is processed may require changes to many parts of the specification which implement that aspect. This is because one aspect of the workflow may depend on many execution threads within the procedural specification. Another problem with procedural specifications is that they are difficult to analyze because the resulting workflow execution may depend on many execution threads.

One solution to the problem of procedural specification of workflows is described in Narayanan Krishnakumar and Amit Sheth, *Managing Heterogeneous Multi-system Tasks to Support Enterprise-wide Operations,* Distributed and Parallel Databases, 3, 1–33 (1995). In the workflow system described therein, the flow of control is specified using rules having the form "event-condition-action", such that when a certain event occurs, if the condition is true, then the specified action is performed. As such, whether or not an action is performed is dependent on a condition being true at the time an event occurs, where the event may be, for example, the completion of some action. Thus, these rules are, at least implicitly, dependent on the duration of actions because the evaluation of whether a condition is true may depend on when an action completes. While this type of system provides some advantages over the purely procedural specification of workflows, the above described time dependence results in many of the same problems. Specifically, workflows described in this manner are difficult to analyze and understand.

U.S. Pat. No. 5,809,212 entitled Conditional Transition Networks and Computational Processes for Use Interactive Computer-Based Systems, is directed to a conditional transition network for representing a domain of knowledge in a computer system. Although the system described therein utilizes time independent rules for processing, the system is not a workflow system, but instead is directed to accessing stored information (e.g. documents). As such, the system does not control external components and is therefore not appropriate for a workflow system because most workflow systems require control of external components for the processing of objects.

SUMMARY OF THE INVENTION

The present invention is a workflow system which, as a result of certain properties, is an improvement over prior workflow systems. One such property is that the workflow system in accordance with the invention is specified declaratively, such that the workflow specification explicitly describes the steps to be taken during workflow execution, but the order of those steps is implicit in the specification. In addition, the specification includes modules which, when executed, result in the initiation of side-effect actions which are performed by components external to the workflow system. Whether or not the modules are executed is determined by associated enabling conditions which are independent of the time duration of module execution. The set of data flow dependencies and enabling flow dependencies between the modules and the enabling conditions is acyclic.

As will be apparent to those of ordinary skill in the art by reference to the following detailed description and the accompanying drawings, a workflow system designed in accordance with the present invention improves on prior workflow systems in several respects. First, since the specification is declarative, aspects of the workflow can be easily modified by changing the part of the specification which implements the aspect, rather than having to modify many parts of a procedural specification as in prior workflow systems. Further, since the enabling conditions are independent of the time duration of module execution, the behavior of the workflow system can be more easily analyzed and understood.

BRIEF DESCRIPTION OF THE DRAWINGS

FIG. 4 shows the textual representation of the flowchart module shown graphically in FIG. 3;

FIG. 6 shows the textual representation of the declarative module shown graphically in FIG. 5;

FIG. 7 shows the textual representation of a foreign module portion of the example declarative language specification;

FIG. 8 shows the textual representation of a foreign module portion of the example declarative language specification;

FIG. 9 shows a graphical representation of a declarative module portion of the example declarative language specification;

FIG. 10 shows the textual representation of the declarative module shown graphically in FIG. 9;

FIG. 11 shows the textual representation of a decision module portion of the example declarative language specification;

FIG. 12 shows the textual representation of a foreign module portion of the example declarative language specification;

FIG. 13 shows the textual representation of a foreign module portion of the example declarative language specification;

FIG. 14 shows the textual representation of a foreign module portion of the example declarative language specification;

FIG. 15 shows the textual representation of a decision module portion of the example declarative language specification;

FIG. 16 shows the textual representation of a decision module portion of the example declarative language specification;

FIG. 17 shows the textual representation of a decision module portion of the example declarative language specification;

FIG. 18 shows the textual representation of a decision module portion of the example declarative language specification;

FIG. 19 shows the textual representation of a decision module portion of the example declarative language specification;

FIG. 20 shows the textual representation of a foreign module portion of the example declarative language specification;

FIG. 21 shows the textual representation of a decision module portion of the example declarative language specification;

FIG. 22 shows the textual representation of a foreign module portion of the example declarative language specification;

FIG. 23 shows the textual representation of a decision module portion of the example declarative language specification;

FIG. 24 shows the textual representation of a decision module portion of the example declarative language specification;

FIG. 25 shows the textual representation of a decision module portion of the example declarative language specification;

FIG. 27 shows the typing rules for Combining Policy Language operators;

FIGS. 34A–34D show pseudo code for the basic algorithm for determining whether a task is eligible or unneeded;

FIGS. 35A–35G show pseudo code for the extended algorithm for computing whether an attribute is necessary;

FIG. 38 shows an illustrative display screen shot of the graphical user interface;

FIGS. 40A and 40B show pseudo code for the algorithm for maintaining and dynamically updating the graphical user interface display.

DETAILED DESCRIPTION

Figure 1:
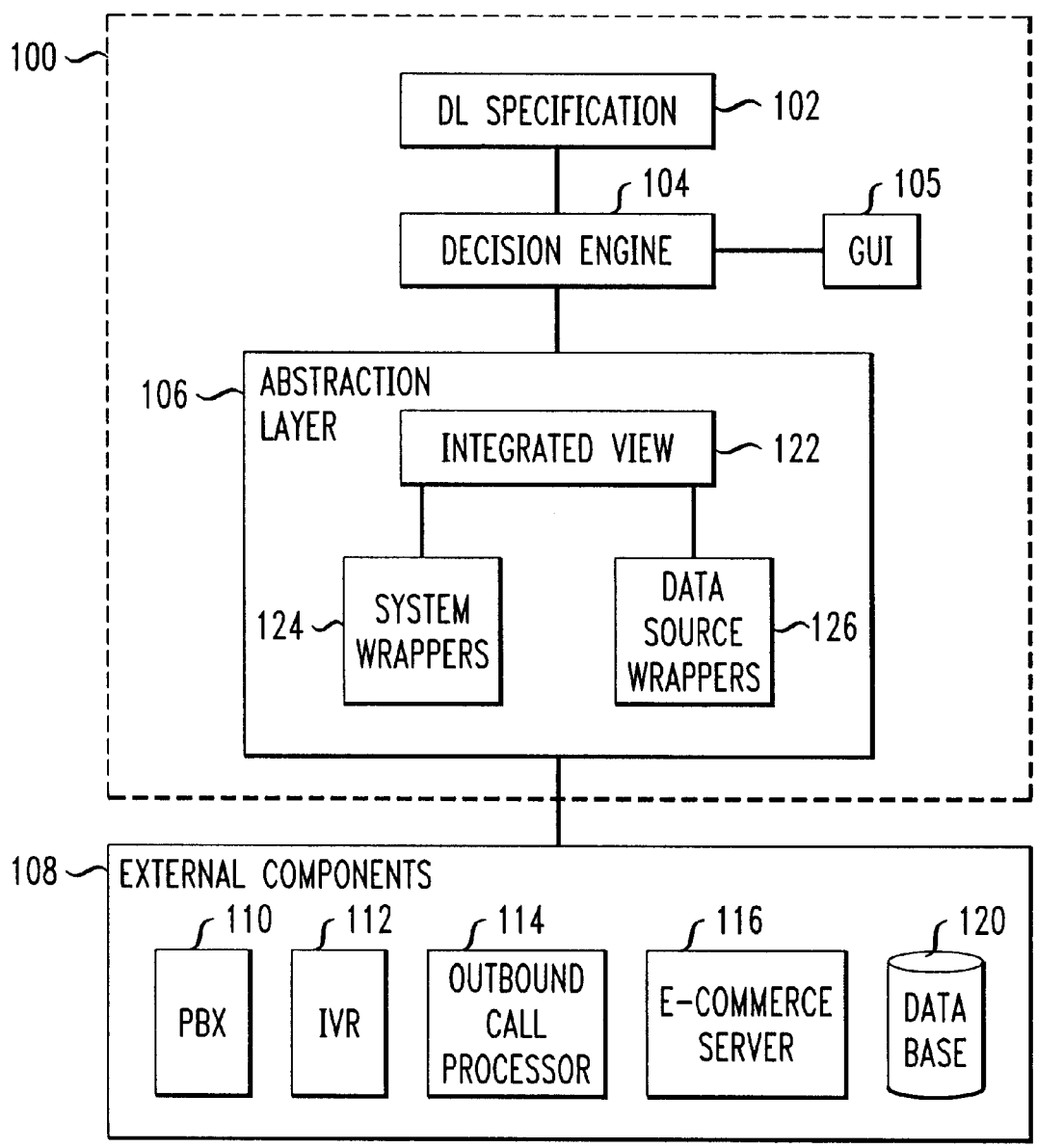
FIG. 1 shows a high level block diagram of an object focused workflow system.

A high level block diagram of an object-focused workflow system in which the present invention may be implemented is shown in FIG. 1. As used herein, a workflow system is a system that facilitates the systematic execution of activities and tasks on a class of similar input objects based on common modules and/or functions. The workflow system may treat most or all of the objects in a uniform way, or may treat the input objects in highly differentiated ways. An instance of the workflow includes the processing that is performed by the workflow system and by external components as a result of an input object being provided to the workflow system. Multiple instances of the workflow might execute simultaneously. The workflow system may operate in real-time, near real-time, or at slower speeds. In accordance with the embodiment shown in FIG. 1, the object-focused workflow system 100 implements a customer care system for processing incoming calls. Of course the techniques described herein may be used to implement many different types of systems, such as electronic commerce systems. The system 100 includes a Declarative Language (DL) specification 102, a decision engine 104, a graphical user interface (GUI) 105, and an abstraction layer 106.

DL specification 102 represents a specification describing the desired operation of the object-focused workflow system 100 upon the receipt of some object. For example, the object may be the receipt of an incoming telephone call to the customer care system. At least a portion of the DL specification 102 includes a declarative description of the operation of the system. The declarative description explicitly describes the steps to be taken during workflow execution, but the order of those steps is implicit in the DL specification 102. This is a departure from the prior art workflow systems which generally describe workflow procedurally, that is, the specification explicitly states the steps to be taken during workflow execution and the sequence of those steps. The benefit of a declarative workflow specification is that it allows a system designer to focus on the core logic of an application and lets the underlying computer system address implementation details, including the particular order in which steps should be taken. The details of the DL specification 102 will be described in further detail below.

The decision engine 104 receives the DL specification 102 and processes objects in accordance with the DL specification 102. Such processing of objects includes the control of various external components 108 such as a private branch exchange (PBX) 110, interactive voice response unit (IVR) 112, outbound call processor 114, e-commerce server 116, and database 120. These components are external in that they are not part of the workflow system 100, but may be controlled by the workflow system 100 during processing of an object. Only one of each of these external components is shown in FIG. 1 for clarity, however external components 108 may include more than one of each of these components. For example, it would be common for the external components to include multiple databases. Further, the external components 108 shown in FIG. 1 is only an illustrative list of the types of components that may be controlled by an object-focused system implementing a customer care system. An object-focused system implementing other types of systems would likely contain other types of components.

A graphical user interface 105 is provided for displaying a representation of the execution of the workflow on a computer display screen and will be described in further detail below.

An abstraction layer 106 is provided between the decision engine 104 and the external components 108 so that the decision engine 104 may communicate with and control the external components using a high level communication protocol, without the need to deal with the particular communication protocols of each of the different external components. This is particularly useful because the external components 108 will generally be heterogeneous with different components being manufactured by different companies. The abstraction layer 106 includes an integrated view 122, system wrappers 124, and data source wrappers 126. The system wrappers 124 provide abstract interfaces to the external components 108, exposing properties relevant to the workflow application while hiding irrelevant details concerning particularities of the components' interfaces and aspects of the components' behavior. The data source wrappers 126 provide abstract interfaces to the databases and reporting features of the other external components 108, exposing relevant data and update capabilities. The integrated view 122 provides a unified interface to the functionalities supported by the external components 108, using abstract data types or similar interfacing modules. For example, the integrated view 122 may expose a functionality without exposing what components the functionality is implemented by, and expose a computed data set without showing what databases the raw data is residing on.

The decision engine 104, GUI 105, and abstraction layer 106 are high level representations of functions that may be performed by one or more appropriately programmed computers. The components of such computers are well known in the art and the details of such computers will not be described herein.

The contents of the DL specification 102 will now be described. In the embodiment described herein, the DL specification 102 comprises a textual specification which is provided to the decision engine 104 for processing. However, the DL specification 102 may be represented in other ways as well. For example, the DL specification 102 may comprise a graphical specification which is provided to the decision engine via data structures. The description of the DL specification 102 will be provided in conjunction with an example application of a travel agency customer care system. It is noted that the sole purpose of describing the DL specification 102 in conjunction with a particular example is to provide a context for describing the principles of the present invention. The use of the travel agency example used herein provides such a context. The purpose of this description is not to provide a complete description of how to implement a travel agency call center.- Therefore, the example graphical and textual descriptions included herein will only be described in enough detail so as to clearly describe aspects of the present invention. Further, although a fair level of detail is provided with respect to the example, not all details of the figures (in particular the textual specification) will be described herein. Further, the example is not to be taken as a complete description of the specification needed to implement such a travel agency call center. Portions of the specification which would be required to implement the example have been omitted for clarity. Further, portions of the specification have been included solely for the purpose of describing a certain aspect of the invention, and such portions may be inconsistent with other portions of the specification which have been included to describe certain other aspects of the invention.

In accordance with the example, it is assumed that a travel agency call center receives incoming calls from customers. The object passing through the system in this example is an incoming call, and the system operates to determine how to route the incoming call and what so-called side-effects should be executed. Side-effects will be described in further detail below. Assume that the call center has multiple agents, and each agent has one of 4 skill levels numbered 1–4. Each of the skill levels represents a particular level of expertise in a different type of call. During operation, it is desirable to route calls to appropriate agents in order to best utilize the agents' skills. Further details regarding the example application will be described below.

Figure 2:
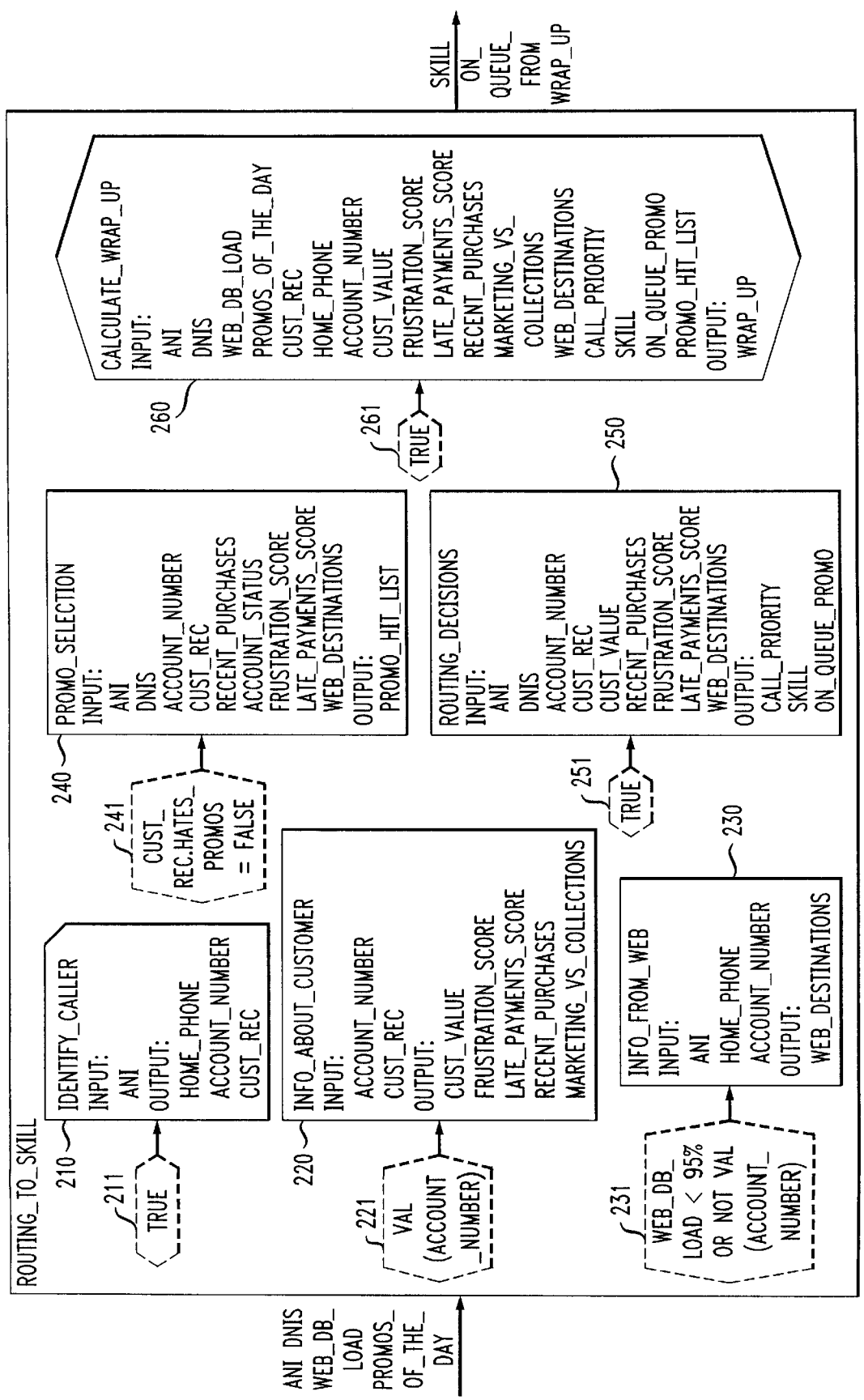
FIG. 2 shows a graphical representation of an example declarative language specification.

FIG. 2 shows a graphical representation of a DL specification for one portion of the travel agency example. More particularly, FIG. 2 shows a graphical representation of the Routing_To_Skill module 202 which will determine, based on various parameters of an incoming call, how to route the call. The term module is used herein to describe a logical grouping of related processing functions. The input parameters to the Routing_To_Skill module 202 are ANI, DNIS, WEB_DB_LOAD, and PROMOS_OF_THE_DAY. The output parameters of the Routing_To_Skill module 202 are SKILL, ON_QUEUE_PROMO, and WRAP_UP. These input parameters and output parameters are called attributes. The term attribute is used herein to describe a data item associated with an object which may be evaluated during processing of the object. An attribute in an object-focused workflow system is similar to a variable in a procedural system.

For purposes of this discussion, since the Routing_To_Skill module 202 is the highest level module described, it is assumed that values for the input attributes to the Routing_To_Skill module are provided to the system prior to execution of the workflow. Such attributes which are provided from some external source are called source attributes. Similarly, the output attributes of the Routing_To_Skill module are called target attributes, because these are the attributes for which values are produced when processing is completed. Attributes which are used during processing which are neither source attributes nor target attributes are called internal attributes.

There are four types of modules in a DL specification. Declarative modules have a declarative semantics and contain sub-modules. Declarative modules are represented in the figures using rounded corner rectangles. Decision modules produce a single attribute value through a novel technique for aggregating and synthesizing information using computation rules and a combining policy which will be described in further detail below. Decision modules are represented in the figures using solid line hexagons. Flowchart modules are specified using a flowchart language to describe the processing. Flowchart modules are represented in the figures using rectangles with a cut corner. Foreign modules are implemented using some type of external function (e.g. database query or web server routine). Foreign modules are represented in the figures with a rectangle. Each of these types of modules will be described in further detail below.

As shown in FIG. 2, the Routing_To_Skill module 202 is made up of six sub-modules: Identify_Caller 210, Info_About_Customer 220, Info_From_Web 230, Promo_Selection 240, Routing_Decisions 250, and Calculate_Wrap_Up 260. Module 210 is represented as a rectangle with a cut corner indicating that it is a flowchart module. Modules 230 and 240 are represented as rectangles which indicates that these modules are foreign modules and obtain values for attributes by executing external functions. Modules 220 and 250 are represented as rounded corner rectangles, which indicates that these modules are declarative modules which are specified at a lower level using another DL specification. These types of modules are used to conveniently represent at a high level a substantial amount of lower level processing. Such high level representation makes it easier for a designer to visualize the overall function of a DL specification. Module 260 is represented as a hexagon, which indicates that this module is a decision module and evaluates a single attribute using computation rules and a combining policy as will be described in further detail below.

Each module has input attributes and output attributes. As will become clear from the description which follows, the workflow system 100 is attribute-based, that is, much of the processing which occurs in the workflow system is based on the evaluation of attribute values. Attributes are assigned triples as follows: (State, Value, Exception-Value) where:

$$\text{State} \in \{VALUE, EXCEPTION, DISABLED, UNINITIALIZED, FAIL\}$$

$$\text{Value} = \begin{cases} \text{a value if State} = VALUE \\ \bot \text{ otherwise} \end{cases}$$

$$\text{Exception-Value} = \begin{cases} \text{exception value if State} = EXCEPTION \\ \bot \text{ otherwise} \end{cases}$$

The meaning of these states is as follows. VALUE indicates that the attribute currently has a value assigned to it. EXCEPTION indicates that there has been some error in evaluating the attribute. DISABLED indicates that it has been determined that the attribute will not be assigned any value. It is noted that a DISABLED State does not indicate any error, but is part of normal processing. UNINITIALIZED indicates that essentially no information is available about the attribute. FAIL indicates that the module defining the attribute was enabled (as described below), but aborted before producing a state of VALUE, EXCEPTION, or DISABLED for the attribute. It is also noted that attribute assignments are monotonic, that is, once an attribute is assigned a state other than UNINITIALIZED, further processing of the workflow object will not change the state and any assigned value.

The value of an attribute will be some value assigned to the attribute if the state of the attribute is VALUE. Otherwise, the value will contain $\bot$, which indicates no value. The Exception-Value of an attribute will contain an exception value indicating a particular error condition if the state of the attribute is EXCEPTION. Otherwise, the Exception-Value will contain $\bot$.

Modules also have associated states. Module states are UNINITIALIZED, SUCCESS, EXCEPTION, and DISABLED. The module state UNINITIALIZED indicates that essentially no information is available about the module. The module state SUCCESS indicates that the enabling condition (as described below) for the module was true, and the module executed successfully. The module state EXCEPTION indicates that the module was enabled, but an exception occurred. The module state DISABLED indicates that the module's enabling condition is false.

Each of the modules is associated with an enabling condition, which is a condition which determines whether the module will be evaluated for a given input object. Enabling conditions can refer to attribute values, attribute exception values, attribute states (e.g., whether the attribute has a value or whether an exception occurred when attempting to evaluate it), module states and module exception values. The enabling conditions are graphically represented as broken line hexagons 211, 221, 231, 241, 251, 261. Enabling conditions 211, 251, and 261 contain TRUE, which will always evaluate to a true condition, and therefore the Identify_Caller module 210, Routing_Decisions module 250, and Calculate_Wrap_Up module 260 will be evaluated for each input object. Enabling condition 221 contains the expression: VAL (ACCOUNT_NUMBER). The function VAL (X) will return a true condition if the attribute X is in the state VALUE, otherwise, false will be returned. Therefore, the enabling condition 221 indicates that the Info_About_Customer module 220 will be evaluated if the attribute ACCOUNT-NUMBER is in the state VALUE. If the attribute ACCOUNT-NUMBER is in state EXCEPTION, DISABLED, or FAILED, then enabling condition 221 will evaluate to false and the Info_About_Customer module 220 will not be evaluated. If the attribute ACCOUNT_NUMBER is in state UNINITIALIZED, then enabling condition 221 cannot yet be evaluated. Thus, the evaluation of enabling condition 221 depends on the attribute ACCOUNT-NUMBER first receiving a state other than UNINITIALIZED. It is noted that this dependency is implicit in the DL specification and not explicitly specified by the system designer or programmer.

Various expressions can be used for enabling conditions. For example, enabling condition 231 indicates that the Info_From_Web module 230 will be evaluated if the value of the WEB_DB_LOAD attribute is less than 95% or if the ACCOUNT_NUMBER attribute does not have a value. Enabling condition 241 indicates that the Promo_Selection module 240 will be evaluated if the CUST_REC.HATES-PROMOS attribute is false.

Figure 3:
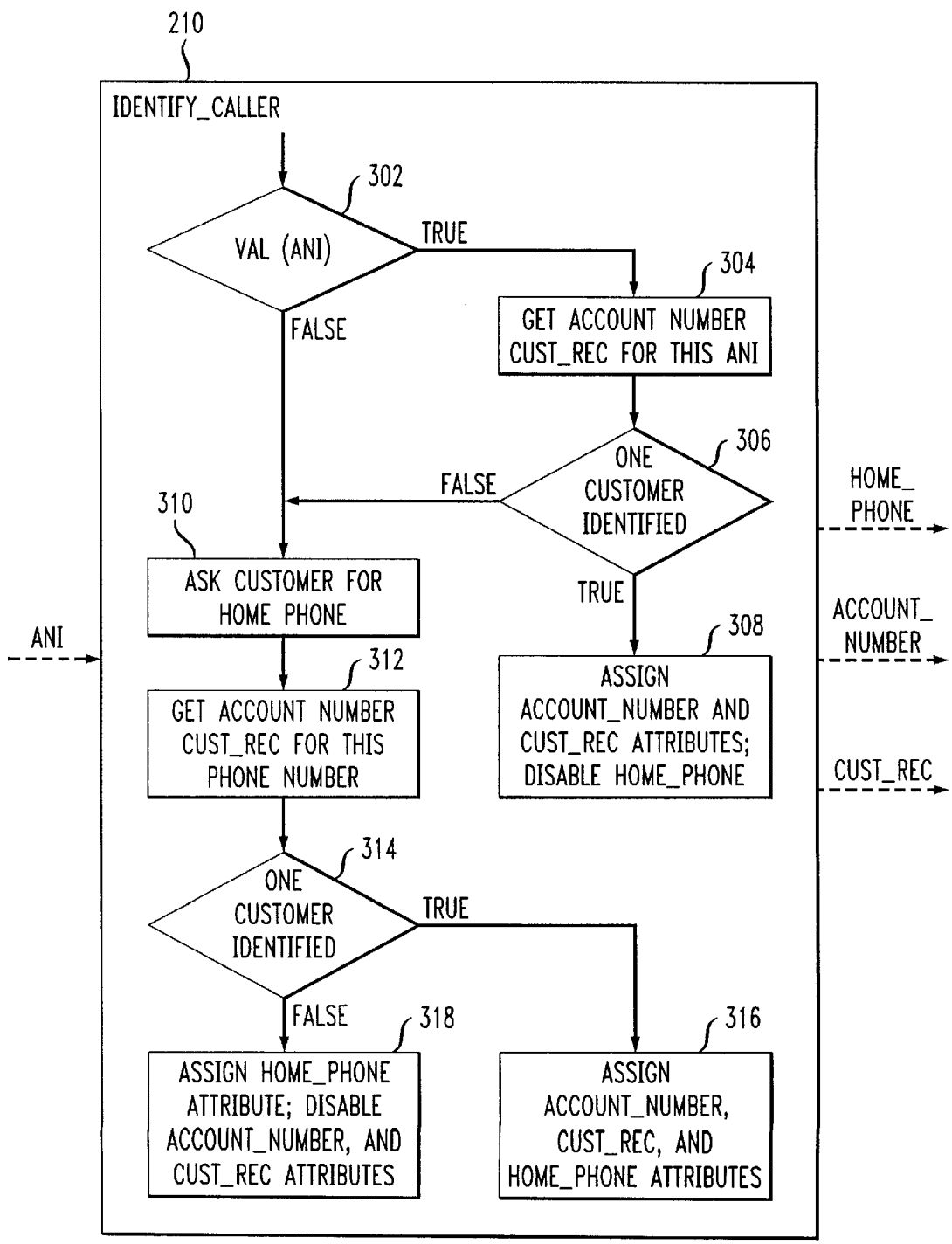
FIG. 3 shows a graphical representation of a flowchart module portion of the example declarative language specification.

FIG. 2 gives a high level graphical representation of the DL specification of the Routing-To-Skill module 202. Relevant portions of each of the sub-modules will now be described. A graphical representation showing further detail of the Identify_Caller module 210 is shown in FIG. 3. The DL specification in textual language corresponding to the graphical representation of FIG. 3 is shown in FIG. 4.

As shown in FIG. 4, the module name is specified in line 1, and an indication of which module the current module is a sub-module of is given in line 2. The next section defines the input attributes (line 3). The next section defines the output attributes (lines 4–14). Line 15 specifies the enabling condition, which corresponds to the enabling condition 211 shown in FIG. 2. The type of the module, in this case flowchart, is specified on line 16. The computation section of the textual specification (line 17) indicates how attributes are to be evaluated. For this module, the attributes will be evaluated according to the flowchart shown in FIG. 3. Of course, one skilled in the art could convert the flowchart of FIG. 3 to program code to implement the logic flow shown in FIG. 3. Such code is not included in FIG. 4 because it is not necessary for an understanding of the principles of the present invention. Finally, line 18 indicates that this module has a side-effect. The side-effect action is an interactive voice response (IVR) unit dip (line 19).

A side-effect action is an action which has a significant impact on a system or user that is external to the workflow system. Stated another way, the execution of a side-effect action imparts a substantial overhead on the workflow system. Some actions may be deemed as being side-effect actions because a cost is associated with each occurrence of the action. For example, queries against some databases may have no associated cost because the databases are maintained by the same organization that maintains the workflow system, while queries against other databases may have associated costs because the database is maintained by an external organization. An action may be considered to be a side-effect action if the effect of the action cannot be undone by a subsequent separate action. Side-effects may include actions such as executing financial transfers, issuing checks or other instruments of monetary value, invoking actions by other workflow engines, updating databases that are used by other software systems or users, or engaging users in an activity. An internal action is an action that is not a side-effect action. As described above in connection with line 18 of FIG. 4, an indication of whether a module includes a side-effect action is included in the DL specification.

The details of how attributes are evaluated by the Identify_Caller module 210 are given in the flowchart of FIG. 3. The decision of step 302 determines whether the attribute ANI has a value. As shown in FIG. 2, ANI is a source attribute which is an input to the high level Routing_To_Skill module 202, and represents the telephone number from which the incoming call originated. Since such a telephone number is not always available, the decision in step 302 is needed. If the ANI attribute has a value, then in step 304 the ACCOUNT-NUMBER and CUST_REC attributes for the customer associated with the ANI are evaluated by performing a lookup to an external database. If the decision in step 306 indicates that one customer has been identified, then in step 308 the attributes ACCOUNT_NUMBER and CUST-REC are assigned the values retrieved in step 304. The assigning of values to the attributes ACCOUNT_NUMBER and CUST-REC includes assigning values to the associated tuple: (State, Value, Exception-Value) for each of the attributes. Thus, the state of these attributes becomes VALUE, the value gets the value retrieved, and exception-value is assigned $\perp$, as described above. Further, in step 308, the attribute HOME_PHONE is disabled, such that its associated tuple (State, Value, Exception-Value) is updated such that state becomes DISABLED, value becomes $\perp$, and exception-value becomes $\perp$. As described above, since attribute assignments are monotonic, the values and states for these attributes will not change during further processing of this particular incoming telephone call.

If the test in step 306 is false, then in step 310 the customer is asked for a home phone number. Such a step may be performed by initiating such a request from an interactive voice response unit, such as unit 112 (FIG. 1). Step 310 specifies a side-effect action because it impacts the caller by asking him/her to input some information. Upon receipt of the home phone number, the ACCOUNT_NUMBER and CUST_REC attributes are retrieved in step 312 in a manner similar to that in step 304. If one customer is identified then the test in step 314 will be true and in step 316, the ACCOUNT_NUMBER, CUST_REC, and HOME_PHONE attributes are assigned values. If one customer is not identified, then the test in step 314 will be false and in step 318 the HOME-PHONE attribute is assigned, and the ACCOUNT_NUMBER and CUST-REC attributes are disabled.

Figure 5:
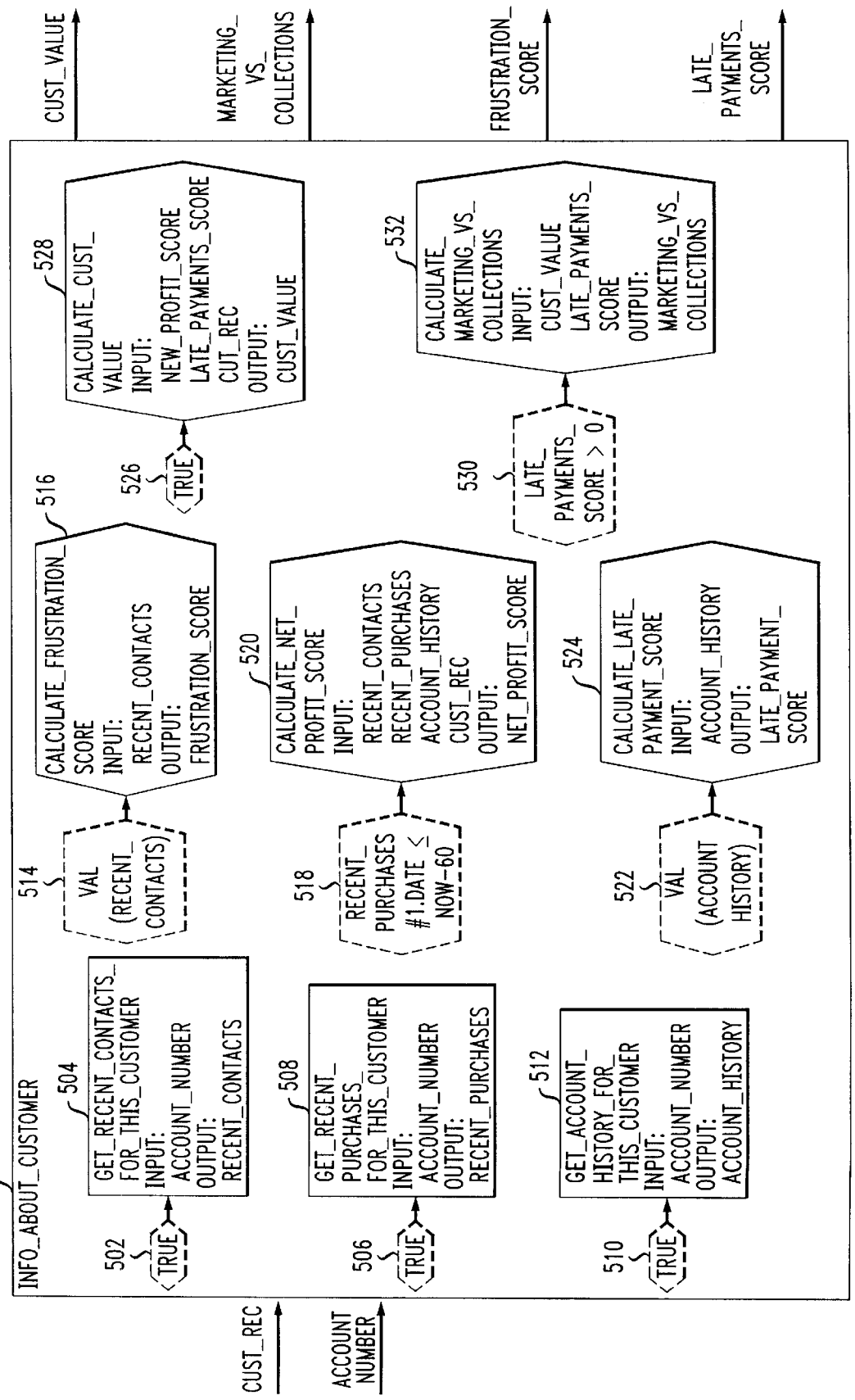
FIG. 5 shows a graphical representation of a declarative module portion of the example declarative language specification.

The DL specification further defining the Info_About_Customer module 220 (FIG. 2) is shown graphically in FIG. 5 and textually in FIG. 6. This Info_About_Customer module 220 is a declarative module and is therefore further defined in terms of sub-modules. The Get_Recent_Contacts_For_This_Customer module 504, the Get_Recent_Purchases_For_This_Customer module 508, the Get_Account_History_For_This_Customer module 512, and the Calculate_Cust_Value module 528 will always be evaluated because their respective enabling conditions 502, 506, 510, 526 are always true. It is noted that the graphical representation of these modules indicate that they are foreign modules. Each of these modules performs an external database retrieval function. If the attribute RECENT_CONTACTS has a state of VALUE, then the enabling condition 514 will be True and the Calculate_Frustration_Score module 516 will be evaluated. If the attribute RECENT_CONTACTS has state EXCEPTION, DISABLED, or FAILED, then the enabling condition 514 will be False and the Calculate_Frustration_Score module 516 will not be evaluated. If the attribute RECENT_CONTACTS is in state UNINITIALIZED, then enabling condition 514 cannot yet be evaluated. Enabling conditions 518, 522 and 530 are evaluated in a similar manner. The modules 516, 520, 524, 528, and 532 are all represented as solid line hexagons, which indicates that these modules are decision modules and the processing of these modules is specified in terms of computation rules and a combining policy, as will be described in further detail below.

The corresponding textual DL specification of the Info_About_Customer module 220 is shown in FIG. 6. It is noted that the type of the module as specified in line 16 is declarative, indicating that the module is a high level abstraction of processing details which are specified using sub-modules with enabling conditions.

Returning now to FIG. 2, the Info_From_Web module 230 will now be described in further detail. Module 230 is represented as a rectangle, which indicates that this is a foreign module which obtains values for attributes by executing external functions. The enabling condition 231 of module 230 indicates that the module will only be evaluated if the attribute WEB_DB_LOAD has a value which is less than 95% or if the attribute ACCOUNT_NUMBER has a state other than VALUE or UNINITIALIZED. The textual DL description of the Info_From_Web module 230 is shown in FIG. 7. The computation specified in line 13 indicates that data from an external web server will be obtained using the attributes ANI, HOME_PHONE, and ACCOUNT_NUMBER. The information returned will be assigned to the attribute WEB_DESTINATIONS, which will contain information regarding a customer's prior interactions with an associated Internet web site.

The Promo_Selection module 240 will now be described in further detail. Like module 230, module 240 is represented as a rectangle, which indicates that this is a foreign module which obtains values for attributes by executing external functions. The enabling condition 241 of module 240 indicates that the module will only be evaluated if the attribute CUST_REC.HATES_PROMOS has a value False. The textual DL description of the Promo_Selection module 240 is shown in FIG. 8. The computation specified in lines 15–18 indicates that data from an external source (e.g. a database, expert system, another workflow system) will be obtained using the input attributes. The information returned will be assigned to the attribute PROMO_HIT-LIST, which will contain a list of promotions which would be appropriate to present to a customer during a call.

The DL specification further defining the Routing_Decisions module 250 (FIG. 2) is shown graphically in FIG. 9 and textually in FIG. 10. This Routing_Decisions module 250 is a declarative module and is therefore further defined in terms of sub-modules. The Ask_Reason_For_Call module 910 will be evaluated if the CUST_VALUE attribute has a value less than 7, as indicated by enabling condition 912. Module 910 is represented as a rectangle, which indicates that the module is a foreign module. This module 910 performs an IVR interaction asking the caller the reason for calling, and the reason is assigned to attribute IVR_CHOICE. Modules 920, 940, and 950 will all be evaluated because their associated enabling conditions 922, 942, and 952, are all True. Module 960 will not be evaluated if the attribute BUSINESS_VALUE is greater than 100 or if the attribute FRUSTRATION_SCORE is greater than 5. This enabling condition 962 illustrates that enabling conditions can also specify when a particular module is disabled, rather than specifying when it is enabled. Module 930 will be evaluated if the test in its enabling condition 932 is True. The modules 920, 940, 950, and 960 are represented as hexagons, which indicates that these modules are decision modules and that their attributes are evaluated using computation rules and a combining policy. These modules will be described in further detail below. Module 930 is represented as a rectangle which indicates that this is a foreign module.

The corresponding textual DL specification of the Routing_Decisions module 250 is shown in FIG. 10. The type of the module (line 20) is declarative, and is therefore further defined in terms of sub-modules. Thus, the module is a high level abstraction of processing details which are specified using sub-modules with enabling conditions. It is noted that line 21 of the textual DL specification indicates that the module has a side-effect. This side effect is a result of the Calculate_Send_Bonus_Check module 930 and will be described below in conjunction with that module.

Referring back to FIG. 2, the final module in the Routing_To_Skill module 202 is the Calculate_Wrap_Up module 260. Calculate_Wrap_Up module 260 is graphically represented in FIG. 2 as a hexagon, which indicates that the module is a decision module and that the processing of the module is specified in terms of computation rules and a combining policy. The use of computation rules and a combining policy to evaluate attributes will now be described in detail.

In general, the format of computation rules and a combining policy within a DL specification is as follows:
Computation rules:
If condition-1 then Attribute←term-1
If condition-2 then Attribute←term-2 . . .
If condition-n then Attribute←term-n
Combining Policy:
Program in Combining Policy Language (CPL) or CPL function.
In the above format, the specification of:
If condition then Attribute←term
indicates that the term contributes to Attribute if the condition has a True value. Thus, each of the computation rules is evaluated to determine whether the condition is True or False. If the condition is True, then the term contributes to the attribute. If the condition is False, then the term does not contribute to the attribute. After each of the computation rules has been evaluated, the attribute is assigned a value based on the combining policy language (CPL) program, or the CPL function (where the CPL function is specified by a CPL program). Thus, the computation rules only contribute their terms to attributes, which is different from assigning a value to the attribute. The attribute is only assigned a value based on the combining policy (e.g. CPL program or CPL function). For example, a CPL function may indicate that the highest <value of the contributed terms is to be assigned to the attribute or that the sum of all the contributed terms is to be assigned to the attribute.

It is noted that the use of computation rules and a combining policy has been described in the context of the object-focused workflow system. As such, computation rules and combining policies are used to assign values to attributes. It is to be understood, however, that the use of computation rules and combining policies is not limited to use in an object-focused system. More generally, computation rules and combining policies may be used to evaluate any type of data item, whether that data item is an attribute in an object-focused system, a variable in a procedural system, or some other type of data item.

CPL provides a flexible and powerful mechanism that allows designers to specify how computation rules are to be combined in order to assign a final value to an attribute. CPL will first be specified formally using mathematical notation such that one skilled in the art of computer science could implement the language. Following the formal description, examples of how the language would be used to build useful combining functions will be described in conjunction with the ongoing example.

First, the values and types of the CPL language will be described. Then, the operators that form an algebra for the language will be defined.

CPL applies on homogeneous collections of data and is based on a type system that defines the following value types. Each CPL type admits ⊥ (standing for "undefined") as a specific occurrence. The type definitions are as follows.
atom (e.g. bool, int, float, string)
<1: $T_1$, . . . , an: $T_n$>is a tuple type, if each $T_i$ is a value type.
[T] is a homogeneous list type, if T is a value type.
{T} is a homogeneous bag type, if T is a value type.
AM: $T_1$ x . . . x $T_n$→T is an atomic mapping type if $T_1$, . . . , $T_n$ and T are atom types. This type allows the definition of arbitrary mappings over atoms.
Values in CPL are defined as follows:
⊥ is a CPL value called undefined. ⊥ can be of any type. In others terms, ⊥ belongs to all the domains of all the CPL types.

Any atom's value is a CPL value.

Any finite tuple $(1{:}v_1, \ldots, a_n{:}v_n)$ of CPL values is a CPL value if $1, \ldots, a_n$ are names for the fields in the tuple and $v_1, \ldots, v_n$ are CPL values.

Any bag and any list of CPL values of a given type is a CPL value. $\{1, \ldots, a_n\}$ is used to represent the bag value that contains the values $1, \ldots, a_n$. $[1, \ldots a_n]$ is used as a shorthand to represent the list value that contains the values $1, \ldots a_n$, and whose first element is 1, second element is $a_2$ and $n^{th}$ element is $a_n$.

Any arbitrary function defined over atoms is a CPL value. A function f of type AM: $T_1 \times \ldots \times T_n \to T$ has for input types the atom types $T_1 \ldots T_n$ and for return type the atom type T.

In CPL, variables are assigned types using type inference, as commonly found in functional programming languages such as ML. The inference rules used in CPL are detailed below.

A CPL program is a sequence of declarations of variables and/or functions:

$$id_1 ::= \cdots$$
$$id_2 ::= \cdots$$
$$\vdots ::= \vdots$$

where $id_1, id_2, \ldots$ are variable or function identifiers. A variable declaration has the form:

$$x := e$$

where e is an expression of CPL. A variable declaration is well formed if the free variables used in e are previously defined in another variable declaration statement (no recursive variable declaration is allowed). A function declaration has the form:

$$f ::= (x_1, x_2, \ldots, x_n) \to e$$

where e is an expression of CPL. A function declaration is well formed if $\forall i \in 1 \ldots n$, $x_i$ is a variable, and the free variables used in e either are previously defined in a variable declaration statement or belong to $\{x_1, x_2, \ldots, x_n\}$. (Recursively defined functions are not allowed).

The syntax of expressions depends on their types. Built-in operations $(=, \leq, \geq)$ that are associated with the built-in atom types are allowed. Also allowed are some Boolean expressions such as $e_1$ and $e_2$, $e_1$ or $e_2$, $\neg e_1$ and a conditional if e then $e_1$ else $e_2$ where e is a Boolean expression and $e_1, e_2$ have the same type. Expressions can also be constructed using the operators defined below. FIG. 27 presents the typing rules for these operators. Names starting with v in FIG. 27 represent variable names, names starting with e represent terms in the CPL calculus, and names starting with t represent types. The notation $\sigma \bullet e{:}t$ indicates that the term e is assigned the type t under the substitution $\sigma$. If a type equation is a fraction, the numerator is the premise while the denominator is the consequence.

The interpretation of the operators of CPL is now described. $I^*(e)$ represents the interpretation of an expression e. If e is a variable name or a function name, $I^*(e)=I(e)$ where the interpretation I associates variables to values and function names to functions of the appropriate type. (If e is a constant, $I(e)=(e)$).

The value operator performs as follows:

$$I^*(\text{value } (e))=\text{if } I^*(e)=\bot \text{ then False else, True}$$

The AMapply operator performs as follows:

$$I^*(AM\text{apply } (f,e_1, \ldots, e_n))=I(f)(I^*(e_1), \ldots, I^*(e_n))$$

Where f is any atomic mapping that applies on n atom values and returns an atom value.

Constructor operators are now described. A constructor operator is an operator which builds a composite object (e.g. tuple, list, bag) from other objects.

The operator tupling is defined as follows:

$$I^*(tupling(1 := e_1, \ldots, an := e_n)) = \langle 1 : I^*(e_1), \ldots, an : I^*(e_n) \rangle$$
$$I^*(tupling(\bot)) = \bot$$

The operator bagging is defined as follows:

$$I^*(bagging(e_1, \ldots, e_n)) = \{I^*(e_1), \ldots, I^*(e_n)\}$$
$$I^*(bagging(\bot)) = \bot$$

The operator listing is defined as follows:

$$I^*(listing(e_1, \ldots, e_n)) = [I^*(e_1), \ldots, I^*(e_n)]$$
$$I^*(listing(\bot)) = \bot$$

As a shorthand, we use $<1{:=}e_1, \ldots, a_n{:=}e_n>$, $\{e_1 \ldots, e_n\}$ and $[e_1, \ldots, e_n]$ to respectively note tupling $(1{:=}e_1, \ldots, a_n{:=}e_n)$, bagging$(e_1, \ldots, e_n)$, and listing$(e_1, \ldots, e_n)$.

Deconstructor operators are now described. A deconstructor operator is an operator which extracts a component object from a composite object.

The unitval operator is defined as follows:

$$I^*(unitval(S)) = UNITVAL(I^*(S))$$
$$UNITVAL(\{\}) = UNITVAL(\bot) = \bot$$
$$UNITVAL(\{1, \ldots, a_n\}) \quad = 1 \text{ if } n = 1$$
$$\quad = \bot \text{ if } n \geq 2$$

The operator $\text{Proj}_{ai}$ is a parameterized operator. A parameterized operator is an operator which is defined using a template with parameters. Specific operators are formed from a parameterized operator by specifying a value for these parameters. The $\text{Proj}_{ai}$ operator is defined as follows:

$$I^*(proj_{ai}(<a_i{:}e_i \ldots, a_n{:}e_n>))=I^*(e_i)$$
$$I^*(proj_{ia}(\bot))=\bot$$

where $i \in \{1 \ldots n\}$.

The getelt, operator returns the $i^{th}$ element of a list. It is defined over lists as follows:

$$I^*(getelt_i(L)) = GETELT_i(I^*(L))$$
$$GETELT_i([1, \ldots, a_n]) = a_i \text{ if } 1 \leq i \leq n$$

-continued $$GETELT_i([1, \ldots, a_n]) = \perp \text{ if } i > n$$

$$GETELT_i(\perp) = \perp$$

where i is a positive integer.

The factor operator is a binary operator that is defined over lists and bags as follows:

$$I^*(factor(S, Q) = FACTOR(I^*(S), I^*Q)$$

$$FACTOR([], b) = []$$

$$FACTOR(\perp, b) = \perp$$

$$FACTOR(\{\}, b) = \{\}$$

$$FACTOR([1, \ldots, a_n], b) = [(1, b), \ldots, (a_n, b)]$$

$$FACTOR(\{1, \ldots, a_n\}, b) = \{(1, b), \ldots, (a_n, b)\}$$

The map operator is an operator that is defined over lists and bags follows:

$$I^*(map(f)(S) = I^*MAP(f, I^*(S))$$

$$I^*MAP(f, []) = []$$

$$MAP(f, \{\}) = \{\}$$

$$MAP(f, \perp) = I^*(f, (\perp))$$

$$MAP(f, [1, \ldots, a_n]) = [I^*(f(1)), \ldots, I^*(f(a_n))]$$

$$MAP(f, \{1, \ldots, a_n\}) = \{I^*(f(1)), \ldots, I^*(f(a_n))\}$$

Where f is any CPL function with only one input parameter.

The collect operator is recursively defined over lists and bags as follows:

```
I* (Collect(id_θ, θ)(S)) = COLLECT*(I*(S), id_θ, θ)
        COLLECT([], id_θ, θ) = id_θ
        COLLECT({}, id_θ, θ) = id_θ
        COLLECT([a], id_θ, θ) = a
        COLLECT({a}, id_θ, θ) = a
COLLECT([1, a_2,   , a_n], id_θ, θ)) =
            I*(θ(1, COLLECT(, [a_2,   , a_n], id_θ, θ))
COLLECT({1, a_2,   , a_n}, id_θ,
            θ = I*(θ(1, COLLECT({a_2,   , a_n}, id_θ, θ))
``` where θ is a collector. A collector is a complete binary operator with identity $id_\theta$. A collector can be any function T×T→T where T is any CPL type except an atomic mapping type. The table below gives the predefined collectors that are used in the CPL.

| θ | Type |
|---|------|
| ∪ (Union) | {T} |
| @ (concat) | [T] |
| or | Boolean |
| and | Boolean |

-continued

| θ | Type |
|---|------|
| + | integer |
| − | integer |
| * | integer |
| sup | atom |

The ∪ collector computes the (bag) union of two bags (double are not eliminated). The @ collector does the concatenation of two lists (@([1, . . . , $a_n$], [$b_1$, . . . , $b_k$])= [1, . . . , $a_n$, $b_1$, . . . , $b_n$]).

In practice, the user can define new collectors either (i) by providing built-in collectors associated with built-in atom types, or (ii) by constructing new collectors using the CPL language. Indeed, the CPL language permits the user to declare any binary function to be used as a collector.

Constructed operators will now be defined. A constructed operator is an operator which is equivalent to a sequence of CPL statements. A constructed operator can always be defined using basic operators. Constructed operators are used in CPL as a short-hand to represent sequences of CPL statements that are frequently used in CPL programs.

Select operator: The select operator is an operator that is a parameterized by a boolean CPL function. It applies on lists or bags. The typing rules for select are:

$$\frac{\sigma \vdash cd:t_1 \to \{true, false\}, \sigma \vdash S_1:\{t_1\}}{\sigma \vdash select(cd)\ (S_1):\{t_1\}}$$

where $t_1$ is any CPL type. select(cd)($S_1$) returns a subset R of elements of $S_1$. An element $e_1$ of $S_1$ is in R if cd($e_1$)=true.

The select(cd) operator (on bags) is equivalent to the following sequence of CPL statements:

$$cond(cd) ::= x \to \text{if } cd(x) \text{ then } \{x\} \text{ else } \{\}$$

$$select(cd) ::= S \to collect(\{\}, \bigcup)(map(cond(cd))(S))$$

The select(cd) operator (on lists) is equivalent to the following sequence of CPL statements:

$$cond(cd) ::= x \to \text{if } cd(x) \text{ then } \{x\} \text{ else } []$$

$$select(cd) ::= L \to collect([], @)(map(cond(cd)(L))$$

Join operator: The join operator is binary operator that is a parameterized by a boolean CPL function. The typing rules for join are:

$$\frac{\sigma \vdash cd:t_1 \to \{true, false\}, \sigma \vdash S_1:\{t_1\}, \sigma \vdash S_1:\{t_2\}}{\sigma \vdash join(cd)\ (S_1, S_2):\{\langle f\_a:t_1, s\_a:t_2\rangle\}}$$

$$\frac{\sigma \vdash cd:t_1 \to \{true, false\}, \sigma \vdash S_1:[t_1], \sigma \vdash S_2:[t_2]}{\sigma \vdash join(cd)\ (S_1, S_2):\{\langle f\_a:t_1, s\_a:t_2\rangle\}}$$

where $t_1$ and $t_2$ are any CPL type. join (cd) ($S_1$, $S_2$) returns a set R of tuples of the form <f_a:$t_1$, s_a:$t_2$>. A tuple <$e_1$, $e_2$> is in R if $e_1$ is in $S_1$, $e_2$ is in $S_2$ and cd($e_1$, $e_2$)=true. Join (cd) is equivalent to the following sequence of CPL statements:

$$cond(cd) ::= x \to cd(x \cdot \text{f\_a}, x \cdot \text{s\_a})$$

$$\text{inner\_loop}(cd) ::= y \to select(cond(cd))(factor(y \cdot \text{s\_a}, y \cdot \text{f\_a}))$$

$$Join(cd) ::= S_1, S_2 \to collect(\{\}, \bigcup)(map(\text{inner\_loop}(cd))(factor(S_2, S_1)))$$

Trans operator The trans operator is a binary operator that is parameterized by CPL function. The typing rules for trans are:

$$\frac{\sigma \vdash f : t_1, t_2 \to t_3, \sigma \vdash S_1 : \{t_1\}, \sigma \vdash e_2 : t_2}{\sigma \vdash trans(f)(S_1, e_2) : \{t_3\}}$$

$$\frac{\sigma \vdash f : t_1, t_2 \to t_3, \sigma \vdash S_1 : \{t_1\}, \sigma \vdash e_2 : t_2}{\sigma \vdash trans(f)(S_1, e_2) : [t_3]}$$

trans (f) is equivalent to the following sequence of CPL statements:

$$g(f) ::= x \to (s \cdot \text{f\_a}, x \cdot \text{s\_a})$$

$$Trans(f) ::= S, y \to map(g(f))(factor(S, y))$$

Enum operator The enum operator associates each element of a list with its position in the list. The typing rule for trans is:

$$\frac{\sigma \vdash L_1 : [t_1]}{\sigma \vdash enum \ (L_1) : \langle\langle pos:int, val:t_1 \rangle\rangle}$$

It is defined as follows:

$$I^*(enum(e_1)) = ENUM(I^*(e_1))$$

$$ENUM(1, \ldots, a_k) = [\langle pos:1, val:1 \rangle, \ldots, \langle pos:k, val:a_k \rangle]$$

$$ENUM([]) = []$$

$$ENUM(\perp) = \perp$$

The enum operator is equivalent to the following sequence of CPL statements:

$$\text{rev\_concat} ::= l_1, l_2 \to l_2 @ l_1$$

$$reverse ::= l_1 \to collect([], \text{rev\_concat})(map(listing)(l_1))$$

$$\text{init\_enum} ::= x \to [\langle pos:1, val:x \rangle]$$

$$\text{merge\_enum} ::= l_1, l_2 \to [\langle pos: l_1 \# 0 \cdot pos + L_2 \# 0 \cdot pos, val : l_1 \# 0 \cdot val \rangle] @ L_2$$

$$enum ::= L \to reverse(collect([], \text{merge\_enum})(map(\text{init\_enum})(reverse(L))))$$

Dot operator The dot operator is a binary operator that combines two lists by associating elements with same position. The typing rule for dot is:

$$\frac{\sigma \vdash L_1 : [t_1], \sigma \vdash L_2 : [t_2],}{\sigma \vdash dot(L_1, L_2) : [\langle \text{f\_a} : t_1, \text{s\_a} : t_2 \rangle]}$$

It is defined as follows:

$$I^*(dot(e_1, e_2)) = DOT(I^*(e_1), I^*(e_2))$$

if $(k < n)$:

$$DOT([1, \ldots, a_k], [b_1, \ldots, b_n]) = [\langle \text{f\_a}:1, \text{s\_a}:b_1 \rangle, \ldots,$$
$$\langle \text{f\_a}:a_k, \text{s\_a}:b_k \rangle,$$
$$\langle \text{f\_a}: \perp, \text{s\_a}:b_{k+1} \rangle,$$
$$\langle \text{f\_a}: \perp, \text{s\_a}:b_n \rangle]$$

if $(k > n)$:

$$DOT([1, \ldots, a_k], [b_1, \ldots, b_n]) = [\langle \text{f\_a}:1, \text{s\_a}:b_1 \rangle, \ldots,$$
$$\langle \text{f\_a}:a_n, \text{s\_a}:b_n \rangle,$$
$$\langle \text{f\_a}_{n+1}, \text{s\_a}: \perp \rangle,$$
$$\langle \text{f\_a}:a_k, \text{s\_a}: \perp \rangle]$$

if $(k = n)$:

$$DOT([1, \ldots, a_k], [b_1, \ldots, m_n]) = [\langle \text{f\_a}:1, \text{s\_a}:b_1 \rangle, \ldots,$$
$$\langle \text{f\_a}:a_n, \text{s\_a}:b_n \rangle]$$

$$DOT([1, \ldots, a_k], \perp) = [\langle \text{f\_a}:1, \text{s\_a}: \perp \rangle, \langle \text{f\_a}:a_k, \text{s\_a}: \perp \rangle]$$

$$DOT(\perp, [b_1, \ldots, b_n]) = [\langle \text{f\_a}: \perp, \text{s\_a}:b_1 \rangle,$$
$$\langle \text{f\_a}: \perp, \text{s\_a}:b_n \rangle],$$

$$DOT(\perp, \perp) = \perp$$

The dot operator is equivalent to the following sequence of CPL statements:

$$\text{to\_one} ::= x \to 1$$

$$count ::= L \to collect(0, +)(map(\text{to\_one}, x))$$

$$\text{choose\_first} ::= x, y \to x$$

$$first ::= L \to collect(\perp, \text{choose\_first})(L)$$

$$cd ::= x \to x \cdot f \cdot a \cdot pos = x \cdot \text{s\_a} \cdot pos$$

$$\text{same\_pos} ::= x \to \langle \text{f\_a}:x \cdot \text{f\_a} \cdot val; \text{s\_a}:$$
$$(first(select(cd)(factor(x \cdot \text{s\_a}, x \cdot \text{f\_a})))) \cdot \text{f\_a} \cdot val \rangle$$

$$\text{rev\_same\_pos} ::= x \to \langle \text{f\_a}: (first(select(cd)(factor(x \cdot \text{s\_a}, x \cdot \text{f\_a})))) \cdot$$
$$\text{f\_a} \cdot val; \text{s\_a}: x \cdot \text{f\_a} \cdot val \rangle$$

$$dot ::= L_1, L_2 \to if \ count(L_1) > = count(L_2) \ then$$
$$map(\text{same\_pos})(factor(enum(L_1), enum(L_2)))$$
$$else \ map(\text{rev\_same\_pos})(factor(enum(L_2), enum(L_1)))$$

Group operator The group operator is a parameterized operator. The typing rules for group are:

$$\frac{\sigma \vdash S : \{\langle hash:t'; val:t \rangle\}}{\sigma \vdash group(S) : \{\langle hash:t'; vals:\{t'\} \rangle\}}$$

$$\frac{\sigma \vdash S: \{\langle hash:t'; val:t\rangle\}}{\sigma \vdash group(S): \{\langle hash:t'; vals:\{t'\}\rangle\}}$$

where t' is an atom type.

Group takes as input a bag (resp, a list) and produces as output a bag of tuples of the form $(h_i, S_i)$ i∈1 . . . n such that
∀i,j∈1 . . . n, $(h_i \neq h_j)$or(i=j) and, Each member $s_i$ of $S_i$ contains the projection on the second attribute of all the tuples in S whose first attribute is equal to $h_i$.

The Group Operator is equivalent to the following sequence of CPL statements:

$\pi(hash) ::= S \rightarrow map(proj(hash))(S)$ test_eq ::= $x \rightarrow$ if $x \cdot f \cdot a = x \cdot s\_a$ then *true* else *false*

Is_in ::= $x, S \rightarrow collect(false, \text{or})(map(test\_eq)(factor(S, x)))$ add_to_set ::= $s, S \rightarrow$ if $I$ s_n($unitval(s), S$) then $S$ else $s \cup S$ elimin_double ::= $S \rightarrow collect(\{\}, \text{add\_to\_set})(map(bagging)(S))$ $\pi_{set}(hash) ::= S \rightarrow elimin \cdot double(\pi(hash)(S))$ same_hash ::= $x \rightarrow$ if $x \cdot f\_a \cdot hash$
$= x \cdot s\_a$ then $\{x \cdot f\_a \cdot val\}$ else $\{\}$ all_same_hash ::= $y \rightarrow \{hash: y \cdot f\_a, vals:collect(\{\}, \bigcup)$
$(map(same\_hash)(factory(y \cdot s\_a, y \cdot f\_a))))\}$ Group ::= $S \rightarrow collect(\{\}, \bigcup)(map(all\_same\_hash)$
$(factor(\pi(hash)(S), S)))$ Sort operator: The sort operator is a parameterized operator. The typing rules for sort are:

$$\frac{\sigma \vdash \alpha: t \times t \rightarrow \{True, False\}, \sigma \vdash S:\{t\}}{\sigma \vdash sort(\alpha)(S):[t]}$$

$$\frac{\sigma \vdash \alpha: t \times t \rightarrow \{True, False\}, \sigma \vdash S:[t]}{\sigma \vdash sort(\alpha)(S):[t]}$$

where α is a CS mapping that describes an order relation over values of type T. More precisely, α is a CS mapping that takes as input two values of type T and returns a boolean value. α returns the value True if the first argument is greater than the second argument and False otherwise. α describes a non-strict order relation if it verifies the properties (1) (2) and (3) described below. a describes a strict order relation if it verifies the properties (1) and (4).
(1) if (α(x,y) and (α(y,z) then α(x,z)
(2) α(x,x)=True
(3) not(α(x,y)) or (not(α(y,x)) or (y=x))
(4) not(α(x,y)) or (not(α(y,x))

The sort operator performs as follows: sort(α)(S) sorts the value of S in an increasing order according to α. Let us note that the result is not deterministic since (i) the order relation α is applied on a bag and (ii) a may define a partial order.

The sort operator is equivalent to the following sequence of CPL statements:

$f(\alpha) ::= x \rightarrow \alpha(x \cdot s\_a, x \cdot f\_a)$ select_inf ::= $y, L \rightarrow select(f(\alpha))(factor(L, y))$ select_not_inf ::= $y, L \rightarrow select(not(f(\alpha)))(factor(L, y))$ merge_order ::= $l, L \rightarrow$ select_inf($l\#0, L$)
@$l$@select_not_inf($l\#0, L$)

sort(α) ::= $S \rightarrow collect([], \text{merge\_order})(map(listing)(S))$

The foregoing was a formal definition of the CPL language. Examples of how the language is used to implement combining policy will be given below in connection with the ongoing example.

Returning now to the description of the example application and FIG. 2, module 260 is specified in terms of computation rules and a combining policy, and is shown textually in FIG. 11. The computation rules are specified in line 25–39 of the DL specification. As defined in lines 21–22, the output attribute WRAP_UP is a set of tuples containing an attribute name and a value of the attribute. In effect, this attribute contains various attribute names and associated values for archival purposes. The first three rules (lines 26–31) are of the form "if true", so that they will always be True, and the values specified in those rules will always contribute to the attribute WRAP_UP. The computation rule on lines 32–35 will only contribute to the attribute WRAP_UP if the attribute WEB_DESTINATIONS is not empty. Similarly, the computation rule on lines 36–39 will only contribute to the attribute WRAP_UP if the value of CUST_REC.CARD_COLOR is "gold". The combining policy (wrap-up-cp) is specified in lines 40–41 and indicates that the contribution of all true rules are to be used. It is assumed that this combining policy is a predefined CPL function which is available for use by system designers. The CPL program defining this function is as follows:

wrap_up_cp: :=x - > select(value) (x)

It is also noted that the Calculate_Wrap_Up module 260 has a side-effect, as specified in line 42. The side-effect of this module is to use the WRAP_UP attribute to write into an archive. This archive may be, for example, an external database which stores operational information for the system.

Returning now to FIG. 2, module 220 will be described in further detail. As described above in conjunction with FIG. 5, module 220 contains 8 sub-modules 504, 508, 512, 516, 520, 524, 528, 532. Modules 504, 508, and 512 are modules which perform database retrievals in order to assign values to attributes. The DL specification for the Get_Recent_Contacts_For_This_Customer module 504 is shown in FIG. 12. Based on the input attribute ACCOUNT_NUMBER, the module will perform a database query as specified in lines 13–16 in order to evaluate and assign a value to the output attribute RECENT_CONTACTS. The DL specification for the Get_Recent_Purchases_For_This_Customer module 508 is shown in FIG. 13. Based on the input attribute ACCOUNT_NUMBER, the module will perform a database query as specified in lines 10–13 in order to evaluate and assign a value to the output attribute RECENT_PURCHASES. The DL specification for the Get_Account_History_For_This_Customer module 512 is shown in FIG. 14. Based on the input attribute ACCOUNT_NUMBER, the module will perform a database query as specified in lines 14–17 in order to evaluate and assign a value to the output attribute ACCOUNT_HISTORY.

Returning now to FIG. 5, the Calculate_Frustration_Score module 516 is represented as a hexagon, which indicates that the module is a decision module and that the processing of the module is specified in terms of computation rules and a combining policy. The DL specification for this module is shown in FIG. 15. The computation rules are shown in part in lines 7–19. There would likely be additional computation rules, but such rules are not shown because they are not necessary for an understanding of the relevant portions of FIG. 15. The input attribute to this module is RECENT_CONTACTS, which is a list as defined in FIG. 12, lines 4–10. Thus, the computation rule specified in lines 8–13 of FIG. 15 specifies that if the attribute RECENT_CONTACTS is defined for list element [1] (i.e., there is at least one recent contact specified in the RECENT_CONTACTS attribute), then the expression in lines 10–13 is evaluated and the result is contributed to the FRUSTRATION_SCORE attribute. Similarly, the computation rule specified in lines 14–19 of FIG. 15 specifies that if the attribute RECENT_CONTACTS is defined for list element [2] (i.e., there are at least two recent contacts specified in the RECENT_CONTACTS attribute), then the expression in lines 16–19 is evaluated and the result is contributed to the FRUSTRATION_SCORE attribute. Additional computation rules would likely be included in an actual implementation, but are not shown here. It is noted that in this example, any or all of the computation rules may evaluate to True, in which case the attribute FRUSTRATION_SCORE gets contributions from each of the true rules.

The combining policy for the Calculate_Frustration_Score module 516 is a CPL function, frustration-score-cp, as specified in lines 21–24 and indicates that the contributions of the true rules will be added together and rounded up to the next integer, up to a maximum of 10. The result is assigned to the attribute FRUSTRATION_SCORE. The CPL program defining this function is as follows:
Calculate_Frustration_Score ( sum_true : :=x -> collect (select(value), 0, +)

min_of : :=x, v -> if x>v then v else x

Frustration_score_cp : :=cont_vals -> min_of (round_up (sum_true (cont_vals,1)), 10)

The Calculate_Net_Profit_Score module 520 (FIG. 5) is represented as a hexagon, which indicates that this module is a decision module and that the processing of the module is specified using computation rules and a combining policy. The DL specification for this module is shown in FIG. 16. The computation rules are shown in lines 10–32. The input attributes to this module are RECENT_CONTACTS, RECENT_PURCHASES, ACCOUNT_HISTORY, and CUST_REC. The computation rules specified in lines 10–32 specify the contributions to the attribute NET_PROFIT_SCORE based on the input attributes. The combining policy specified in lines 33–35 is a CPL function, net-profit-score-cp, and indicates that the contributions of the true rules will be added together. The resulting sum is assigned to the attribute Net_Profit_Score. The CPL program defining this function is as follows:

Net_Profit_Score_cp : :=cont_vals -> sum_true (cont_vals)

The Calculate_Late_Payment_Score module 524 (FIG. 5) is specified using computation rules and a combining policy and the DL specification for this module is shown in FIG. 17. The computation rules specified in lines 7–19 specify the contributions to the LATE_PAYMENT_SCORE attribute based on the input attribute. The combining policy as specified in lines 20–22 is a CPL function, late-payment-score-cp, and indicates, that the contribution of a true rule will be assigned to the attribute LATE_PAYMENT_SCORE, or if there is no rule evaluating to a true value, then the LATE_PAYMENT_SCORE attribute will be assigned the default value of 0. It is noted that a constraint on this type of combining policy is that only one computation rule may evaluate to true. This constraint could be tested for during a pre-processing step to make sure that any possible evaluation will result in only one computation rule being true. The CPL program defining this function is as follows:

choose_first : :=x,y -> x

Late_Payment_Score_cp : :=cont_vals -> collect (0, choose_first) (select (value) (cont_vals))

The Calculate_Cust_Value module 528 (FIG. 5) is specified using computation rules and a combining policy and the DL specification for this module is shown in FIG. 18. The computation rules specified in lines 9–19 specify the contributions to the CUST_VALUE attribute based on the input attributes. The combining policy as specified in lines 20–23 is a CPL function, calculate-cust-val-cp, and indicates that the contributions of rules with a true condition are added and rounded up, with a maximum of 100. The result is assigned to the attribute CUST_VALUE. If no rule evaluates to a true valve, then the CUST_VALUE attribute is assigned the default value 0. The CPL program defining this function is as follows:

Calculate_cust_Value_cp : :=cont_vals -> min _of (round_up (sum_true (cont_vals)), 100)

The Calculate_Marketing_vs._Collections module 532 (FIG. 5) is specified using computation rules and a combining policy and the DL specification for this module is shown in FIG. 19. The computation rule specified in lines 8–16 specifies the contributions to the MARKETING_VS_COLLECTIONS attribute based on the input attributes. It is noted that in an actual implementation additional rules would likely be included. The combining policy as specified in lines 19–24 is a CPL function, marketing-vs-collection-cp, and indicates that the contribution of a true rule will be assigned to the attribute MARKETING_VS_COLLECTIONS, or if there is no rule evaluating to a true value, then the MARKETING_VS_COLLECTIONS attribute will be assigned the default value "marketing". In this module, it is assumed that all computation rules (not all shown) have the effect of contributing the value "collect", and so there is no inconsistency if more than one rule has a true condition. The CPL program defining this function is as follows:

marketing_vs_collection_cp : :=cont_vals -> collect ("marketing",choose_first) (select (value) (cont_vals))

Returning now to FIG. 2, module 250 will be described in further detail. As described above in conjunction with FIG. 9, module 250 contains 6 sub-modules. The Ask_Reason_For_Call module 910 will be evaluated if the CUST_VALUE attribute has a value less than 7, as indicated by enabling condition 912. Module 910 is represented as a rectangle, which indicates that the module is a foreign module. Module 910 requires an IVR interaction and asks the caller the reason for calling. The reason is assigned to attribute IVR_CHOICE. The DL textual specification for module 910 is show in FIG. 20. The computation steps are set forth in lines 8–12, which indicate that the attribute IVR_CHOICE will be assigned the value "dom" or "intl" or the state of this attribute will be EXCEPTION with an exception value of 1, depending on the response to the IVR question. This module has a side-effect, as indicated in lines 14–15. The side effect is an IVR_dip, which will initiate an IVR question to the caller using the external IVR component 112 (FIG. 1).

Module 920 is represented as a hexagon, which indicates that this module is a decision module and is specified using computation rules and a combining policy. The DL specification for module 920 is shown in FIG. 21. The computation rules specified in lines 12–30 specify the contributions to the BUSINESS_VALUE_OF_CALL attribute based on the input attributes. The combining policy as specified in lines 31–34 is a CPL function, business-value-of-call-cp, and indicates that the contribution of the rules with a true condition are added and rounded up with a default value of 0. The CPL program defining this function is as follows:

Business_Value_of_Call_cp : :=cont_vals ->
round_up (sum_true (cont_vals))

The DL specification for the Calculate_Send_Bonus_Check module 930 is shown in FIG. 22. This module is represented as a rectangle, which indicates that this is a foreign module. This module will only be evaluated if the enabling condition specified in lines 5–13 is True. In such case, the module performs the side-effect action of issuing a check to a customer as specified in lines 16–17.

As shown in FIG. 9, all remaining sub-modules of the Routing_Decisions module 250 are represented as hexagons, which indicates that these modules are decision modules and are specified using computation rules and a combining policy. Turning now to the Calculate_Call_Priority module 940 module, the DL specification for this module is shown in FIG. 23. The computation rules specified in lines 8–20 specify the contributions to the CALL_PRIORITY attribute based on the input attributes. The combining policy as specified in lines 21–22 is a CPL function, call-priority-cp, and indicates that high value wins with a default value of 2. This means that the single highest contribution value for a true rule is the value that is assigned to the CALL_PRIORITY attribute. Thus, after all the computation rules are evaluated, there will be a collection of all the results, with the true rules contributing the value specified in the rule, and the false rules contributing ⊥. The combining policy will choose the highest value in the collection and assign that value to the output attribute CALL PRIORITY. If no rule has a true condition, then the value of 2 is assigned to CALL_PRIORITY. The CPL program defining this function is as follows:

choose_sup : :=x,y -> if (x >=y) then x else y;
Call_Priority_cp : :=cont_vals -> collect (2<choose_sup) (select (value) (cont_vals)

The DL specification for the Calculate_Skill module 950 is shown in FIG. 24. The computation rules specified in lines 11–40 specify the contributions to the SKILL attribute based on the input attributes. The combining policy as specified in lines 41–45 is a CPL function, skill_cp, and indicates a weighted sum policy with ties being broken by the given ordering. Referring back to the computation rules, each true rule will contribute both a value and a weight to the SKILL attribute. For example, if the computation rule on lines 14–15 is evaluated to True, then the value high_tier with a weight of 40 is contributed to the SKILL attribute. After all the computation rules are evaluated, the sum of each of the weights for a particular value is computed, and the value that has the greatest weight is assigned to the SKILL attribute. If there is a tie between the weights of two different values, the value assigned to the SKILL attribute is determined by the ordering given by the combining policy. As an example, suppose the computation rule in line 28 and the computation rule in lines 32–35 are both evaluated to true. The computation rule in line 28 will contribute the value norm_tier_dom with a value of 30, and the computation rule in lines 32–35 will contribute the value norm_tier_dom with a value of 20. If these were the only two rules which contributed weights to the value norm_tier_dom, then the value norm-tier_dom would have a combined weight of 50 (30+ 20) when the combining policy was evaluated. If this combined weight of 50 for the value norm_tier_dom was the highest combined weight of any value, then the value norm_tier_dom would be assigned to the output attribute SKILL. The CPL program defining this function is as follows:

```
aggval : := X -> tupling ( hash:= x.hash; val :=
    sum_true(x,vals,0))
complist : :=
    [" collections" ," australia_promo" ," high_tier" ,
    " low_tier_intl" ," low_tier_down" ]
ccomplist : := enum (complist)
compsel : := X -> x.f_a.val = x.s_a
poslist : := X -> (select(compsel) (factor(ccomplist,x) )#0.t_a.pos
compval : := X,y -> if (x,val > y.val) then x
                else if y.val > x.val then y
                elseif poslist(x) < poslist(y) then x else y
Skill_cp : := cont_vals -> collect(NULL, compval) (map (aggval)
    (group (cont_vals) ) )
```

The DL specification for the Calculate_On_Queue_Promo module 960 is shown in FIG. 25. The computation rules specified in lines 8–13 specify the contributions to the ON_QUEUE_PROMO attribute based on the input attribute. The combining policy as specified in lines 14–15 is a CPL function, on-queue-promo-cp, and indicates first true wins with a default of 0. In accordance with this combining policy, the contribution of the true rule will be assigned to the attribute ON_QUEUE_PROMO. As described above, a constraint on this type of combining policy is that one and only one computation rule may evaluate to true. The CPL program defining this function is as follows:

on_Queue_Promo_cp : :=cont_vals -> collect (NULL,
choose_first) (select(value) (cont_vals))

Returning to FIG. 1, the above description described the DL specification 102. We now turn to a description of the decision engine 104 which will take the DL specification 102 and implement the specified workflow when an object (e.g., incoming call) is received at the workflow system 100. The following description will describe two embodiments of a decision engine 104. The first embodiment implements a straightforward execution of the workflow. The second embodiment implements an improved workflow execution which utilizes optimization strategies.

Figure 26:
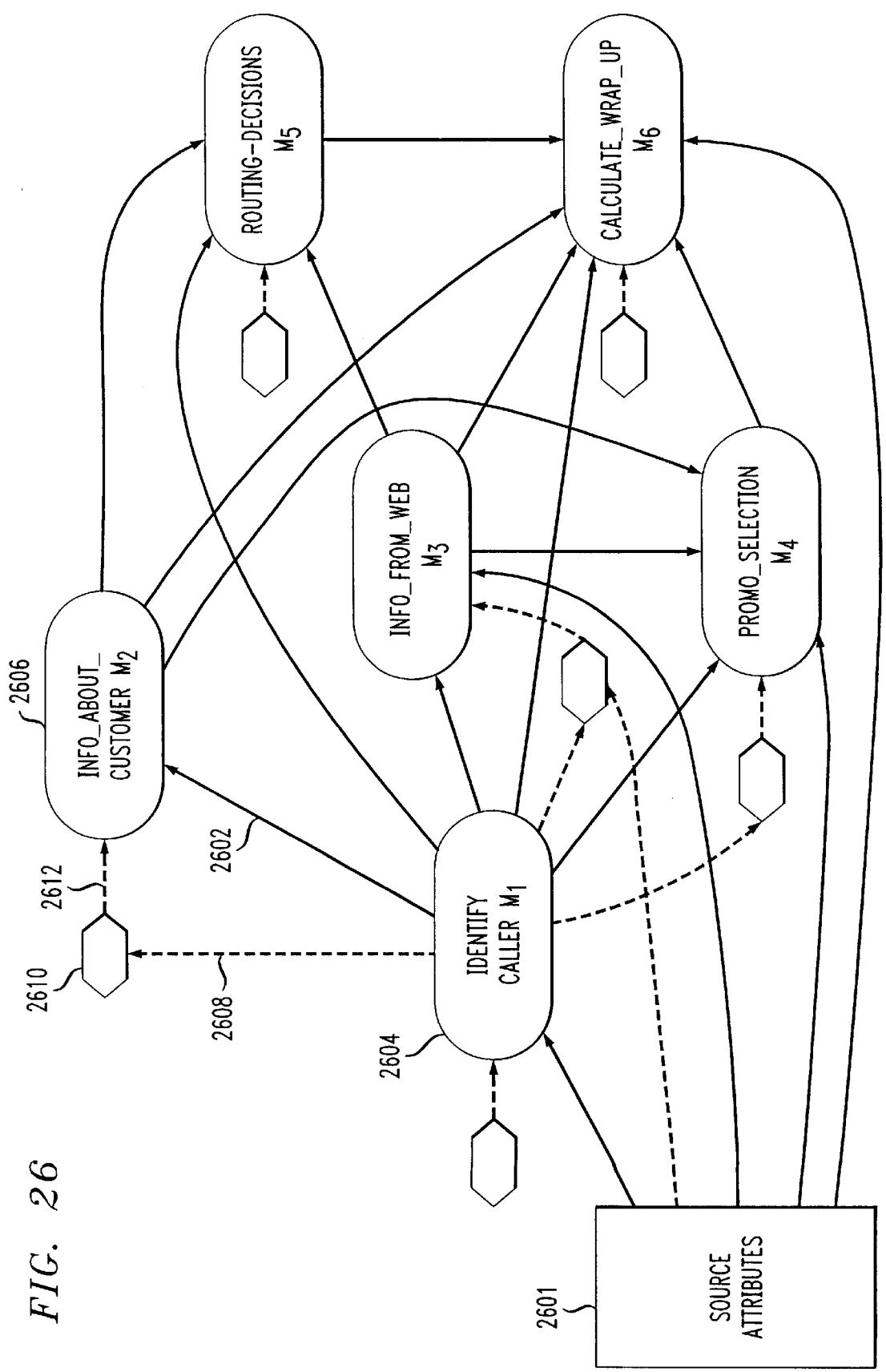
FIG. 26 shows a data and enabling flow diagram.

The first embodiment of the decision engine 104 requires that a topological sort of the modules be created. In order to describe the topological sort, first the data and enabling flow diagram shown in FIG. 26 will be described. This diagram illustrates the data flow dependencies and the enabling flow dependencies of the workflow described above. Each of the modules (ovals) and enabling conditions (hexagons) are represented as nodes with solid line data flow edges representing data flow dependencies and broken line enabling flow edges representing enabling flow dependencies. Node 2601 represents the source attributes. A data flow edge from a module M to a module M' indicates that an output attribute of M is used as an input attribute of M'. An enabling flow edge from a module M to the enabling condition of a module M' indicates that the enabling condition of M' uses an output attribute from M. Also, there is an enabling flow edge from each enabling condition to the module that it qualifies. For example, there is a data flow edge 2602 from the identify_caller module 2604 to the info_about_customer module 2606 because the input attributes ACCOUNT_NUMBER and CUST_REC of the info_about_customer module 2606 are output attributes of the identify_caller module 2604. There is an enabling flow edge 2608 from the identify_caller module 2604 to the enabling condition 2610 of the info_about_customer module 2606 because the attribute ACCOUNT_NUMBER used in the enabling condition 2610 is an output attribute of the identify_caller module 2604. There is an enabling flow edge 2612 from enabling condition 2610 to the module 2606 which it qualifies. Thus, FIG. 26 shows the data flow and enabling flow dependencies for the routing_to_skill module 202 (FIG. 2). The data flow and enabling flow dependencies for lower level modules could similarly be shown using data and enabling flow diagrams. It is noted that the data and enabling flow diagrams of the modules are acyclic. That is, there is no module M for which there is a directed path in the graph composed of data flow and control flow edges that starts at M and ends at M.

The first step of the decision engine 104 is to produce a topological sort of the modules in the workflow description. As is well known, a topological sort is an ordering of modules such that the ordering satisfies the following properties:

If module M precedes module M' in the ordering then:
  there is no directed path in the graph composed of data flow edges and enabling flow edges that starts at M' and ends at M.

Given the notation shown in FIG. 26, one topological sort for the modules shown in FIG. 26 is $M_1, M_2, M_3, M_4, M_5, M_6$. Topological sorts for lower level modules would be produced in a similar manner. After determining the topological sort, the modules may be executed such that a module is executed only after all preceding modules in the topological sort are completely finished executing and all attributes have been evaluated. Thus, given an ordering $M_1, M_2, \ldots M_N$, the modules are executed as follows:

enabling condition of $M_1$ is evaluated and if True, then module $M_1$ is completely executed, if False, then module $M_1$ is not executed;
  enabling condition of $M_2$ is evaluated and if True, then module $M_2$ is completely executed, if False, then module $M_2$ is not executed;
  enabling condition of $M_N$ is evaluated and if True, then module $M_N$ is completely executed, if False, then module $M_N$ is not executed.

The above steps describe how a determination is made as to whether a module will be executed. With respect to how a module is executed, it depends on the type of module. If the module is other than a decision module and therefore specified in terms other than computation rules and a combining policy, then the module is executed as specified in the module (e.g. C++ program, database dip, flowchart, declarative module, etc.), and the details of such execution will not be described in detail herein. If the module is a decision module specified in terms of computation rules and a combining policy, then the module is executed as follows:

for each computation rule
    test the condition for True or False
      If False, produce $\bot$ and add to collection
      If True, then compute the value of the term on the right side of the rule and add to collection.
  ( at this point have a collection of values and/or $\bot$)
  apply combining policy program to the collection of values to produce the attribute value
  assign attribute value to the attribute;
  execute any side-effect, if any.

The above described embodiment of the decision engine 104 executes the DL specification in a straightforward manner. That is, the various modules are executed sequentially in a topological order. However, the use of a more sophisticated execution technique can result in improved performance of the system. Such an execution technique will now be described.

For clarity of exposition, the more sophisticated execution technique for executing declarative modules will be described in a simplified context, but one skilled in the art will be able to extend the description presented here so that it can be used on arbitrary declarative modules. In the simplified context, the focus is on a DL program that consists of a declarative module with one or more internal modules. It is further assumed that each internal module computes exactly one attribute, and may have a side-effect. It is further assumed that once enabled, internal modules will always produce a value and will never produce an exception value. Because each internal module produces only one attribute, a single state can be used for an attribute and the module that produces it. The states for attributes (modules) in this context are {UNINITIALIZED, VALUE, DISABLED}. Finally, suppose that module M produces attribute A. Because A is the only attribute produced by M, for convenience in exposition we refer to attribute A as a side-effect attribute if M is a side-effect module. Similarly, we refer to attribute A as a non-side-effect attribute if M is a non-side-effect module.

When describing the more sophisticated execution technique, the term task is used to refer to an execution of a module during execution of an instance of the workflow. Thus, a task refers to the activity (actual or potential) of executing a module. As will be described below, in some cases a task will be identified but not carried out. For example, a module and input values for it may be identified as eligible for execution but subsequently be deemed unneeded for completing the workflow and thus not executed. A task is a side-effect task if the module underlying the task is a side-effect module. A task is a non-side-effect task if the module underlying the task is a non-side-effect module.

Figure 28:
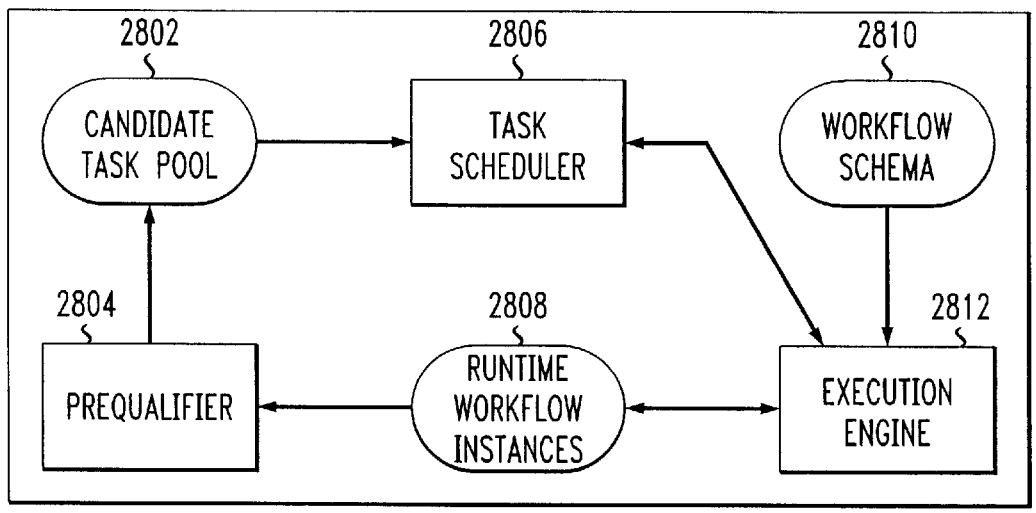
FIG. 28 shows a high level functional diagram of a decision engine.

A high level functional diagram of the decision engine 104 is shown in FIG. 28. The oval components represent data repositories and the rectangles represent software modules. The workflow schema 2810 represents the specification of how workflows are to be processed. For example, the workflow schema may be a DL specification as described above. Whenever a new object to be worked on is received (e.g. a new call enters a call center), a new instance of the workflow is created and stored in runtime workflow instances 2808. The execution engine 2812 works on a runtime workflow instance stored in 2808 in accordance with the workflow schema 2810 to execute the tasks in the workflow and to propagate the effects of the execution until the object has been fully processed. The execution engine 2812 works in a multi-thread fashion, so that it processes in parallel multiple workflow instances and multiple tasks within each instance. The task scheduler 2806 schedules the tasks that will be executed by the execution engine 2812. The task scheduler 2806 dynamically chooses the tasks to be executed from the candidate task pool 2802, which is maintained by the prequalifier 2804.

The decision engine 104 executes tasks in an eager fashion, that is, the decision engine 104 will use available computing resources to execute tasks prior to fully determining whether such tasks are required for processing the workflow instance for a given object. Such speculative execution generally improves the performance of the system by reducing the response time (i.e., the time it takes to process inputs to the system) because computing resources will be fully utilized. Of course, by eager execution of tasks, certain tasks will be executed unnecessarily. However, the overall performance will be improved by eagerly executing certain tasks which, in fact, are needed to fully process the workflow instance.

The presence of side-effect modules imposes an important restriction on the eager evaluation of tasks. In particular, in a workflow instance a side-effect module should not be executed eagerly unless it is known that the module would also be executed in accordance with the declarative meaning of the DL specification. This restriction is motivated by the assumption that the processing impact of executing a side-effect module is so significant that the possible benefit of eager execution of the module is outweighed by the desire to avoid execution that is not justified by the meaning of the DL specification.

The prequalifier 2804 will determine three key properties of tasks which substantially improves the performance of the decision engine 104. Tasks which are eligible for eager evaluation are tasks which may be immediately evaluated, but which may or may not be required for complete processing of the workflow instance for a given object. It is noted that immediate execution of an eligible task will not violate the intended meaning of the DL specification. Tasks which are unneeded are tasks which are not needed for complete processing of the workflow instance for a given object. Tasks which are necessary are tasks which are known to be needed for complete processing of the workflow instance for a given object. By using these three characteristics of tasks, decision engine 104 can substantially improve its performance. Tasks which are eligible but unneeded may be deleted from the candidate task pool 2802, and tasks which are eligible and necessary may be given high priority because it is known that these tasks will be required for complete processing.

Algorithms for determining whether tasks are eligible, unneeded, or necessary will be described below. Because of the complexity of the algorithms, the description will proceed in steps. First, an algorithm, identified as the basic algorithm, for determining whether tasks are eligible or unneeded will be described. Thereafter, an extension to the basic algorithm, identified as the extended algorithm, for further determining whether tasks are necessary will be described.

In order to describe the algorithms, several definitions must be introduced. For purposes of this description, assume that a workflow schema S=(Att, Src, Tgt, Eff, Cnd, Mod) is fixed. This schema provides a mathematical formalism for describing DL specifications of declarative modules. The elements of the schema S are as follows:

Att is a set of attributes;

Src is the set of source attributes;

Tgt is the set of target attributes;

Eff is the set of side-effect modules;

Cnd is the set of enabling conditions; and

Mod is the set of modules.

Recall that in the simplified context, each module produces as output a single non-source attribute. The algorithms described here focus on determining sets of attributes that are eligible, unneeded, or necessary. We also apply these terms to the modules associated with attributes, and to the tasks associated with those modules. For example, if attribute A is found to be eligible in the context of an execution of a workflow instance, then we also say that the module M that defines A is eligible in that context. Further, the task T of executing module M (whether this execution occurs or not) is said to be eligible in that context.

In order to implement the basic algorithm, additional states (i.e., in addition to those described above) for attributes must be defined. The states used in the algorithm are:

UNINITIALIZED

ENABLED

READY

READY+ENABLED

COMPUTED

VALUE

DISABLED.

It is noted that the states EXCEPTION, and FAIL were defined above as attribute states, but are not used in conjunction with the simplified context for describing the execution algorithm.

In the context of the execution of a workflow instance, the states for an attribute A are defined as follows. Initially, an attribute A will be in the state UNINITIALIZED. This indicates that the attribute A has not yet been considered in the execution. The state ENABLED indicates that it has been determined that A's enabling condition is, or will eventually be, True, but it is not yet determined whether A's input attributes are stable (i.e., the input attributes are in the state "value" or "disabled"), and the value for A has not yet been computed. The READY state indicates that the input attributes for A are stable, but no determination has been made as to whether A's enabling condition is true or false, and the value of A has not been computed. The state of READY+ENABLED indicates that the input attributes for A are stable and the enabling condition for A is true, but the value for A has not been computed. The state COMPUTED indicates that the value for A has been computed but it has not been determined whether the enabling condition for A is true or false. The state DISABLED indicates that the enabling condition for A is, or will eventually be, false. The state VALUE indicates that the value for A has been computed and the enabling condition for A is, or eventually will be, true.

Figure 29:
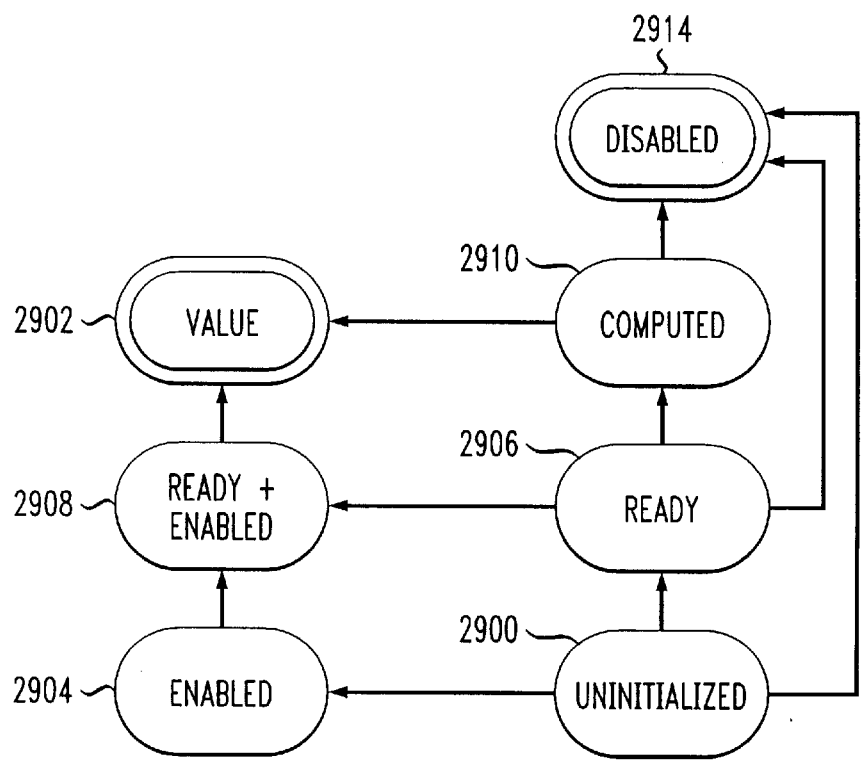
FIG. 29 shows the finite state automata for a non-side-effect attribute.
Figure 30:
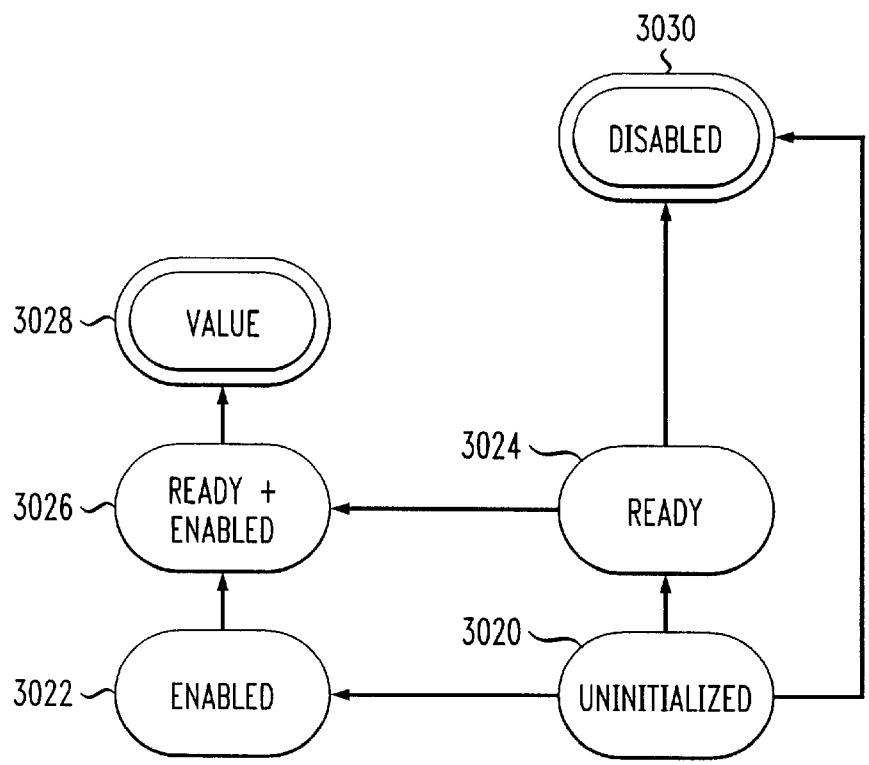
FIG. 30 shows the finite state automata for a side-effect attribute.

FIGS. 29 and 30 show the finite state automata (FSA) for this extended family of states. FIG. 29 shows the FSA for a non-side-effect attribute, and FIG. 30 shows the FSA for a side-effect attribute. The difference between the FSA for a non-side effect attribute (FIG. 29) and a side-effect attribute (FIG. 30) is that for side-effect attributes, the COMPUTED state is omitted. This is because, since the execution of modules computing side-effect attributes has significant impact on a system or user that is external to the workflow system, such modules should not be executed until it is known that their enabling conditions are, or eventually will be, true. For example, it would be undesirable to initiate an IVR side-effect which asks a caller to provide certain information if that information is not required for complete processing of the object. The states VALUE and DISABLED are represented in FIGS. 29 and 30 with double lines to indicate that they are terminal states for the attributes. If an attribute is in a terminal state then that attribute is considered stable.

The notion of a snapshot will now be described. Snapshots are used to represent different stages in the execution of individual workflow instances. Let Att be a set of attributes with associated states. For each attribute A the type of A is denoted by $\tau(A)$. A snapshot for Att is a pair $s=(\sigma,\mu)$ where 1. the state mapping $\sigma$ is a total function from Att into {UNINITIALIZED, ENABLED, READY, READY+ENABLED, COMPUTED, VALUE, DISABLED}
2. The value mapping $\mu$ is a partial function from Att into $\cup\{\tau(A)|A\epsilon Att\}$, such that for each A, $\mu(A)$ is defined iff $\sigma(A)$=VALUE or $\sigma(A)$=COMPUTED. If $\mu(A)$ is defined then $\mu(A)\epsilon\tau(A)$.

Thus, a snapshot is a data structure which stores the state ($\sigma$) of each attribute, and if the state of an attribute is VALUE then the data structure also stores the value ($\mu$) of the attribute. The snapshot contains relevant information at a particular point during workflow execution. As execution of the workflow progresses, the snapshot will change to reflect the new information determined during execution.

One snapshot s' extends another snapshot s (specified as s<s') if for each attribute A:

(a) if A has a value in s, then A has the same value in s'; and
(b) the state of A in s'$\geq$ the state of A in s;

where $\geq$ is relative to the FSAs of FIGS. 29 and 30. Thus, criteria (b) means that the state of A in s' is equal to, or at a higher level in the FSA than, the state of A in s.

One snapshot s' strictly extends another snapshot s if for at least one attribute A, the state of A in s' is>the state of A in s.

A snapshot s is complete if each attribute A in s is stable. That is, each attribute has a state of VALUE or DISABLED.

For the purposes of describing the execution algorithm a particular formal definition for enabling conditions in DL specifications is now presented. One skilled in the art will be able to use the techniques described here in connection with DL specifications that use a different formalism for enabling conditions and/or enabling conditions that can test values and properties different than those tested by the enabling conditions presented here.

A denotes attributes, term denotes terms, and pred denotes Boolean functions (such as comparison term $\theta$ term) on terms which do not refer to states of attributes. The syntax of conditions is given by the following:

cond : :=pred(term, . . . ,term)|VALUE(A)|DISABLED (A)|::=cond|cond ¬cond|cond ∨cond The truth value of conditions is given by the standard two-valued logic when the involved attributes are stable, except that pred($t_1$, . . . ,$t_k$) is true if all attributes referred to by pred($t_1$, . . . ,$t_k$) have state VALUE and pred($t_1$, . . . ,$t_k$) is true in the standard sense, and it is false otherwise. Thus, when evaluating an expression, if one or more of the attributes is in the state DISABLED, then the truth value is false. Note that this logic does not always behave in the standard way (e.g. A>3∨A$\leq$3 is not a tautology). The truth value of a condition in a snapshot s where all attributes occurring in a condition $\gamma$ are stable, is denoted TruthVal($\gamma$, s).

A complete snapshot is enabling-consistent if for each attribute A which is not a source attribute, the state of A is VALUE if and only if the truth value of the enabling condition of A relative to s is true.

A second notion of consistency concerns the relationship between the values of the attributes and the modules that define them. To provide an interpretation for the behavior of modules we define an environment for schema S to be a mapping $\epsilon$ such that, for each module M in $S_1$ if M has input attributes $B_1$, . . . , $B_n$ and output attribute 1 then $\epsilon$ (M) is a total mapping from $(T(B_1)\cup\perp)$ x . . . x $(T(B_n)\cup\perp)$ to T (A). The use of a static environment in this formalism is a convenience for this description. In practice, DL workflows will operate in the context of a dynamic world, i.e., the environment associated with a given workflow instance may be the result of combining the behaviors of different modules at different points in time, rather than from a single point in time.

A complete snapshot s is $\epsilon$-consistent for environment $\epsilon$ if for each attribute A such that $\sigma(A)$=VALUE, $\mu(A)$ is equal to the A-value computed by $\epsilon$ (M) ($\mu(B_1)$, . . . , $\mu(B_n)$), where M is the module producing attribute A and has input attributes $B_1$, . . . , $B_n$. (Note that if $B_i$ does not have state VALUE in s for some i, then $\mu(B_i)=\perp$.)

An environment $\epsilon$ is compatible with snapshot s if it agrees with all defined values of $\mu$ in s.

For a snapshot s, $s|_{Src}$ denotes the snapshot whose state and value functions agree with those of s on all source attributes, and such that all non-source attributes have state UNINITIALIZED.

A snapshot s over S is permissible if (i) there exists an environment $\epsilon$ that is compatible with s, and (ii) for each environment $\epsilon$ compatible with s, if s' is a complete snapshot that extends $s|_{Src}$ and is compatible with $\epsilon$, then s' extends s and the set of side-effect modules with state in {ENABLED, ENABLED+READY, VALUE} in s is a subset of the set of side-effect modules with state VALUE in s'.

It is noted that the notion of permissible snapshot captures in an absolute sense the family of snapshots s such that all determinations in s concerning whether attributes are ENABLED or DISABLED and all side-effect actions that were executed in s are consistent with the declarative semantics associated with S. In practical situations (e.g., in situations where the condition language includes integers with addition and multiplication) the determination of whether a snapshot is permissible or not is undecidable, i.e., there is no algorithm that always terminates that determines whether, for a given DL schema S and snapshot s, whether s is permissible for S. Even when the condition language is restricted to permit atomic types with equality, deciding whether a snapshot is permissible is intractable. However, it is possible to develop sufficient conditions for permissible that are tractable, even if the condition language is quite rich.

In the algorithm developed here, execution of workflow S begins with a snapshot such that all source attributes are stable and all other attributes are in state UNINITIALIZED. Then a sequence of permissible snapshots is constructed, each one a strict extension of the previous one. Execution halts when a terminal snapshot is reached.

A non-source attribute A is absolute-enabled for permissible snapshot s if for each complete snapshot s' that extends s, A has state VALUE. A non-source attribute A is absolute-disabled for snapshot s if s is permissible and for each complete snapshot s' that extends s, A has state DISABLED.

Given a permissible snapshot s over S then:

A side-effect attribute A is absolute-eligible in s if A is absolute-enabled and each input attribute for A is stable.

A non-side-effect attribute A is absolute-eligible in s if each input attribute for A is stable.

A snapshot $s=(\sigma,\mu)$ over S is terminal if s is permissible and $\sigma(A)\epsilon$ {VALUE,DISABLED} for each A$\epsilon$Tgt. That is, a snapshot is terminal if it is permissible and all target attributes are stable.

A snapshot s over S is minimal terminal if s is terminal and s is not a strict extension of another terminal snapshot for S.

An attribute A is absolute-unneeded for permissible snapshot s over S if for each minimal terminal snapshot s'=($\sigma'$,$\mu'$) that extends s, $\sigma'$(A)$\notin$ {COMPUTED,VALUE}.

As with the definition of permissible, the notions of absolute-eligible and absolute-unneeded define, in an absolute sense, all eligible attributes and all unneeded attributes, for a given permissible snapshot during execution of a workflow schema. However, the actual computation of all eligible or unneeded attributes is not possible in practical situations, e.g., if the condition language includes integers with addition and multiplication. Even if the condition language is limited to include only atomic types with equality, computing all eligible or unneeded attributes is intractable. Thus a subset of absolute-eligible and absolute-unneeded attributes is determined in order to improve the performance of a workflow execution.

The basic and extended algorithms are used to determine which attributes to evaluate eagerly, that is, which attributes should be computed even though not all of the attributes occurring in their associated enabling conditions have become stable. Such an analysis involves partial computations of conditions, since the conditions may depend on attributes which have not yet been computed. In order to represent such partial computations, a three valued logic is used. The truth value for a given condition may be true, false, or unknown. Instead of considering each enabling condition as one indivisible three-valued logic formula, enabling conditions are represented by trees. This gives more precise knowledge as to which sub-formulas are true and which are false. Condition trees are used for this purpose.

A condition tree of an enabling condition P is obtained from the parse tree (as well known in the art) of P by replacing each leaf node p of the form pred($t_1$, . . . , $t_k$) with a tree T(p) defined as:

the root node of T(p) is an AND operator node;
pred($t_1$, . . . , $t_k$) is a leaf node of T(p); and
VALUE (A) is a leaf node of T(p) if A occurs in pred ($t_1$, . . . , $t_k$). All the leaf nodes are directly connected to the root node.

Figure 31:
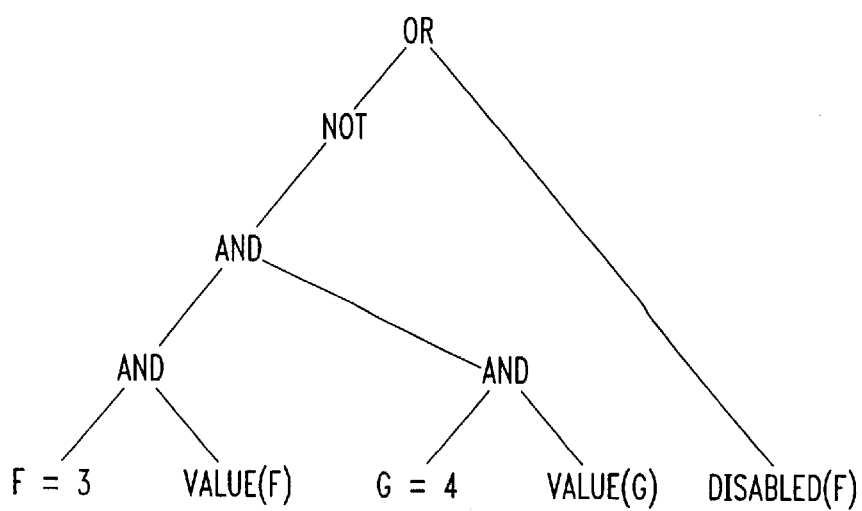
FIG. 31 shows the condition tree for an example enabling condition.

For example, consider the enabling condition: (NOT(F=3 AND G=4)) OR DISABLED (F). The condition tree for this enabling condition is shown in FIG. 31.

Now, in order to determine which tasks may be computed eagerly, a dependency graph is defined which will take into account the dependencies between the enabling conditions and the attributes, and the dependencies between the attributes themselves. The dependency graph is defined as follows. Given a workflow schema S, the dependency graph of S, denoted $D_S$, is a directed acyclic graph that is constructed as follows:

each enabling condition in the workflow schema S is represented by its condition tree in $D_S$;
each attribute in A is a node in $D_S$;
there is an edge from the root node of each condition tree to the attribute node attached to the associated enabling condition in S;
there is an edge from an attribute A to a predicate node p if and only if A occurs in p;
there is an edge from an attribute A to an attribute B if and only if A is an input attribute of B.

Figure 32:
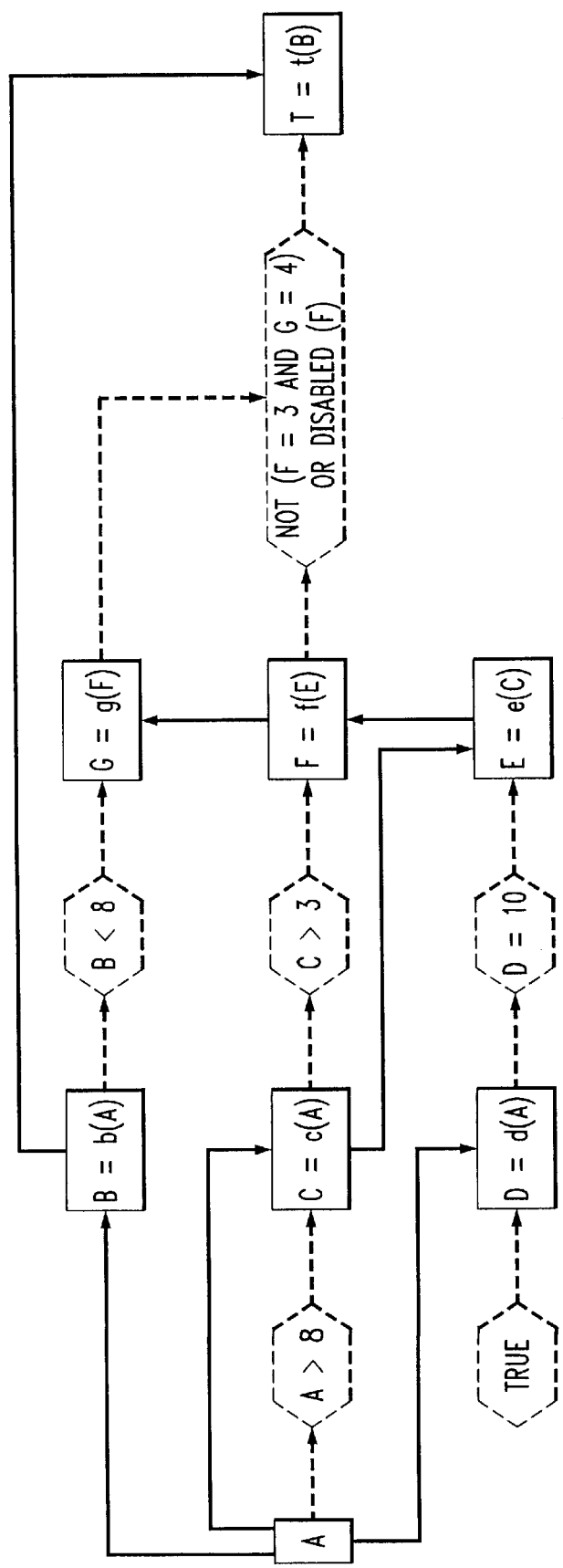
FIG. 32 shows a data and enabling flow diagram.
Figure 33:
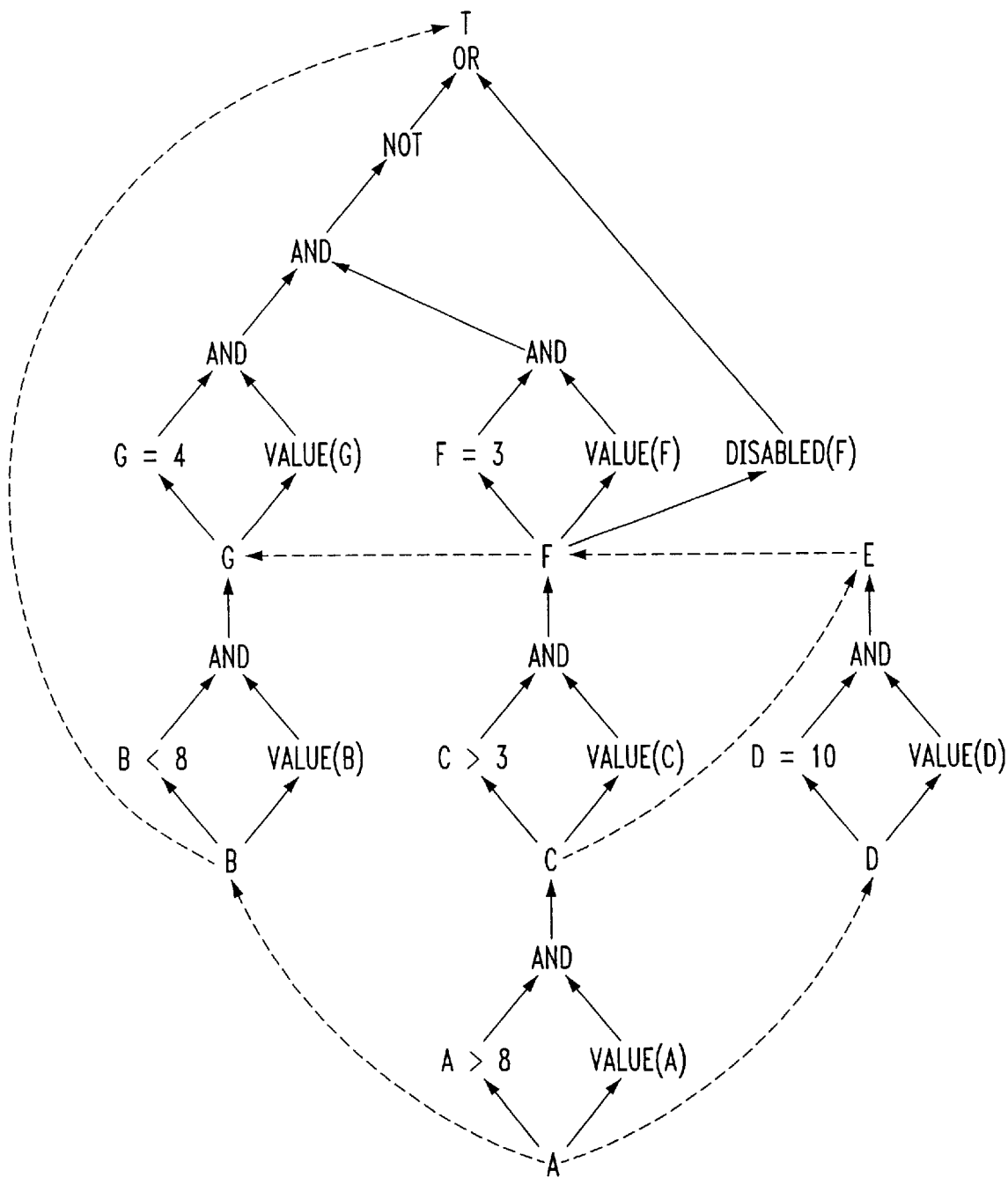
FIG. 33 shows a dependency graph.

As an example, consider the workflow schema represented by the data and enabling flow diagram of FIG. 32. As described above in conjunction with the data and enabling flow diagram of FIG. 26, the data and enabling flow diagram of FIG. 32 illustrates the data flow dependencies (solid lines) and the enabling flow dependencies (broken lines) for a given workflow schema. Given the workflow schema represented in FIG. 32, the dependency graph for that workflow schema is shown in FIG. 33. In FIG. 33, all nodes belonging to an evaluation tree are condition nodes, with the remaining nodes being attribute nodes. The edges between attribute nodes are shown with broken lines and are data edges and the edges between condition nodes are shown with solid lines and are called condition edges.

Finally, prior to describing the basic algorithm, the notion of an extended snapshot must be defined. An extended snapshot is a tuple $$s=(\sigma, \mu, \alpha, \text{Hidden-att}, \text{Hidden-edge})$$

where:

(a) the state mapping $\sigma$ is a total function from Att into {UNINITIALIZED, ENABLED, READY, READY+ ENABLED, COMPUTED, VALUE, DISABLED)

(b) The value mapping $\mu$ is a partial function from Att into $\cup\{\tau(A)|A\in\text{Att}\}$, such that for each A, $\mu$(A) is defined iff $\sigma$(A)=VALUE. If $\mu$(A) is defined then $\mu$(A)$\in\tau$(A)

(c) a maps each condition node to T (true), F (false), or U (unknown)

(d) Hidden-att is the set of attributes which have been hidden (the notion of a hidden attribute will be described below); and (e) Hidden-edge is the set of edges (both data edges and condition edges) which have been hidden (the notion of a hidden edge will be described below).

The pseudo code for the basic algorithm for determining whether a task is eligible or unneeded is shown in FIGS. 34A–D. Generally, the algorithm starts at the beginning of the execution of a workflow instance and ends when the execution is completed. The prequalifier 2804 (FIG. 28) executes this algorithm for each workflow instance. The algorithm computes and incrementally maintains the states (in an array $\sigma$[ ]) and the values (in the array $\mu$[ ]) of the attributes defined in the workflow schema 2810. In order to carry out its computations, the algorithm uses the dependency graph $D_S$. It incrementally computes a set of nodes called hidden-att such that the attribute nodes contained in the set hidden-att are stable or unneeded, and a set of edges called hidden-edge where edges contained in hidden-edge are edges which have been traversed by the algorithm, and do not have to be considered again by the algorithm. More generally, if an attribute or edge is "hidden", then the information embodied in that attribute or edge relevant to the algorithm has already been used during execution and possibly incorporated into the snapshot, and will not be needed in any subsequent step of the algorithm. The algorithm also maintains an array of three valued logic values ($\alpha$[ ]) for condition nodes. The algorithm consists of two main phases. The first phase is an initialization phase which is executed once at the beginning of execution of a workflow instance. The second phase is the incremental phase which is executed each time a value of an attribute is computed by the execution engine 2812 and incorporated into the runtime workflow instances 2808. The incremental phase is also executed for the source attributes when the workflow instance is initially placed into workflow instances 2808.

The pseudo-code for the basic algorithm shown in FIGS. 34A–D will now be described. Section 3402 of the algorithm is the definition of the global variables. Section 3404 is the definition of some of the notations used in the algorithm. The initialization phase 3406 is executed once at the beginning of execution of a workflow instance in order to initialize the required data structures. In section 3408, the states and values of the attribute nodes of the dependency graph are initialized such that the state of the source attribute nodes are initialized to a state of READY+ENABLED and all other attribute nodes are initialized to a state of UNINITIALIZED. The values ($\mu$) of the attributes are set to null. In section 3410, the logic values ($\alpha$[ ]) for condition nodes are initialized to unknown. In section 3412, the set of hidden edges and hidden attributes is set to null. This is the end of the initialization phase 3406.

The remainder of the pseudo code defines the incremental phase. Each time a new value for an attribute is computed by the execution engine 2812 (FIG. 28), the increment function 3414 is called as part of the operation of the prequalifier 2804. The increment function is also called by the prequalifier 2804 at the beginning of processing a workflow instance, once for each source attribute. The increment function 3414 then calls the propagate_att_change function 3422 which in turns recursively calls the propagate_cond_change function 3450 in order to propagate changes along the dependency graph. Both the propagate_att_change function 3422 and the propagate_cond_change function 3450 call the recursively defined functions hide_edge 3474 and hide_node 3476. These functions will now be described in further detail.

The increment function is shown in section 3414. As shown by the input section 3416, this function is called when a value v has been computed for an attribute A in the dependency graph G. First, the value ($\mu$) of the attribute is updated in step 3418. Next, in section 3420 the propagate_att_change function is called. If the current state of attribute A is READY, then the propagate_att_change function is called with parameters indicating that the state of A should be updated to COMPUTED. If the current state of attribute A is ENABLED+READY then the propagate_att_change function is called with parameters indicating that the state of A should be updated to VALUE. The increment function then ends.

The propagate_att_change function is shown in section 3422. The input to this function, as shown in section 3424, is an attribute B and a state ($\sigma$) for B. In section 3426 the state ($\sigma$) for attribute B is updated. In section 3428, changes are propagated up the dependency graph as a result of the newly computed attribute as follows. If the state of the attribute B has changed to VALUE or COMPUTED, then in section 3430 an attempt is made to evaluate predicate nodes which use the value of B. Thus, for each condition node in which B occurs in the predicate (line 3432) and for which the edge in the dependency graph from B to the predicate is not currently hidden (line 3434), the edge is hidden (line 3436) and an attempt is made to evaluate the predicate using the new value of B. If the predicate can be evaluated, then the logic value ($\alpha$) is updated to True or False and the change is propagated by calling the propagate_cond_change function (line 3438). The propagate_cond_change function will be described in further detail below. Thereafter, for each attribute node C which has B as an input attribute, if B has the state VALUE and the value for B is the last input attribute needed for C to go stable, then attribute C is promoted to the READY state by calling the propagate_att_change function (section 3440).

If the state of attribute B is ENABLED, then in section 3442 for each condition node p of the form VAL(B) the state of p ($\alpha$[p]) is set to TRUE, and for each condition node p of the form DIS(B) the state of p ($\alpha$[p]) is set to FALSE, and the changes are propagated by calling the propagate_cond_change function. This processing takes place because when it is known that an attribute B is enabled, then the truth value of VAL(B) must be true, because the attribute will eventually be assigned some value. Similarly, the truth value of DIS(B) is known to be false.

In a manner similar to that described above in conjunction with section 3442, if the state of attribute B is DISABLED, then in section 3444 for each condition node p of the form VAL(B) the state of p ($\alpha$[p]) is set to FALSE, and for each condition node p of the form DIS(B) the state of p ($\alpha$[p]) is set to TRUE, and the changes are propagated by calling the propagate_cond_change function. Thereafter, in a manner similar to step 3440, for each attribute node C which has B as an input attribute, if the value for B is the last input attribute needed for C to go stable, then attribute C is promoted to the READY state by calling the propagate_att_change function (section 3446).

The last line 3448 of the propagate_att_change function indicates that if the state of B has become DISABLED or VALUE (i.e., attribute B has become stable), then the node is hidden. The propagate_cond_change pseudo-code is shown in section 3450. This is a recursive algorithm which propagates condition changes up the dependency graph. The input to this function is a condition node p in the dependency graph G. The node n is the parent of the node p (line 3452). If the edge from p→n is not hidden, then section 3454 is executed. Otherwise, the function ends. First, the edge from p→n is hidden (line 3456). If the parent of p (n) is an OR condition node section 3458 is executed. If the truth value of condition node p is true, then the truth value of the parent node n ($\alpha$[n]) is set to true (because an OR condition is true if any of its components is true) and the change is further propagated up the dependency graph by recursively calling the propagate_cond_change function for node n (line 3460). If the truth value of condition node p is false and if there are no other non-hidden edges into the parent n, then the truth value of the parent node n ($\alpha$[n]) is set to false (because if there are no more non-hidden edges then there are no more possibilities for a component of n to be true), and the change is further propagated up the dependency graph by recursively calling the propagate_cond_change function for node n (3462).

If the parent of p (n) is an AND condition node section 3464 is executed. If the truth value of condition node p is false, then the truth value of the parent node n ($\alpha$[n]) is set to false (because an AND condition is false if any of its components is false) and the change is further propagated up the dependency graph by recursively calling the propagate_cond_change function for node n (line 3466). If the truth value of condition node p is true and if there are no other non-hidden edges into the parent n, then the truth value of the parent node n ($\alpha$[n]) is set to true (because if there are no more non-hidden edges then there are no more possibilities for a component of n to be false), and the change is further propagated up the dependency graph by recursively calling the propagate_cond_change function for node n (3468).

If the parent of p (n) is a NOT condition node then the truth value of the parent node n ($\alpha$[n]) is set to the inverse of the truth value of condition node p in 3470.

If the parent of p (n) is an attribute node, then the enabling condition for node n can now be evaluated and section 3472 of the pseudo code is executed. If the truth value of condition node p is true, then the propagate_att_change function is called to update the state of node n to ENABLED.

Otherwise, if the truth value of condition node p is false, then the propagate_att_change function is called to update the state of node n to DISABLED.

The hide_edge function is shown in section 3474. The hide_edge function receives as input an edge (n,n') in g. The function will hide a node n if the received edge (n,n') is the last non-hidden edge emanating from n.

The hide_node function is shown in section 3476. The hide_node function receives as input a node n in g. The function hides all edges into n.

When the basic algorithm is finished executing, there is a new updated snapshot stored in the memory of the system. Because of properties of the algorithm, this snapshot is permissible. A determination as to which attributes are eligible is made as follows. A non-side effect attribute is eligible if its state ($\sigma$) is READY or READY+ENABLED. A side effect attribute is eligible if its state ($\sigma$) is READY+ENABLED. Recall that if an attribute A is determined to be eligible for execution then the task corresponding to execution of the module that defines A is also viewed as eligible for execution. Thus, since side-effect tasks have significant impact external to the workflow system, a side-effect task is eligible for eager evaluation only if the data is available for its evaluation and if it is known that its enabling condition will ultimately be true (i.e. the corresponding attribute is in state READY+ENABLED). Non-side-effect tasks, on the other hand, have no significant external impact, and a non-side-effect task may be considered as eligible for eager evaluation when its data inputs are available, whether or not it is known that its enabling condition will ultimately be true (i.e. the corresponding attribute is in state READY or READY+ENABLED).

Further, a determination as to which attributes, and hence which tasks, are unneeded is made as follows. An attribute A is unneeded if the node for A in the dependency graph is hidden and the state of A is not COMPUTED or VALUE. The node of an attribute may become hidden if its value will not be used, directly or indirectly, in the evaluation of any target attribute. As a particular example, if the attribute is an input for some target attribute but partial evaluation of the enabling condition for the target attribute indicates that the enabling condition will take the value FALSE, and the attribute will not be used, directly or indirectly in the evaluation of any other target attribute, then the node of the attribute will become hidden. Recall that if attribute A is unneeded then the task corresponding to execution of the module producing A is also viewed as unneeded.

At this point, the prequalifier 2804 (FIG. 28) identifies all tasks which are eligible and not unneeded as candidate tasks and provides these candidate tasks to the candidate task pool 2802. If a task which was previously identified as eligible is newly identified as unneeded, then the corresponding task is removed from the candidate task pool 2802.

In determining that an attribute is ENABLED, READY+ENABLED, or DISABLED the algorithm may use a partial evaluation of the enabling condition of the attribute, i.e., an evaluation of all or part of the ultimate value of the enabling condition based on the states and/or values of some but not all of the attributes occurring in the enabling condition.

It is noted that the running time of this algorithm for executing the workflow S on an input is linear in the number of edges in $D_S$.

Given the above description and the pseudo code in FIGS. 34A–34D, one skilled in the art could readily implement the algorithm.

The basic algorithm will therefore update the snapshot when a new attribute value is computed and the updated snapshot allows a determination to be made as to whether a task is eligible and/or unneeded. As described above, another characteristic of tasks, namely necessary, is also used in order to improve the performance of the decision engine 104. If a task is known to be necessary to complete the workflow execution, then that task should be given high priority for evaluation.

Pseudo code for the extended algorithm for determining whether a task is necessary is described below in conjunction with FIGS. 35A–35G. In order to describe the extended algorithm, several definitions must be introduced.

Given an extended snapshot s=($\sigma,\mu,\alpha$, Hidden—att, Hidden—edge), an attribute A is a relative source attribute if each in-edge of A is an element of Hidden—edge.

A snapshot s=($\sigma,\mu,\alpha$, Hidden—att, Hidden—edge) is eager if and only if:

(a) For each relative source attribute A in S, $\sigma$(A) $\in$ {VALUE, DISABLED, READY+ENABLED};

(b) For each non-relative source attribute A, $\sigma$(A) $\geq$ ENABLED iff $\alpha$(n)=T where n is the root node of the enabling condition of A;

(c) For each non-relative source attribute A, $\sigma$(A) $\geq$ DISABLED iff $\alpha$(n)=F where n is the root node of the enabling condition of A;

(d) For each non-relative source attribute A, $\sigma$(A) $\geq$ READY iff for each input attribute B of A, $\sigma$(B) $\in$ {VALUE,DISABLED};

(e) For each non-relative source attribute A, $\sigma$(A) $\in$ {COMPUTED,VALUE} iff $\mu$(A) is defined;

(f) for each condition node n, $\alpha$(n) is defined accordance with the basic algorithm (section 3450) based on the value of $\sigma$ and $\mu$;

(g) Hidden-node is defined in accordance with the basic algorithm (section 3474) based on the value of $\sigma$ and $\mu$;

(h) Hidden—edge is defined in accordance with the basic algorithm (section 3476) based on the value of $\sigma$ and $\mu$.

It is noted that the snapshots produced by the basic algorithm will satisfy the above criteria for an eager snapshot.

There are four properties that are useful in determining necessary tasks: True-Necessary, False-Necessary, Value-Necessary, and Stable-Necessary. True-Necessary and False-Necessary properties give information about the necessary relationship between an attribute and a predicate. Intuitively, an Attribute A is True-Necessary for a condition node p if in order for $\alpha$(p)=T (in later snapshots), the value of A must be known. More formally:

Let D be a dependency graph, and let s=($\sigma,\mu,\alpha$, Hidden—att, Hidden—edge), be an eager snapshot. An attribute A is True-Necessary for a condition node p, if the following is true:

if for each eager snapshot s'=($\sigma',\mu',\alpha'$, Hidden—att', Hidden—edge') such that s<s', and $\alpha$'(p)=T, then $\sigma$'(A) is in {VALUE, COMPUTED}.

Intuitively, an Attribute A is False-Necessary for a condition node p if in order for $\alpha$(p)=F (in later snapshots), the value of A must be known. More formally:

Let D be a dependency graph, and let s=($\sigma$,82 ,$\alpha$, Hidden—att, Hidden—edge), be an eager snapshot. An attribute A is False-Necessary for a condition node p, if the following is true:

if for each eager snapshot s'=($\sigma',\mu',\alpha'$, Hidden—att', Hidden edge') such that s<s', and $\alpha$'(p)=F, then $\sigma$'(A) is in {VALUE, COMPUTED}.

Value-Necessary and Stable-Necessary properties give information about the necessary relationship between two attributes. Intuitively, an attribute A is Value-Necessary for an attribute B if the value of A must be known for later snapshots in which the state of B is COMPUTED or VALUE. More formally:

Let D be a dependency graph, and let s=($\sigma, \mu, \alpha$, Hidden—att, Hidden—edge), be an eager snapshot. An attribute A is Value-Necessary for an attribute node B, if the following is true:
if for any eager snapshot s'=($\sigma', \mu', \alpha'$, Hidden—att', Hidden—edge') such that s<s', and $\sigma'(B)$ is in {VALUE, COMPUTED}, then $\sigma'(A)$ is in {VALUE, COMPUTED}.

Intuitively, an attribute A is Stable-Necessary for an attribute B if the value of A must be known for later snapshots in which the state of B is VALUE or DISABLED (i.e. B is stable). More formally:

Let D be a dependency graph, and let s=($\sigma, \mu, \alpha$, Hidden—att, Hidden—edge), be an eager snapshot. An attribute A is Stable-Necessary for an attribute node B, if and only if for any eager snapshot s'=($\sigma', \mu', \alpha'$, Hidden—att', Hidden—edge') such that s<s', and $\sigma'(B)$ is in {VALUE, DISABLED}, then $\sigma'(A)$ is in {VALUE, COMPUTED}.

Thus, there are two ways for an attribute A to be Stable-Necessary for attribute B: 1) A is Value-Necessary for B (this implies that A is enabled) and A is False-Necessary for the Root of the enabling condition of B; or 2) A is True-Necessary for the root of the enabling condition of B and A is False-Necessary for the root of the enabling condition of B.

Thus, given these properties, an attribute A is necessary if A is Stable-Necessary for some target attribute.

Given the above properties and definition of necessary, it is noted that the notion of necessary is defined in an absolute sense, and includes all attributes whose values will be necessary for constructing a terminal snapshot using the basic algorithm (or more generally, execution based on the construction of a sequence of eager snapshots, each one extending the preceding one). However, the actual computation of all necessary attributes is not possible in practical situations, e.g., if the condition language includes integers with addition and multiplication. Even if the condition language is limited to include only atomic types with equality, computing all necessary attributes is intractable. Thus a subset of necessary attributes is determined in order to improve the performance of a workflow execution.

The extended algorithm for finding necessary attributes uses certain propagation rules in order to determine whether certain attributes are true-necessary, false-necessary, stable-necessary or value-necessary. Generally, the framework for the extended algorithm is as follows. Given a dependency graph which is maintained as described above in connection with the basic algorithm, attributes will have certain states associated with them, and certain attributes may be hidden. For each attribute which is not hidden and which is in the state READY or READY+ENABLED, the algorithm will determine whether the attribute is true-necessary, false-necessary, stable-necessary or value-necessary for some node. Using the propagation rules described below, these properties may be propagated up the dependency graph. If an attribute is found which is stable-necessary for a target attribute, then that attribute is considered necessary for completion of the workflow. These propagation rules will now be described.

First, a definition is necessary. A node n is a relative-predecessor of a node m in snapshot s if the edge (n,m) is an edge in dependency graph G and (n,m)$\notin$ Hidden-edges.

Given this definition, three sets of propagation conditions are now given. The first set gives sufficient conditions to propagate False-necessary and True-necessary properties across condition nodes. The second set gives sufficient conditions for a node A to be stable-necessary. The last set gives a sufficient condition for a node A to be Value-necessary.

The sufficient propagation conditions for True-necessary and False-necessary are as follows.

Let s be an eager snapshot, A an attribute node, and p a non-hidden predicate node:

(1) When p is an OR node, then A is true-necessary for p, if A is true-necessary for all the relative predecessors of p.

(2) When p is an OR node, then A is False-Necessary for p, if A is false-necessary for at least one direct predecessor of p.

(3) When p is an AND node, then A is true-necessary for p, if A is true-necessary for at least one relative predecessor of p.

(4) When p is an AND node, then A is false-necessary for p, if A is False-necessary for all relative predecessors of p.

(5) When p is a NOT node, then A is true-necessary for p, if A is false-necessary for the relative predecessor of p.

(6) When p is a NOT node, then A is False-necessary for p, if A is true-necessary for the relative predecessor of p.

(7) When p is a VAL(B) predicate, then A is true-necessary for p, if A is True-necessary for the root node of the enabling condition attached to B.

(8) When p is a VAL(B) predicate, then A is false-necessary for p, if A is false-necessary for the root node of the enabling condition attached to B.

(9) When p is a DIS(B) predicate; then A is true-necessary for p, if A is false-necessary for the root node of the enabling condition attached to B.

(10) When p is a DIS(B) predicate, then A is false-necessary for p, if A is true-necessary for the root node of the enabling condition attached to B.

(11) When p is a predicate of the form pred($t_1, \ldots, t_k$), then A is true-necessary for p, if it is value-necessary for at least one relative predecessor of p.

(12) When p is a predicate of the form pred($t_1, \ldots, t_k$), then A is false-necessary for p, if it is value-necessary for at least one relative predecessor of p.

The sufficient propagation conditions for stable-necessary are as follows. Let s be an eager snapshot, and let A and B be attribute nodes where A and B are not hidden:

(13) A is Stable-necessary for B, if $\sigma(A) \geq$ ENABLED and B is enabled in s and A is Value-necessary for B.

(14) A is stable necessary for B if $\sigma(A) \geq$ ENABLED and B is not enabled in s and A is value-necessary for B and A is false necessary for the root of the enabling condition of B.

(15) A is stable necessary for B if $\sigma(A) \geq$ ENABLED and B is not enabled in s and A is true-necessary for the root for the enabling condition of B and A is false-necessary for the root of the enabling condition of B.

The sufficient propagation conditions for value-necessary are as follows. Let s be an eager snapshot, and let A and B be attribute nodes where A and B are not hidden:

(16) A is value-necessary for B if $\sigma(A) \geq$ ENABLED and A is an input attribute of B.

(17) A is value-necessary for B if σ(A)≧ENABLED and A is stable-necessary for at least one of the input attributes of B.

(18) A is value-necessary for A if A ∈{ENABLED, READY+ENABLED}.

Finally, the propagation rule for an attribute to be necessary is as follows:

(19) An attribute A is necessary if it is stable-necessary for a target attribute.

The pseudo code for the extended algorithm for computing whether an attribute is necessary is shown in FIGS. 35A–35G. This extended algorithm is an extension of the basic algorithm described above in conjunction with FIGS. 34A–34D. Thus, the extended algorithm could be considered the main algorithm, which in turn calls portions of the basic algorithm. The extended algorithm starts at the beginning of the execution of a workflow instance and ends when the execution is complete. At each step of the execution, it computes the necessary attributes and marks them by setting a corresponding element in an array to true. This algorithm is based on the 19 propagation rules described above. The basic approach of the algorithm is, for each attribute A, to propagate along the dependency graph the properties true-necessary, false-necessary, value-necessary, and stable necessary. When the property stable-necessary for an attribute node A reaches a target attribute node, this means that attribute A is necessary.

The extended algorithm takes advantage of the stability (i.e. once discovered, a necessary property cannot change) of the necessary properties to avoid re-computing necessary properties discovered in prior steps of the execution. The algorithm is incremental in the sense that it propagates the necessary properties along the dependency graph G by only computing new necessary properties at each step. The necessary properties are kept track of by four global variables, F_N[ ][ ], T_N[ ][ ], V_N[ ][ ], and S_N[ ][ ], each of which are integer matrices. T_N[ ][ ] associates an integer value to each pair (p,A) where p is a condition node in G and A is an attribute node in G. T_N[p][A]=0 indicates that the attribute A is true-necessary for the condition node p. F_N[ ][ ] associates an integer value to each pair (pA) where p is a condition node in G and A is an attribute node in G. F_N[p][A]=0 indicates that the attribute A is false-necessary for the condition node p. V_N[ ][ ] associates an integer value to each pair (B,A) where B and A are attribute nodes in G. V_N[B][A]=0 indicates that the attribute A is value-necessary for the attribute node B. S_N[ ]o associates an integer value to each pair (BA) where B and A are attribute nodes in G. VN[B][A]=0 indicates that the attribute A is stable-necessary for the attribute node B.

At the beginning of the execution, each element of these matrices is initialized by a positive integer value. The initial value indicates how many decrements are required by the algorithm to guarantee that the corresponding necessary property is true (i.e. value=0). During execution, the algorithm decrements the value according to the propagation rules. For example, if p is an OR node, T_N[p][A] is initialized by the number of incoming edges to p. This corresponds to rule number (1) which states that A is true-necessary if all its predecessors are true necessary. F_N[p][A] is initialized with 1 since rule (2) states that A is false necessary as soon as one of its predecessors is false-necessary.

The extended algorithm will now be described in conjunction with FIGS. 35A–G. The global variables are defined in section 3502. The variables defined in section 3504 are the same as those defined in section 3402 (FIG. 34) with respect to the basic algorithm. The remaining global variables in section 3502 have been described above. The initialization phase of the algorithm is shown in section 3506. This section initializes the variables. Section 3508 is a call to the initialization phase of the basic algorithm, which was described above in conjunction with section 3406 of FIG. 34. Section 3510 initializes the variables T_N[ ][ ] and F_N[ ][ ] as described above in accordance with the propagation rules. In section 3511, for each OR condition node p, the corresponding entries T_N[p][A] are initialized to the number of predecessors of the node, in accordance with propagation rule (1). This is because for an attribute A to be true-necessary for p, A must be true necessary for all relative predecessors of p. In this way, T_N[p][A] will not reach 0 (indicating that attribute A is true necessary for condition node p), until it is decremented for each relative predecessor of p. Also, for each OR condition node p, the corresponding entries F_N[p][A] are initialized to 1, in accordance with propagation rule (2). This is because for an attribute A to be false-necessary for p, A must be false necessary for at least one relative predecessor of p. In this way, F_N[p][A] will reach 0 (indicating that attribute A is false necessary for condition node p), when it is decremented for any one relative predecessor of p.

The remainder of section 3510 continues in a similar manner initializing T_N and F_N for AND nodes, NOT nodes, nodes of the form VAL(A), DIS(A), and pred($t_1$, . . . , $t_k$) in accordance with the corresponding propagation rules. The corresponding propagation rules are indicated in section 3510 of FIG. 35B. Further, in section 3512 all attributes are 30 initialized to not stable-necessary and not value-necessary by setting S_N[ ][ ] to 1 and V_N[ ][ ] to 1 respectively. In section 3513 all attributes are initialized to not necessary by setting N[ ] to false.

The remaining portion of the extended algorithm is the incremental phase of the algorithm. This phase is called at each step of the workflow execution when a new attribute value is obtained, as part of the operation of the prequalifier 2804. It updates the T_N, F_N, V_N, S_N, and N data structures according to the new eager snapshot computed by the basic algorithm. The incremental phase contains three steps. The first step is the preparation step. This step records information about the difference between the previous eager snapshot and the new eager snapshot computed by the basic algorithm. The second step is the instigation step which computes new necessary properties which immediately follow from the new information in the snapshot. The third step is the propagation step which propagates the new necessary properties computed in the instigation step.

The variables for the increment phase are defined in section 3516. Section 3518 defines the variables that are used to store the status of the current snapshot. These variables are described in further detail in the figure. Section 3520 defines variables that store attributes which are newly ENABLED or newly READY+ENABLED and edges which are newly hidden. Section 3522 defines variables which are used to store attributes which have become newly value-necessary (new_V_N), newly stable-necessary (new_S_N), newly true-necessary (new_T_N), or newly false-necessary (new_F_N), as a result of the instigation step.

The preparation step is shown in section 3524. This step sets the values of prev_hidden_edges and prev_E and then calls the increment procedure of the basic algorithm in step 3526. The increment procedure is described above in conjunction with section 3414 of FIG. 34B. After execution of the increment procedure, there is a new snapshot which is now operated upon by the remainder of the extended algorithm.

The instigation step is shown in section 3528. This step is divided into 4 cases. Case 1 is shown in section 3530. This case implements propagation rule (18) which indicates that an attribute A is value-necessary for itself if it is in the state ENABLED or ENABLED +READY. This section 3530 thus determines which attributes A have newly entered the set of states {ENABLED, ENABLED+READY} and for those attributes, sets V_N[A][A]=[0,] thus indicating that the attribute is value-necessary for itself The pair (A,A) is also added to the set of pairs of attributes which are newly value-necessary (new_V_N). Case 2, shown in section 3532 implements propagation rule (13[) ]which indicates that an attribute A is stable-necessary for an attribute B if the state of A is greater than or equal to ENABLED (i.e. ENABLED or ENABLED+READY), B is enabled, and A is value-necessary for B. This section 3532 applies this propagation rule for each newly enabled attribute B (i.e., those attributes in the set Δ_E) and updates new_S_N as appropriate.

As shown in section 3534, the variable Δ_HIDDEN_EDGE is used to hold edges that have been newly hidden during this iteration of the algorithm. Variables prev_T_N, prev_F_N, new_T_N and new_F_N are used to keep track of node-attribute pairs that become true-necessary or false-necessary during this execution of the algorithm.

Case 3, shown in section 3536 implements propagation rule (1) and operates as follows. If an edge (n,p) is hidden, then the predicate node n was computed to be false, in 15 which case it is no longer relevant whether attribute A is true-necessary for n. Thus, if attribute A is not already true-necessary for n (i.e. T_N[p][A]≠0) then the value of T_N[p][A] is decremented, which reduces the number of relative predecessors for which A needs to be true-necessary. Case 4, shown in section 3538 implements propagation rule (4) and operates as follows. If an edge (n,p) is hidden, then the predicate node n was computed to be false, in which case it is no longer relevant whether attribute A is false-necessary for n. Thus, if attribute A is not already false-necessary for n (i.e. F_N[p][A]≠0) then the value of F_N[p][A] is decremented, which reduces the number of relative predecessors for which A needs to be false-necessary.

The propagation step 3540 calls the new_propagate routine, which is shown in section 3542. The new propagate routine receives, and operates on, the set of attributes which have been found to be newly value-necessary (new_V_N), stable-necessary (new_S_N), true-necessary (new_T_N), or false-necessary (new_F_N) as a result of the instigate step. Section 3544 calls the appropriate propagation routine for the newly necessary attributes. Also, for attributes which are newly value-necessary, propagation rule 16 is implemented in section 3546.

The newly value-necessary attributes are propagated in the propagate_V_N outine 3548. Section 3550 implements propagation rule (13). If the condition is satisfied, then A is set to stable-necessary for B (i.e. S_N[B][A] is set to 0), and this new necessary property is further propagated by calling the propagate_S_N routine. Propagation rule (14) is implemented in section 3552 and if an attribute is found to be stable-necessary as a result, that property is further propagated by calling the propagate_S_N routine. Propagation rule (11) is implemented in section 3554 and if an attribute is found to be true-necessary as a result, that property is farther propagated by calling the propagate_T_N routine. Propagation rule (12) is implemented in section 3556 and if an attribute is found to be false-necessary as a result, that property is further propagated by calling the propagate_F_N routine The newly stable-necessary attributes are propagated in the propagate_S_N routine 3558. Propagation rule (17) is implemented in section 3560 and if an attribute is found to be value-necessary as a result, that property is further propagated by calling the propagate_V_N routine. Propagation rule (19), which determines whether an attribute is necessary for the workflow execution, is implemented in step 3562

The newly false-necessary attributes are propagated in the propagate_F_N routine 3564 and the newly true-necessary attributes are propagated in the propagate_T_N routine 3566. The rules implemented by various portions of these routines are indicated in FIG. 35. These routines would be well understood by one skilled in the art given the above description of the other propagation routines.

It is to be understood that the extended algorithm is only one implementation of the propagation rules described above. One skilled in the art could readily implement these propagation rules using other algorithms. Further, one skilled in the art could also use and implement other or additional propagation rules.

It is noted that the running time of the extended algorithm when executing workflow schemas S on one input is $O(|N||E|)$ where N is the set of nodes in $D_S$ and E is the set of edges in $D_S$.

A task may be identified as necessary because the value produced by the task is value-necessary for some target attribute, i.e., the value produced by the task is used, either directly or indirectly, in the evaluation of the target attribute. A task may be identified as necessary because the value produced by the task is true-necessary and false-necessary for a target attribute, i.e., the value produced by the task is necessary, either directly or indirectly, to determine that the enabling condition for the target attribute is true and that it is necessary, either directly or indirectly, to determine that the enabling condition for the target attribute is false.

Given the above description and the pseudo code in FIGS. 35A–35G, one skilled in the art could readily implement the algorithm.

Thus, the algorithms shown in FIGS. 34 and 35 compute the three key properties of eligible, unneeded, and necessary. Referring now to FIG. 28, the algorithms of FIGS. 34 and 35 are executed by the prequalifier 2804 and thus the three properties are computed by the prequalifier 2804. Tasks which are eligible may be provided to the candidate task pool 2802 for eager evaluation. However, if an eligible task is determined to be unneeded, then it is either not provide to, or removed from, the candidate task pool 2802. Further, if an eligible task is determined to be necessary, then it is marked as high priority in the candidate task pool 2802 so that it may be scheduled by the task scheduler 2806 for high priority execution by the execution engine 2812. This improves the performance of the overall operation of the decision engine 104. The prequalifier 2804 updates the candidate task pool 2802 after all source attributes have been processed, and also after a new attribute value has been computed. In this manner, tasks which are known to be necessary for the completion of the workflow (eligible and necessary tasks) will be performed before tasks which are merely eligible. This is desirable because tasks which are merely eligible may actually be unneeded, and thus such tasks should not be given high priority.

In accordance with one aspect of the invention, it is not required that the enabling conditions of modules involve or refer to events, such as the initiation or completion of tasks, i.e., the executions of modules. In the context of DL specifications, conditions may test only the stable states and values of attributes and modules. Thus, there is an implicit dependence between the truth value of an enabling condition and the times at which the modules and attributes referred to in the condition become stable. However, once these modules and attributes become stable they cannot change value, and so the truth value of the condition will remain the same for the duration of the execution of the workflow instance. This is a result of the acyclicity condition imposed on DL specifications and the fact that each attribute is produced by only one module. Thus, once the truth value of an enabling condition is established, the particular times at which that truth value is tested by an execution algorithm will not affect the overall outcome of the workflow instance. In particular, unless the enabling conditions explicitly refer to the timing of module execution, the duration of processing of tasks will not affect the truth value of an enabling condition, and, in the absence of optimizations as described above, will not affect whether or not a given module is executed during a workflow instance.

The independence of module execution in workflows based on DL specifications stands in marked contrast with workflow systems that use enabling conditions that are required to explicitly refer to events such as the initiation or completion of tasks.

Enabling conditions in such systems have the form "on <event> if <condition>". The intended semantics is that during execution the <condition> should be tested immediately after the <event> occurs. In these systems, the truth value of <condition> may be defined and change value over time. Thus, the outcome of testing the enabling condition, i.e., the decision of whether the corresponding module is executed or not, may depend on the exact time that the <event> in the enabling condition occurs. In particular, the enabling conditions and the decisions they embody may depend on the durations of execution of different modules. This dependence implies that analysis of the behavior of such systems is at roughly the same level of difficulty as the analysis of the behavior of procedural programs.

As described above, decision modules are evaluated using computation rules and a combining policy. In addition, a novelgraphical user interface (GUI) is used to display a representation of the evaluation of decision modules. The GUI is particularly advantageous for understanding and debugging the semantics of the workflow system, and for understanding how different execution strategies affect the processing of different kinds of inputs.

In describing the GUI, we again make the simplifying assumptions made above that we are given a declarative module in which each internal module produces exactly one output attribute and may have a side-effect. Further, once enabled, it is assumed that all internal modules will always produce a value and will never produce an exception value. For this discussion, the term non-decision module refers to internal modules that are not decision modules. The term non-decision attribute refers to an attribute whose defining module is a non-decision module.

The GUI may be implemented in connection with essentially any policy for evaluating decision attributes, i.e., those attributes that are evaluated as specified by a decision module. In order to illustrate the GUI most clearly, we do not use the policy for evaluating decision attributes described above. Instead, the GUI is described using an execution policy that is eager with respect to the evaluation of computation rule conditions and computation rule terms. The contribution rule terms are also referred to as "contributions" because, as described above, these terms contribute values to an attribute if the condition is true. Given the description herein, one skilled in the art could readily implement the GUI in connection with other execution policies.

In order to describe the eager execution policy for decision attributes, we modify the notion of snapshot used earlier, in two ways. The first modification is to restrict the set of states that decision modules can be in, and the second modification is to permit computation rule conditions and contributions to be evaluated in an eager fashion.

Recall in the previous discussion that non-side effect modules can have states as shown in FIG. 29. In the current discussion we use a refinement of the state diagram shown there for decision modules. Specifically, we use the FSA of FIG. 36 for decision modules. Each decision module starts in the state READY, even if the source attributes for the decision module are not yet stable. The conditions and/or contributions of rules in a decision module may be evaluated eagerly, as the attributes used by those conditions and/or contributions become stable. If all the rule conditions are evaluated, and the contributions of all rules with true condition are evaluated, then the value for the attribute can be determined, and the module is moved into state COMPUTED. Alternatively, if the enabling condition of the decision module is determined to be true, the module may move to state READY+ENABLED. The states VALUE and DISABLED are the same as described above in connection with FIG. 29.

Figure 37:
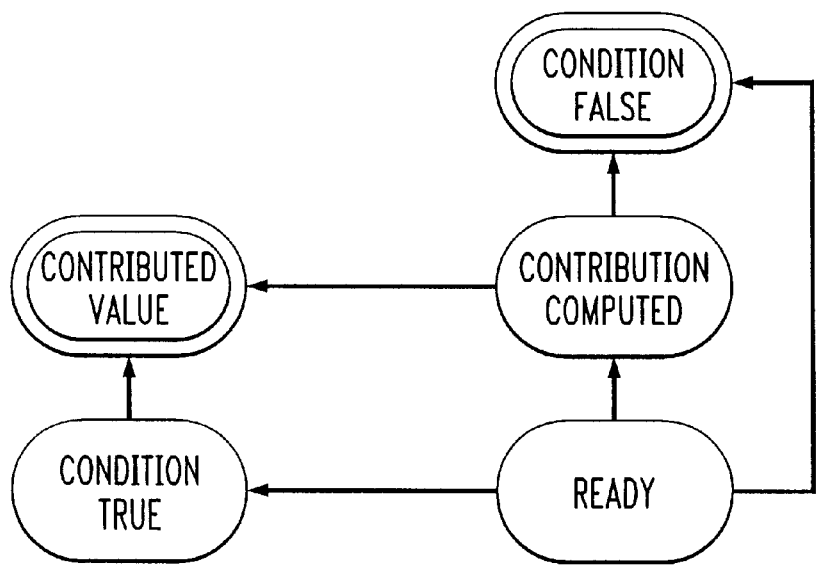
FIG. 37 shows the finite state automata for computation rules.

FIG. 37 shows the FSA used for each computation rule. Each rule begins in state READY. If a sufficient number of attributes in the rule condition become stable for a determination to be made that the rule condition is, or will eventually become, TRUE, then the rule moves to state CONDITION_TRUE. Alternatively, if a sufficient number of attributes in the rule contribution become stable such that the eventual value of the contribution can be computed, then the rule moves to state CONTRIBUTION_COMPUTED. Thereafter, if both the rule condition is determined to be true and the contributed value is computed, then the rule moves to state CONTRIBUTED_VALUE. Alternatively, if a sufficient number of attributes in the rule condition become stable for a determination to be made that the rule condition is, or will eventually become, FALSE, then the rule moves to state CONDITION_FALSE.

Further in connection with the description of the GUI, the notions of workflow schema and snapshot presented above are modified. First, assume that a workflow schema has the form S=(Att, Src, Tgt, Eff, Cnd, Mod, Dec), where 1. Components Att, Src, Tgt, Eff, Cnd, and Mod are as described above; and
2. Dec is a set of pairs $\{(Rules_A, CP_A)|$ A is a decision attribute$\}$, where for each 15 decision attribute A, $Rules_A$ is the set of computation rules in the module outputting A, and $CP_A$ is the combining policy for the module outputting A.

For schema S, we use Rules to denote the set $\cup\{Rules_A|$ A is a decision attribute in S$\}$, i.e., the set of all computation rules occurring in the decision modules of S.

Second a snapshot for S is defined to be a pair $s=(\sigma,u)$ where
1. the state mapping $\sigma$ is a total function from Att$\cup$Rules such that $\sigma$ maps
   a. each decision module to {READY, ENABLED+READY, COMPUTED, VALUE, DISABLED},
   b. each non-decision, non-side-effect module to {INITIALIZED, ENABLED, READY, ENABLED+READY, COMPUTED, VALUE, DISABLED},
   c. each non-decision, side-effect module to {UNINITIALIZED, ENABLED, READY, ENABLED+READY, VALUE, DISABLED}, and d. each computation rule to {READY, CONDITION_TRUE, CONTRIBUTION_COMPUTED, CONTRIBUTED_VALUE, CONDITION_FALSE}.

2. The value mapping $\mu$ is a partial function from Att∪Rules such that $\mu$ maps a. Att into $\cup\{\tau(A)|A\epsilon Att\}$, such that for each A, if $\mu(A)$ is defined then $\mu(A)\epsilon\tau(A)$, and such that for each A, $\mu(A)$ is defined iff $\sigma(A)$=VALUE or $\sigma(A)$=COMPUTED.

b. each rule r in Rules to a value with the type of the contribution of r, such that $\mu(r)$ is defined iff $\sigma(r)$=CONTRIBUTION_COMPUTED or $\sigma(r)$=CONTRIBUTED_VALUE.

Figure 36:
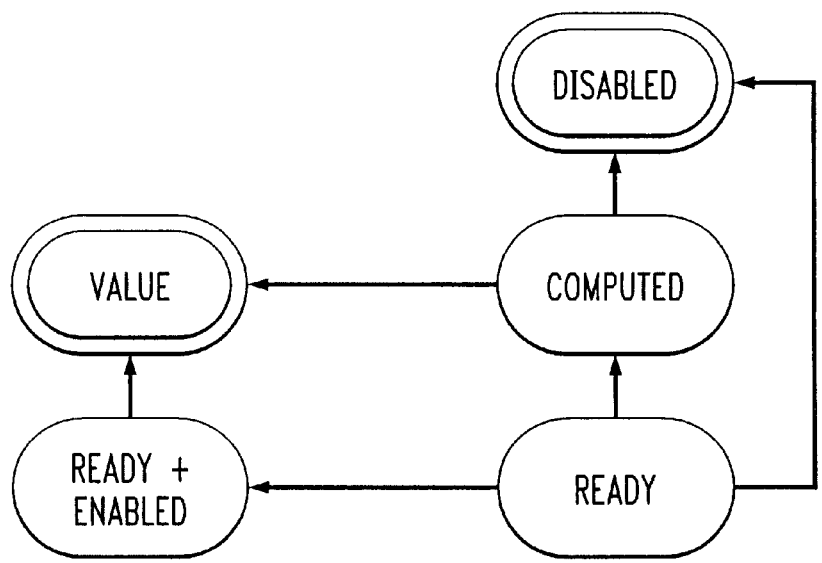
FIG. 36 shows the finite state automata for decision modules.

One snapshot s' extends another snapshot s (specified as s<s') if for each attribute A:

(a) if A has a value in s, then A has the same value in s'; and (b) the state of A in s'≧the state of A in s, where ≧ is relative to the FSAs of FIGS. 29, 30 and 36 and for each computation rule r:

(c) if r has a contributed value in s, then r has the same value in s'; and (d) the state of r in s'≧the state of r in s, where ≧ is relative to the FSA of FIG. 37.

Snapshot s' strictly extends snapshot s if s<s' and s≠s'. A snapshot is complete if each attribute is stable and each computation rule is in state CONTRIBUTED_VALUE or CONDITION_FALSE. A snapshot is terminal if each target attribute is stable.

For the purposes of describing the GUI, it is not necessary to use a specific algorithm or policy for executing a declarative workflow. We assume here that execution of workflow S begins with a snapshot such that all source attributes are stable, all internal modules are in state UNINITIALIZED (or READY, for decision modules), and all computation rules are in state READY. Then a sequence of snapshots is constructed, each one a strict extension of the previous one. Execution halts when a terminal snapshot is reached.

The GUI will now be described in connection with the declarative module INFO_ABOUT_CUSTOMER as shown in FIG. 5. This module has two source attributes, CUST_REC and ACCOUNT_NUMBER. There are eight internal modules 504, 508, 512, 516, 520, 524, 528, and 532. Modules 504, 508, and 512 are non-decision modules. Modules 516, 520, 524, 528, and 532 are decision modules. The specification of the INFO_ABOUT-CUSTOMER module and its internal modules has been described in detail above. Reference to that description may be helpful during the following description of the GUI.

Figure 39:
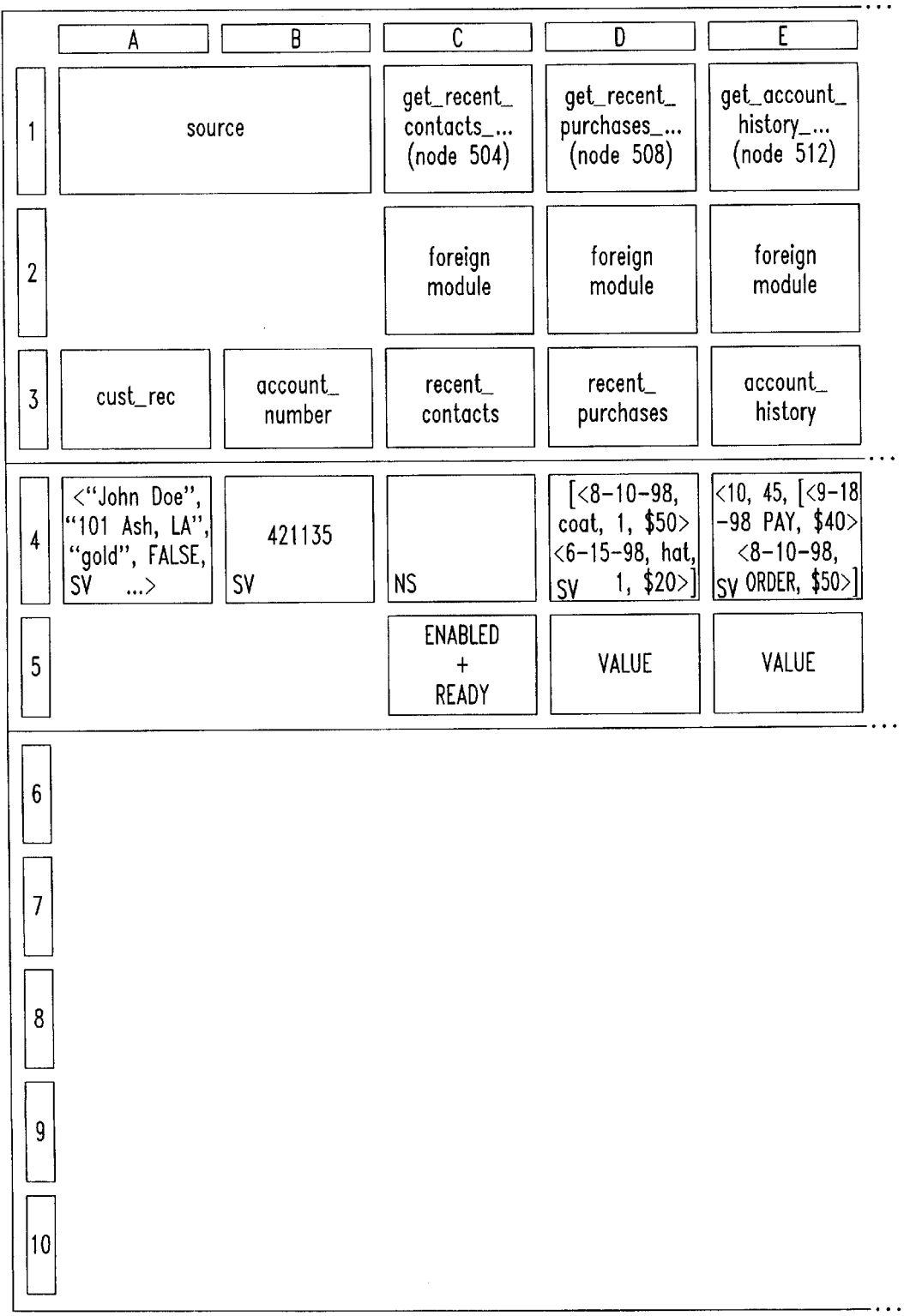
FIG. 39 shows an illustrative display screen shot of the graphical user interface.

FIGS. 38 and 39 are illustrative display screen shots and are used to illustrate the GUI. The figures show information about two snapshots that might arise during a hypothetical execution of the INFO_ABOUT_CUSTOMER module. FIG. 38 shows execution information near the beginning of execution and FIG. 39 shows execution information somewhere in the middle of execution.

Referring to FIG. 38, the display is in a grid format, with the rows labeled with numbers and the columns labeled with letters. The intersection of a row and a column defines a cell. Each column of the display corresponds to an attribute of the INFO_ABOUT_CUSTOMER module. The first two rows provide information about how the attributes are computed. Row 1 indicates the name of the module computing the attribute. For ease of cross-reference, row 1 of FIG. 38 includes the corresponding call-out identification of the module from FIG. 5. Such call-out numbers would not be included in an actual embodiment of the GUI. Row 2 indicates the manner of computation. For non-decision modules, row 2 indicates the type of the module (e.g., "foreign"). For decision modules, row 2 displays a short description of the combining policy of the module. This short description could be specified, for example, in the textual description of the combining policy. As an alternative, row 2 could display the name of the function specifying the combining policy for the module. The attribute names are shown in row 3.

Rows 4 and 5 display the evaluation status of attributes. The fourth row displays the value of an attribute if the attribute instable with an assigned value. For example, in FIG. 38, the two source attributes corresponding to columns A and B, are stable with values. In particular, the CUST_REC attribute has as a value a tuple with first fields being name="John Doe", address="101 Ash, LA", card_color="gold", and hates_promos?=FALSE. The ACCOUNT_NUMBER attribute has a value of 421135. The cells representing these attribute values also display the label "SV" indicating that the attributes are stable with an assigned value. The remaining cells in row 4 display the label "NS", indicating that the corresponding attributes are not stable. The fifth row of the display displays the states of the modules. The three foreign modules (shown in columns C, D, and E) are in state ENABLED+READY, a consequence of the fact that their enabling conditions are all TRUE and their input attributes are stable. The module CALCULATE_CUST_VALUE is also in state ENABLED+READY as shown in cell 15. This is because its associated enabling condition is TRUE, and by assumption all decision modules begin in state READY. The other decision modules are in state READY, because the attributes used in their enabling conditions are not yet stable.

Rows 6, 7, 8, . . . are used to indicate the evaluation status of computation rules. Accordingly, cells are shown in these rows only for decision modules corresponding to columns F, G, H, I, and J. The cells in rows 6, 7, 8, . . . are called rule cells. For each attribute A whose value is computed by a decision module, there is a one-to-one correspondence between the computation rules for A and the rule cells in the column for A. Note that for clarity only the first 5 rule cells for attribute NET_PROFIT_SCORE (column G) are shown, even though FIG. 16 shows this attribute as having 7 computation rules.

The evaluation status of the computation rules at a point in the execution is indicated in the corresponding rule cells. The states of READY and CONDITION_TRUE are indicated by labels within the cell. The states of CONTRIBUTION_COMPUTED and CONTRIBUTED_VALUE are indicated by placing a value in the cell along with the label C-V to indicate a state of CONTRIBUTED_VALUE or the label C-C to indicate a state of CONTRIBUTION_COMPUTED. The state of CONDITION_FALSE is indicated by placing the symbol ⊥, representing a null value, in the cell.

In the embodiment described here, it is assumed that computation rule conditions and contributions are evaluated eagerly. In FIG. 38, cells G9, H6, H8, I7, and I9 indicate that the corresponding rules are in state CONDITION_FALSE. All of these rules have conditions based on the card color of the customer, which is known from the value of attribute CUST_REC. Similarly, cell H7 is in state CONDITION_TRUE because the condition for the corresponding rule is CUST_REC.card_color="gold". However, the contribution for the rule corresponding to cell H7 depends on the ACCOUNT_HISTORY attribute, which is not yet stable as indicated by cell D4. In contrast, cells G10 and I8 are in state CONTRIBUTED_VALUE, because their corresponding rule conditions are true and the rule contributions depend on no attributes (and hence, on no attributes that are currently unstable). Cell J6 is in state CONTRIBUTION_COMPUTED because the corresponding rule condition depends on a non-stable attribute as indicated by cell J4, but the rule contribution is the constant value "collect". The remaining rule cells are in state READY, since both their rule conditions and contributions depend on attributes that are currently not stable.

FIG. 39 shows an example display screen shot after several steps have occurred in the execution of the workflow and the evaluation of the attributes has progressed. In particular, FIG. 39 shows that the attributes RECENT_PURCHASES and ACCOUNT_HISTORY have returned values as shown in cells D4 and E4 respectively. A value for attribute RECENT_CONTACTS has not yet been received as indicated by cell C4. Based on this partial information, it has been determined in the execution that the CALCULATE_NET_PROFIT_SCORE module is disabled as indicated by the label DISABLED in cell G5. The associated attribute value cell, G4, now contains the null symbol ⊥ and the label "SU" indicating that the attribute value is stable and undefined.

Note that values for the conditions and contributions of two additional computation rules of the NET_PROFIT_SCORE attribute have been obtained during the execution that led from the display of FIG. 38 to the display of FIG. 39. Specifically, the rule represented by cell G6 has become CONDITION_FALSE as indicated by the symbol ⊥, and the rule represented by cell G8 has become CONTRIBUTED_VALUE as indicated by the value −9 and label C-V. Since the NET_PROFIT_SCORE attribute has become DISABLED, no further information about the computation rules shown in column G need to be computed, since the attribute will not contribute to the final outcome of the workflow execution.

The execution progression has also permitted evaluation of the computation rule corresponding to cell H7, and hence the evaluation of the LATE_PAYMENTS_SCORE attribute. The execution progression has also permitted evaluation of the condition of the rule corresponding to cell I6.

The algorithm for maintaining and dynamically updating the GUI display as described above is shown in FIGS. 40A and 40B. The algorithm contains two main sections. The Initialization section is used to initialize the display prior to beginning execution of the workflow. The Iteration section is executed when new information is received from the execution engine 2812 and the display is to be updated with the new information.

We now describe one way that the processing for supporting the GUI could be incorporated into the basic algorithm of FIG. 34. Because this algorithm views the execution of decision modules as external "black boxes", the illustration here does not include a display of the incremental evaluation of computation rules. The Initialization step of FIG. 40A could be included at the end of part 3406 of FIG. 34A. The Iteration phase of FIGS. 40A and 40B could be included in section 3414 of FIG. 34B, just after section 3420. In this case, the Iteration phase would be applied multiple times, once for each relevant event that occurs during execution of section 3422. Alternatively, the Iteration phase of FIGS. 40A and 40B could be included (a) into section 3414 of FIG. 34B just after section 3418 and (b) into section 3422 of FIGS. 34B and 34C just after each occurrence of a command that assigns a state value to an attribute (i.e., a value for σ[C] for some attribute C). Based on this description it would be clear to one skilled in the art how to incorporate processing to support the GUI into the extended algorithm of FIG. 35, and into algorithms that support execution of DL specifications that are eager with respect to the evaluation of computation rule conditions and/or computation rule terms.

As used throughout the description of the algorithm, various "indications" are applied to cells. An indication may be any type of visible indication, such as color, shading, pattern, outline, icon, or alphanumeric label, which conveys information to a user. Alphanumeric labels are used for the example screen shots shown in FIGS. 38 and 40. Turning now to the algorithm of FIGS. 40A and 40B, in line 4002 rows 1, 2, and 3 of the display are generated based on the DL specification. In section 4004 row 4 of the source attributes is initialized. If the source attribute has a value, then the value is inserted in the cell and the attribute_value_ indication is applied to the cell. If the source attribute is disabled, then the attribute_disabled_indication is applied to the cell. In section 4006 the cells representing the non-decision modules are initialized by applying a module_uninitialized_indication in row 5 and an attribute_uninitialized_indication in row 30 4. In section 4008 the cells representing the decision modules are initialized by applying a module_ready_indication in row 5 and an attribute_uninitialized_indication in row 4. In section 4010 the rule cells are initialized by applying a rule_ready_ indication to the rule cells in rows 6, 7, 8, . . .

The Iteration section of the algorithm is now described. This section is one case statement such that the processing to be performed depends on the type of event received from the execution engine 2812. If the event is a non-decision module entering state ENABLED, then in section 4012 a module_enabled_indication is applied to the appropriate cell in row 5 of the display. If the event is a non-decision module entering state READY, then in section 4014 a module ready_indication is applied to the appropriate cell in row 5 of the display. If the event is a non-decision module entering state READY+ENABLED, then in section 4016 a module_ready+enabled_indication is applied to the appropriate cell in row 5 of the display. If the event is a non-decision module entering state COMPUTED, then in section 4018 a module_computed_indication is applied to the appropriate cell in row 5 of the display, the computed value is displayed in the appropriate cell in row 4 of the display, and an attribute_computed_indication is applied to the cell in row 4. If the event is a non-decision module entering state VALUE, then in section 4020 a module_value_indication is applied to the appropriate cell in row 5 of the display, the cell in row 5 is labeled as "value", the assigned value is displayed in ithe appropriate cell in row 4 of the display, and an attribute_value_indication is applied to the cell in row 4. If the event is a non-decision module entering state DISABLED, then in section 4022 a module_disabled_indication is applied to the appropriate cell in row 5 of the display, the cell in row 5 is labeled as "disabled", the ⊥ symbol is displayed in the appropriate cell in row 4 of the display, and an attribute_disabled_indication is applied to the cell in row 4. If the event is a decision module entering state ENABLED+READY, then in section 4024 a module_enabled+ready_indication is applied to the appropriate cell in row 5 of the display and the cell is labeled as "enabled+ready". If the event is a decision module entering state COMPUTED, then in section 4026 a module_computed_ indication is applied to the appropriate cell in row 5 of the display, the cell in row 5 is labeled as "computed", the computed value is displayed in the appropriate cell in row 4 of the display, and an attribute_computed_indication is applied to the cell in row 4. If the event is a decision module entering state VALUE, then in section 4028 a module_value_indication is applied to the appropriate cell in row 5 of the display, the cell in row 5 is labeled as "value", the computed value is displayed in the appropriate cell in row 4 of the display, and an attribute_value_indication is applied to the cell in row 4. If the event is a decision module entering state DISABLED, then in section 4030 a module_disabled_indication is applied to the appropriate cell in row 5 of the display, the cell in row 5 is labeled as "disabled", the ⊥ symbol is displayed in the appropriate cell in row 4 of the display, and an attribute_disabled_indication is applied to the cell in row 4.

If the event is a computation rule entering state CONDITION-TRUE, then in step 4032 a rule_cond_true_indication is applied to the appropriate rule cell. If the event is a computation rule entering state CONTRIBUTION-COMPUTED, then in step 4034 the computed value is displayed in the appropriate rule cell and a rule_contribution_computed indication is applied to the cell. If the event is a computation rule entering state CONTRIBUTED-VALUE, then in step 4036 the computed value is displayed in the appropriate rule cell and a rule_contributed_value_indication is applied to the cell. If the event is a computation rule entering state CONDITION-FALSE, then in step 4038 the ⊥ symbol is displayed in the appropriate rule cell and a rule_condition_false_indication is applied to the cell.

The above description described one embodiment of the GUI. Those skilled in the art could implement many variations of the GUI. Examples of such variations follows.

1. Different coloring and labeling conventions: Use different colors and/or patterns for indicating the state and/or other information about computation rules at different points in the execution. Use additional or different information in the labels for cells, e.g., include a time-stamp for when the value for a cell has been computed.
2. Different execution algorithms: show the progress of executions in conjunction with different algorithms for executing decision modules.
3. Different FSAs: The GUI can be used with FSAs for computation rules which are different than the FSA shown in FIG. 37.
4. User control over visual layout: Permit the user to hide or expose selected columns or rows of the display. Also, permit the user to click on cells to display more information about them. For example, clicking on a rule cell could result in the display of a pop-up window showing the rule. Clicking on a cell in row 2 could result in the display of the CPL program specifying the combining policy associated with that cell.
5. Different visual layout: In FIGS. 38 and 39, attributes are positioned along the horizontal axis and rules positioned along the vertical axis. Many alternatives are possible. Some representative examples include: (a) position attributes along the vertical axis and rules along the horizontal axis; (b) instead of using a grid paradigm, show decision modules as hexagons as in FIG. 5 and show rule status for a given attribute using a column or row of cells; (c) same as (b) but display the cells for rules in a tree-based or other structure that reflects the kinds of contributions different rules might make.
6. Use in conjunction with systems not based on DL specifications, including systems specified using, for example, flowcharts, procedural languages, or scripting languages.
7. Batch display: The example described above illustrates how to display the execution of a single workflow instance. The visual paradigm can be used to display the result of executions of a set of workflow instances. For example, the color of a rule cell might be based on the percentage of executions for which the condition of the corresponding rule was true. Rule cells might be labeled with an aggregate value (e.g., an average) indicating the family of contributions made by the rule in different executions.
8. Permit backtracking: The example assumed that the sequence of displays produced corresponded to an actual or hypothetical execution of the workflow. It is also possible to permit a user to halt the execution, and modify it by replacing the values of source or non-decision attributes.
9. Highlight data dependencies between cells: For example, the interface could permit the user to click on rule cells in order to display relationships between attributes and rules, e.g., what attributes does a rule condition depend on, or what attributes does a rule contribution depend on.
10. Incorporate general modules: The example assumed that each module produced exactly one output attribute. The GUI can be used in contexts where modules produce more than one attribute. This could be accomplished, for example, by permitting cells in the first, second and fifth rows to span a number of columns equaling the number of output attributes of a given module. (This was done for the source attributes, in columns A, B of row 1 in FIGS. 38 and 39).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A workflow system for processing a received object comprising:

a memory storing a declarative program specification, said program specification defining:
a plurality of modules in a workflow instance, the plurality of modules producing associated attributes when executed, wherein each attribute is produced by only one module, wherein at least one of said attributes depends on another attribute, and wherein the execution of at least one of said modules results in the initiation of a side-effect action performed by a component external to said workflow system;
a plurality of enabling conditions which are independent of the time duration of workflow instance execution, for determining whether associated ones of said modules are enabled, wherein evaluation of at least one of said enabling conditions depends on a value of an attribute;
wherein the set of data flow dependencies and enabling flow dependencies between said modules and said enabling conditions is acyclic; and
wherein one of the modules produces a particular attribute, and wherein data flow between the particular attribute and an enabling condition that depends on the particular attribute is defined in an implicit rather than explicit manner in said declarative program specification; and a processor for executing said program specification, said execution comprising the steps of:
  evaluating enabling conditions; and
  executing modules based on said evaluated enabling conditions.

2. The workflow system of claim 1 wherein said execution of said program specification implements at least a portion of a customer care system.

3. The workflow system of claim 2 wherein said customer care system is a call center for processing incoming customer telephone calls.

4. The workflow system of claim 2 wherein said customer care system is an electronic commerce system.

5. The workflow system of claim 1 wherein the execution of at least one of said modules includes the execution of a procedural function.

6. The workflow system of claim 5 wherein said procedural function is specified by a procedural computer language.

7. The workflow system of claim 1 wherein at least one of said modules is a decision module.

8. The workflow system of claim 1, wherein:
  once stable, values of the modules, attributes and enabling conditions cannot change for the time duration of workflow instance execution;
  said execution further comprises:
    determining if a first of said enabling conditions is stable;
    evaluating said enabling condition when said enabling condition is stable; and
    evaluating a module associated with said first enabling condition when said enabling condition is stable and said enabling condition evaluates to a predetermined value.

9. The workflow system of claim 1, wherein:
  a first of said modules produces a first attribute value and a second of said modules uses said first attribute value to produce a second attribute value, wherein data flow from said first attribute value to said first module is defined in an implicit rather than explicit manner in said declarative program specification; and
  said execution further comprises determining a sequence of execution between said first and second modules, whereby said first attribute value will be determined before said second module uses said first attribute value.

10. The workflow system of claim 1, wherein:
  a first of said modules produces a first attribute value and a first of the enabling conditions uses said first attribute value to determine whether an associated one of said modules is enabled, wherein data flow from said first attribute value to said first enabling conditions is implicit; and
  said execution further comprises determining a sequence of execution between said first module and said enabling condition, whereby said first attribute value will be determined before said first enabling condition uses said first attribute value.

11. The workflow system of claim 1, wherein the set of data flow dependencies and enabling flow dependencies between said modules and said enabling conditions is acyclic because there is no module M for which there is a directed path in a graph of data flow dependencies and enabling flow dependencies that starts at M and ends at M.

12. A computer readable medium storing a declarative program specification, said program specification capable of execution on a computer processor for implementing a workflow system, said program specification defining:
  a plurality of modules in a workflow instance, the plurality of modules producing associated attributes when executed, wherein each attribute is produced by only one module, wherein at least one of said attributes depends on another attribute, and wherein the execution of at least one of said modules results in the initiation of a side-effect action performed by a component external to said workflow system;
  a plurality of enabling conditions which are independent of the time duration of workflow instance execution, for determining whether associated ones of said modules are enabled, wherein evaluation of at least one of said enabling conditions depends on a value of an attribute;
  wherein the set of data flow dependencies and enabling flow dependencies between said modules and said enabling conditions is acyclic; and
  wherein one of the modules produces a particular attribute, and wherein data flow between the particular attribute and an enabling condition that depends on the particular attribute is defined in an implicit rather than explicit manner in said declarative program specification; and
  wherein said execution of said program specification on said computer processor comprises evaluation of enabling conditions and execution of modules based on said evaluation.

13. The computer readable medium of claims 12 wherein said execution of said program specification implements a customer care system.

14. The computer readable medium of claim 13 wherein said customer care system is a call center for processing incoming customer telephone calls.

15. The computer readable medium of claim 13 wherein said customer care system is an electronic commerce system.

16. The computer readable medium of claim 12, wherein:
  once stable, values of the modules, attributes and enabling conditions cannot change for the time duration of workflow instance execution;
  said execution of said program specification on said computer further comprises:
    determining if a first of said enabling conditions is stable;
    evaluating said enabling condition when said enabling condition is stable; and
    evaluating a module associated with said first enabling condition when said enabling condition is stable and said enabling condition evaluates to a predetermined value.

17. The computer readable medium of claim 12, wherein:
  a first of said modules produces a first attribute value and a second of said modules uses said first attribute value to produce a second attribute value, wherein data flow from said first attribute value to said first module is defined in an implicit rather than explicit manner in said declarative program specification; and
  said execution of said program specification on said computer further comprises determining a sequence of execution between said first and second modules, whereby said first attribute value will be determined before said second module uses said first attribute value.

18. The computer readable medium of claim 12, wherein:
- a first of said modules produces a first attribute value and a first of said enabling conditions uses said first attribute value to determine whether an associated one of said modules is enabled, wherein data flow from said first attribute value to said first enabling conditions is defined in an implicit rather than explicit manner in said declarative program specification; and
- said execution of said program specification on said computer further comprises determining a sequence of execution between the first module and the enabling condition, whereby said first attribute value will be determined before said first enabling condition uses said first attribute value.

19. The computer readable medium of claim 12, wherein the set of data flow dependencies and enabling flow dependencies between said modules and said enabling conditions is acyclic because there is no module M for which there is a directed path in a graph of data flow dependencies and enabling flow dependencies that starts at M and ends at M.

20. A method for operation of a workflow system for processing a received object, said workflow system comprising a memory storing a declarative program specification defining:
- a plurality of modules in a workflow instance, the plurality of modules producing associated attributes when executed, wherein each attribute is produced by only one module, wherein at least one of said attributes depends on another attribute, and wherein the execution of at least one of said modules results in the initiation of a side-effect action performed by a component external to said workflow system;
- a plurality of enabling conditions which are independent of the time duration of workflow instance execution for determining whether associated ones of said modules are enabled, wherein evaluation of at least one of said enabling conditions depends on a value of an attribute;
- wherein the set of data flow dependencies and enabling flow dependencies between said modules and said enabling conditions is acyclic; and
- wherein one of the modules produces a particular attribute, and wherein data flow between the particular attribute and an enabling condition that depends on the particular attribute is defined in an implicit rather than explicit manner in said declarative program specification; and said method comprising the step of:
- executing said program specification wherein said step of executing further comprises the steps of:
  - evaluating enabling conditions; and
  - executing modules based on said evaluation of enabling conditions.

21. The method of claim 20 wherein said execution of said program specification implements a customer care system.

22. The method of claim 21 wherein said customer care system is a call center for processing incoming customer telephone calls.

23. The method of claim 20 wherein the execution of at least one of said modules further comprises the step of executing a procedural function.

24. The method of claim 23 wherein said procedural function is specified by a procedural computer language.

25. The method of claim 20, wherein:
- once stable, values of the modules, attributes and enabling conditions cannot change for the time duration of workflow instance execution;
- the step of executing further comprises the steps of:
  - determining if a first of said enabling conditions is stable;
  - evaluating said enabling condition when said enabling condition is stable; and
  - evaluating a module associated with said first enabling condition when said enabling condition is stable and said enabling condition evaluates to a predetermined value.

26. The method of claim 20, wherein:
- a first of said modules produces a first attribute value and a second of said modules uses said first attribute value to produce a second attribute value, wherein data flow from said first attribute value to said first module is defined in an implicit rather than explicit manner in said declarative program specification; and
- the step of executing further comprises the step of determining a sequence of execution between said first and second modules, whereby said first attribute value will be determined before said second module uses said first attribute value.

27. The method of claim 20, wherein:
- a first of said modules produces a first attribute value and a first of said enabling conditions uses said first attribute value to determine whether an associated one of said modules is enabled, wherein data flow from said first attribute value to said first enabling conditions is defined in an implicit rather than explicit manner in said declarative program specification; and
- the step of executing further comprises the step of determining a sequence of execution between said first module and said enabling condition, whereby said first attribute value will be determined before said first enabling condition uses said first attribute value.

28. The method of claim 20, wherein the set of data flow dependencies and enabling flow dependencies between said modules and said enabling conditions is acyclic because there is no module M for which there is a directed path in a graph of data flow dependencies and enabling flow dependencies that starts at M and ends at M.

* * * * *